(12) United States Patent
Hattori et al.

(10) Patent No.: US 8,190,324 B2
(45) Date of Patent: May 29, 2012

(54) USER ASSISTANCE SYSTEM FOR VEHICLE

(75) Inventors: Toshihiro Hattori, Okazaki (JP);
Shougo Kameyama, Chiryu (JP);
Hideyuki Morita, Nishikamo-gun (JP);
Hirotane Ikeda, Nagoya (JP);
Michihiro Matsuura, Nukata-gun (JP);
Minoru Terada, Takahama (JP);
Mitsuyasu Matsuura, Chiryu (JP)

(73) Assignees: Denso Corporation, Kariya, Aichi-Pref. (JP); Nippon Soken, Inc., Nishio, Aichi-Pref. (JP)

( * ) Notice: Subject to any disclaimer, the term of this patent is extended or adjusted under 35 U.S.C. 154(b) by 1282 days.

(21) Appl. No.: 11/802,086

(22) Filed: May 18, 2007

(65) Prior Publication Data

US 2007/0299577 A1 Dec. 27, 2007

(30) Foreign Application Priority Data

May 24, 2006 (JP) .................................. 2006-144351
Apr. 27, 2007 (JP) .................................. 2007-119325

(51) Int. Cl.
*G05D 1/00* (2006.01)
*G06F 7/00* (2006.01)
*G01M 17/00* (2006.01)

(52) U.S. Cl. ............... 701/36; 701/1; 701/32; 701/29.1; 340/438; 340/459; 702/182; 702/183

(58) Field of Classification Search ............... 701/1, 29, 701/32, 36; 340/438, 459, 501, 505; 702/182, 702/183
See application file for complete search history.

(56) References Cited

U.S. PATENT DOCUMENTS

2004/0019591 A1* 1/2004 Gardner ............................ 707/3

FOREIGN PATENT DOCUMENTS

| JP | H10-134107 | 5/1998 |
|---|---|---|
| JP | 2000-186942 | 7/2000 |
| JP | P2003-099584 A | 4/2003 |
| JP | P2004-310218 A | 11/2004 |
| JP | P2004-338654 A | 12/2004 |
| JP | P2005-254986 A | 9/2005 |

OTHER PUBLICATIONS

U.S. Appl. No. 11/498,979, filed Aug. 2006, Hattori et al.
Japanese Office Action dated Jan. 11, 2012, issued in corresponding Japanese Application No. 2007-119325 with English Translation.

* cited by examiner

*Primary Examiner* — John Nguyen
*Assistant Examiner* — Brian J Broadhead
(74) *Attorney, Agent, or Firm* — Nixon & Vanderhye PC

(57) ABSTRACT

A portable information terminal stores first function list information indicating the contents of functions installed on a first vehicle. When a user carrying the terminal gets in a second vehicle before driving, the second vehicle acquires the first function list information from the terminal. The second vehicle compares the acquired first function list information with second function list information indicating the contents of functions installed on the second vehicle. The second vehicle acquires a functional difference between itself and the first vehicle and notifies the user of the difference.

49 Claims, 28 Drawing Sheets

FIG. 9A

FIRST VEHICLE

| SPECIFICATION | | |
|---|---|---|
| FUNCTION | | ALTERNATIVE |
| SAFETY | NIGHT VISION | NO |
| | AUTO CRUISE | NO |
| | ABS | NO |
| | STABILITY | NO |
| | BACK MONITOR | SONAR |
| | D. AIR BAG | NO |
| | ⋮ | ⋮ |
| SECURITY | ⋮ | ⋮ |
| ⋮ | ⋮ | ⋮ |

FIG. 9B

SECOND VEHICLE

| SPECIFICATION | | |
|---|---|---|
| FUNCTION | | ALTERNATIVE |
| SAFETY | NIGHT VISION | NO |
| | AUTO CRUISE | NO |
| | ABS | NO |
| | STABILITY | NO |
| | SONAR | BACK MONITOR |
| | D. AIR BAG | NO |
| | PASSENGER SEAT AIR BAG | NO |
| | ⋮ | ⋮ |
| SECURITY | ⋮ | ⋮ |
| ⋮ | ⋮ | ⋮ |

FIG. 10A
FIRST VEHICLE

| SPECIFICATION | | |
|---|---|---|
| DRIVE | BRAKE OPERABILITY | LEVEL 4 |
| | STEERING WHEEL OPERABILITY | LEVEL 4 |
| | DRIVING SYSTEM | FULL TIME FOUR WHEEL DRIVE |
| | TIRE TYPE | WINTER TIRE |
| | ⋮ | ⋮ |
| BODY | HEIGHT | 1520mm |
| | WIDTH | 1695mm |
| | LENGTH | 3750mm |
| | MINIMUM TURNING RADIUS | 4.7m |
| | GROUND CLEARANCE | 145mm |
| | ⋮ | ⋮ |
| FUEL | FUEL ECONOMY | 10.4km/L |
| | FUEL TYPE | REGULAR |
| | FUEL CAPACITY | 31.1L |
| | CRUISING DISTANCE | 323km |
| | FILLER OPENING | RIGHT |
| | ⋮ | ⋮ |
| INSURANCE | PERSONAL INJURY | UNLIMITED |
| | PROPERTY DAMAGE | 20,000,000 YEN |
| | INJURY ACCIDENT | 50,000,000 YEN |
| | COVERAGE | INSURED PERSON ONLY |
| | CONDITION | 26 OR OLDER |
| | ⋮ | ⋮ |
| ⋮ | ⋮ | ⋮ |

FIG. 10B
SECOND VEHICLE

| SPECIFICATION | | |
|---|---|---|
| DRIVE | BRAKE OPERABILITY | LEVEL 7 |
| | STEERING WHEEL OPERABILITY | LEVEL 6 |
| | DRIVING SYSTEM | FR |
| | TIRE TYPE | NORMAL TIRE |
| | ⋮ | ⋮ |
| BODY | HEIGHT | 1450mm |
| | WIDTH | 1895mm |
| | LENGTH | 4450mm |
| | MINIMUM TURNING RADIUS | 5.2m |
| | GROUND CLEARANCE | 150mm |
| | ⋮ | ⋮ |
| FUEL | FUEL ECONOMY | 7.6km/L |
| | FUEL TYPE | HIGH-OCTANE |
| | FUEL CAPACITY | 9.2L |
| | CRUISING DISTANCE | 70km |
| | FILLER OPENING | LEFT |
| | ⋮ | ⋮ |
| INSURANCE | PERSONAL INJURY | UNLIMITED |
| | PROPERTY DAMAGE | UNLIMITED |
| | INJURY ACCIDENT | 100,000,000 YEN |
| | COVERAGE | INSURED PERSON AND HIS OR HER FAMILY MEMBERS |
| | CONDITION | 21 OR OLDER |
| | ⋮ | ⋮ |
| ⋮ | ⋮ | ⋮ |

FIG. 14A

| SPECIFICATION | | CONDITION | DIFFERENCE | | DIFFERENCE NOTIFICATION | ADVICE |
|---|---|---|---|---|---|---|
| | | | FIRST VEHICLE | SECOND VEHICLE | | |
| DRIVING | BRAKE | INITIAL | UNSMOOTH | SMOOTH | SMOOTH BRAKE | BEWARE OF BRAKE OPERATION |
| | | INITIAL | SMOOTH | UNSMOOTH | UNSMOOTH BRAKE | BEWARE OF BRAKE OPERATION |
| | STEERING WHEEL | INITIAL | UNSMOOTH | SMOOTH | SMOOTH STEERING WHEEL | BEWARE OF STEERING WHEEL OPERATION |
| | | INITIAL | SMOOTH | UNSMOOTH | UNSMOOTH STEERING WHEEL | BEWARE OF STEERING WHEEL OPERATION |
| | DRIVING SYSTEM+ TIRE TYPE | INITIAL+ SNOW | FULL TIME 4WD+ WINTER TIRE | FR+ NORMAL TIRE | FR DRIVING SYSTEM AND NORMAL TIRE | BEWARE OF SNOWY ROAD |
| | | INITIAL+ SNOW | FULL TIME 4WD+ WINTER TIRE | FF+ NORMAL TIRE | FF DRIVING SYSTEM AND NORMAL TIRE | BEWARE OF SNOWY ROAD |
| | | ... | ... | ... | ... | ... |

FIG. 14B

| SPECIFICATION | | CONDITION | DIFFERENCE | | DIFFERENCE NOTIFICATION | ADVICE |
|---|---|---|---|---|---|---|
| | | | FIRST VEHICLE | SECOND VEHICLE | | |
| SAFETY | AIR BAG | INITIAL | AVAILABLE (DRIVER'S SEAT AND PASSENGER SEAT) | NOT AVAILABLE | NO AIR BAG EQUIPPED | TAKE EXTRA CARE |
| | | INITIAL | AVAILABLE (DRIVER'S SEAT AND PASSENGER SEAT) | AVAILABLE (DRIVER'S SEAT ONLY) | NO AIR BAG EQUIPPED FOR PASSENGER SEAT | TAKE EXTRA CARE |
| | | ... | ... | ... | ... | ... |
| | | INITIAL | NOT AVAILABLE | AVAILABLE (DRIVER'S SEAT AND PASSENGER SEAT) | AIR BAG EQUIPPED FOR DRIVER'S SEAT AND PASSENGER SEAT | (DESCRIPTION AND NOTES ON AIR BAG) |
| | ABS | INITIAL | AVAILABLE | NOT AVAILABLE | NO ABS EQUIPPED | BEWARE OF SNOWY ROAD |
| | | INITIAL | NOT AVAILABLE | AVAILABLE | ABS EQUIPPED | — |
| | NIGHT VISION | INITIAL | AVAILABLE | NOT AVAILABLE | NO NIGHT VISION EQUIPPED | BEWARE OF DRIVING AT NIGHT |
| | | INITIAL+ LOWER THAN SPECIFIED BRIGHTNESS | NOT AVAILABLE | AVAILABLE | NIGHT VISION EQUIPPED | EFFECTIVE FOR MOUNTAIN PATH AT NIGHT |
| | ... | ... | ... | ... | ... | ... |
| ... | | | | | | |

FIG. 17

| SPECIFICATION DIFFERENCE LIST ||
|---|---|
| SPECIFICATION | USUAL VEHICLE→ TODAY'S VEHICLE |
| AIR BAG FOR PASSENGER SEAT | AVAILABLE → NOT AVAILABLE |
| BACK MONITOR | AVAILABLE → NOT AVAILABLE |
| SONAR | NOT AVAILABLE→ AVAILABLE |
| TIRE TYPE | WINTER TIRE→ NORMAL TIRE |
| DRIVING SYSTEM | FULL TIME 4WD→FR |
| INSURANCE | COVERED→ NOT COVERED |
| ⋮ | ⋮ |

```
USUAL CAR: MODEL      FEBRUARY 4 (FORECAST: CLOUDY WITH
          NAME                      INTERMITTENT SNOW)
                      DESTINATION (DAISETSU MOUNTAIN)

FULL TIME 4WD, WINTER TIRE

THIS CAR: MODEL NAME
          FF, NORMAL TIRE

CAUTION AND ADVICE

BEWARE OF DRIVING ON SLIPPERY SNOWY ROAD
```

USUAL CAR: MODEL NAME  FEBRUARY 4 (FORECAST: CLOUDY WITH INTERMITTENT SNOW)

SAFETY BODY STRUCTURE;
AIR BAG: DRIVER'S SEAT AND PASSENGER SEAT
BRAKE: ABS

THIS CAR: MODEL NAME
FF, NORMAL TIRE

CAUTION AND ADVICE

NO AIR BAG FOR PASSENGER SEAT

USER ASSISTANCE SYSTEM FOR VEHICLE

CROSS REFERENCE TO RELATED APPLICATION

This application is based on and incorporates herein by reference Japanese Patent Applications No. 2006-144351 filed on May 24, 2006 and No. 2007-119325 filed on Apr. 27, 2007.

TECHNICAL FIELD

The invention relates to a user assistance system for vehicles.

BACKGROUND

In recent years, various devices are mounted on a vehicle. A certain control apparatus learns a driver's driving record or tendency and reflects the learning content on control over the devices. For example, discloses technology concerning a specific learning method.

Devices mounted on vehicles depend on types of vehicles or owners. When a driver drives a vehicle other than his or hers, for example, he or she is unaware of and cannot use a useful function not provided for his or her vehicle. When the other's vehicle does not have a function provided for the driver's vehicle, the driver may feel uncomfortable due to a difference between operational feelings on his or her own familiar vehicle and the other's.

SUMMARY

The present exemplary embodiment has been made in consideration of the foregoing. It is therefore desirable to provide a user assistance system for a vehicle that is capable of identifying a specification difference between a vehicle familiar to a driver and a different vehicle.

To achieve the above object, according to a first aspect of the present invention, a user assistance system for vehicle includes: a first identifying information acquisition unit that acquires first vehicle specification identifying information for identifying a first vehicle specification from a predetermined information delivery source; a second identifying information acquisition unit that acquires second vehicle specification identifying information for identifying a second vehicle specification from a predetermined information delivery source; a comparison unit that compares the acquired first vehicle specification identifying information with the acquired second vehicle specification identifying information; and a recognition support unit that performs a specification difference recognition support process based on a result of comparison made by the comparison unit between the first vehicle specification identifying information and the second vehicle specification identifying information, wherein the specification difference recognition support process allows a user to recognize a specification difference between the first and second vehicles when the user is common to the first and second vehicles and uses one of both vehicles.

The above-mentioned construction performs the specification difference recognition support process that allows a user to recognize a specification difference according to a result of comparing the contents of the first vehicle specification identifying information and the second vehicle specification identifying information. The first vehicle specification identifying information is used to identify a first vehicle specification.

The second vehicle specification identifying information is used to identify a second vehicle specification. The user can easily recognize a difference between the first vehicle specification and the second vehicle specification. The user can drive the vehicle in consideration for the difference in the other vehicle without being embarrassed at the difference.

According to a second aspect of the present invention, a user assistance system for vehicle in a vehicle communication system capable of communication between a portable information terminal and a vehicle includes: a first function list acquisition unit that is provided on a first vehicle and acquires first function list information indicating a content of a function installed on the first vehicle; a first function information transmission unit that is provided on a first vehicle and transmits acquired first function list information to the information terminal by means of communication; a first function list reception unit that is provided on the information terminal and receives first function list information; a first function list storage unit that is provided on the information terminal and stores received first function list information in a first function list storage unit; a function comparison unit that is provided on one of a second vehicle different from the first vehicle and the information terminal, acquires second function list information indicating a content of a function installed on the second vehicle, acquires first function list information stored in the first function list storage unit, and compares functions between the first vehicle and the second vehicle based on the acquired first and second function list information; and a difference recognition support unit that is provided on one of the second vehicle and the information terminal, acquires a functional difference between the first vehicle and the second vehicle based on a function comparison result, and performs a functional difference recognition support process for helping a user to recognize a functional difference.

According to the above-mentioned construction, the information terminal stores first function list information indicating a function installed on the first vehicle. When the information terminal is carried into the second vehicle, first function list information about the information terminal is compared with second function list information indicating a function installed on the second vehicle. A user can be notified of a functional difference between both vehicles. For example, a first vehicle specific function is available on the first vehicle, not on the second vehicle. Conversely, a second vehicle specific function is available on the second vehicle, not on the first vehicle. When the user is familiar with the first vehicle and drives the unfamiliar second vehicle, the system can stimulate the positive use of a more effective function unavailable on the first vehicle. When the second vehicle lacks a function, the system can notify the missing function. The user can more smoothly drive the second vehicle.

BRIEF DESCRIPTION OF THE DRAWINGS

The above and other objects, features, and advantages of the present invention will become more apparent from the following detailed description made with reference to the accompanying drawings. In the drawings:

FIG. 9A shows an example of first vehicle specification identifying information;

FIG. 9B shows an example of second vehicle specification identifying information;

FIG. 10A shows another example of first vehicle specification identifying information as differing from that in FIG. 9A;

FIG. 10B shows another example of second vehicle specification identifying information as differing from that in FIG. 9B;

FIGS. 14A and 14B show a notification data list;

FIG. 17 shows a specification difference list;

DETAILED DESCRIPTION OF THE PREFERRED EMBODIMENTS

Embodiments of the present invention will be described in further detail with reference to the accompanying drawings.

First Embodiment

Figure 1:
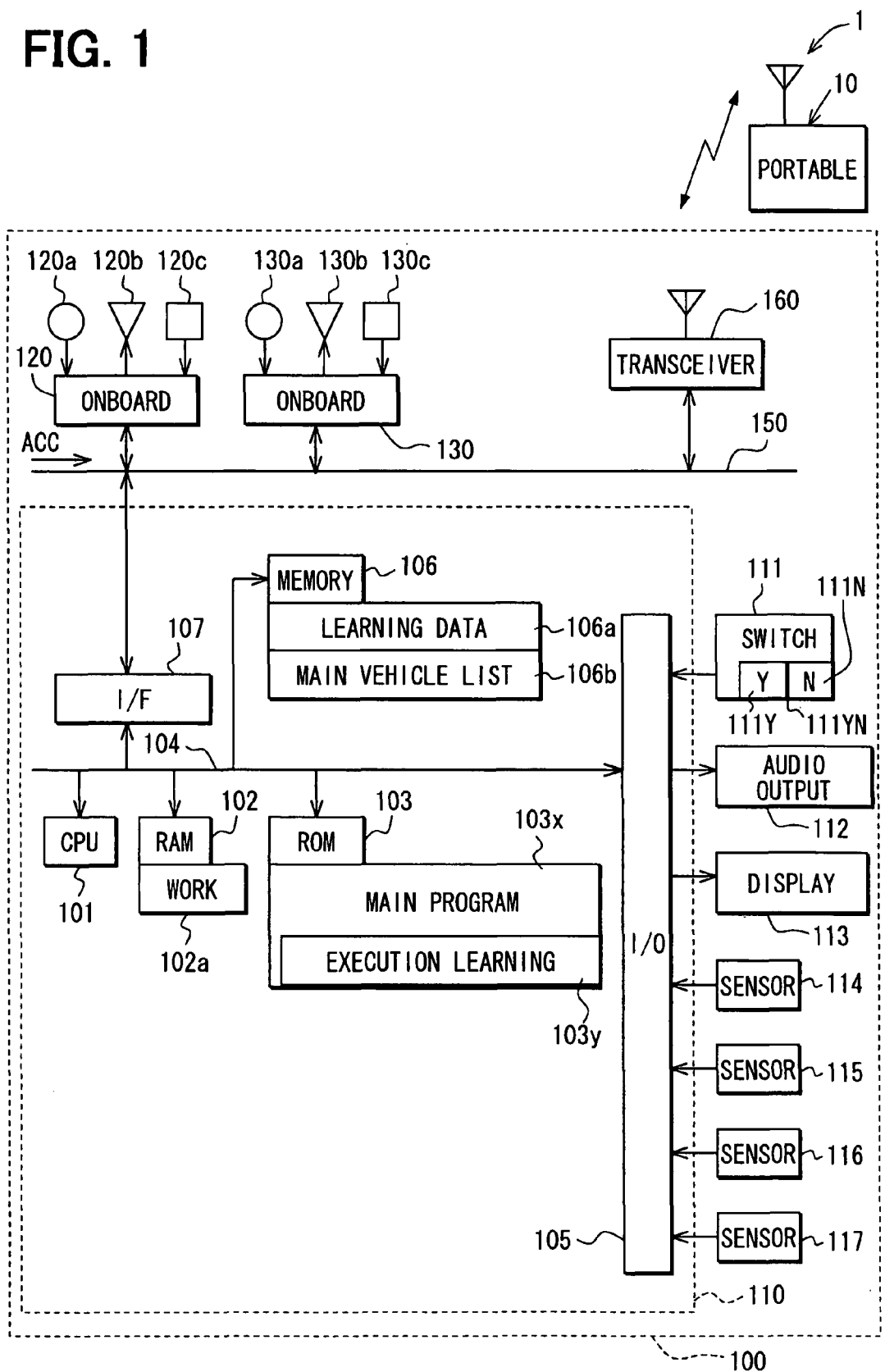
FIG. 1 is a block diagram of a main vehicle in a user assistance system for vehicle according to a first embodiment of the invention.
Figure 2:
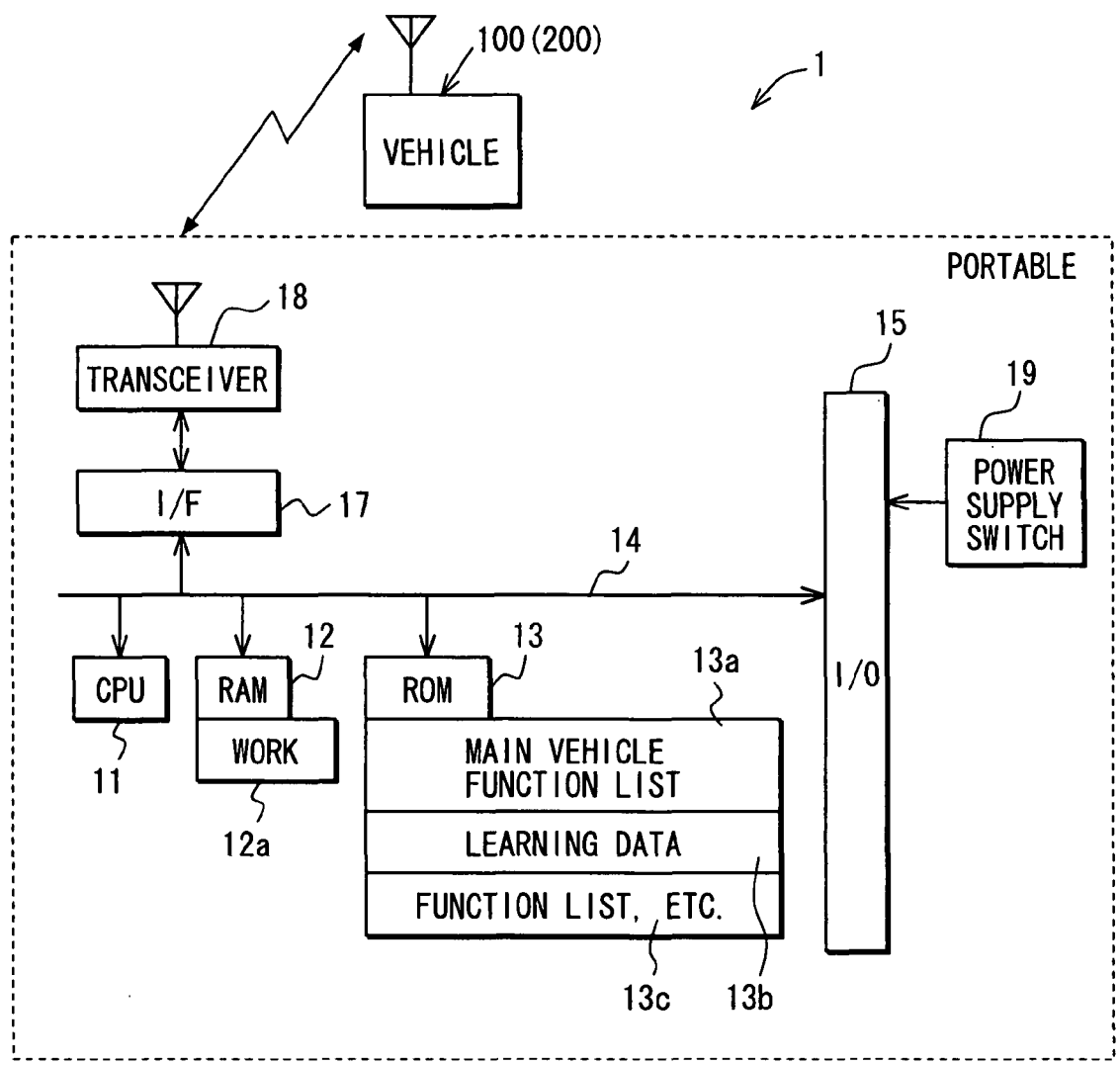
FIG. 2 is a block diagram of an information terminal of the user assistance system for vehicle according to the first embodiment of the invention.
Figure 3:
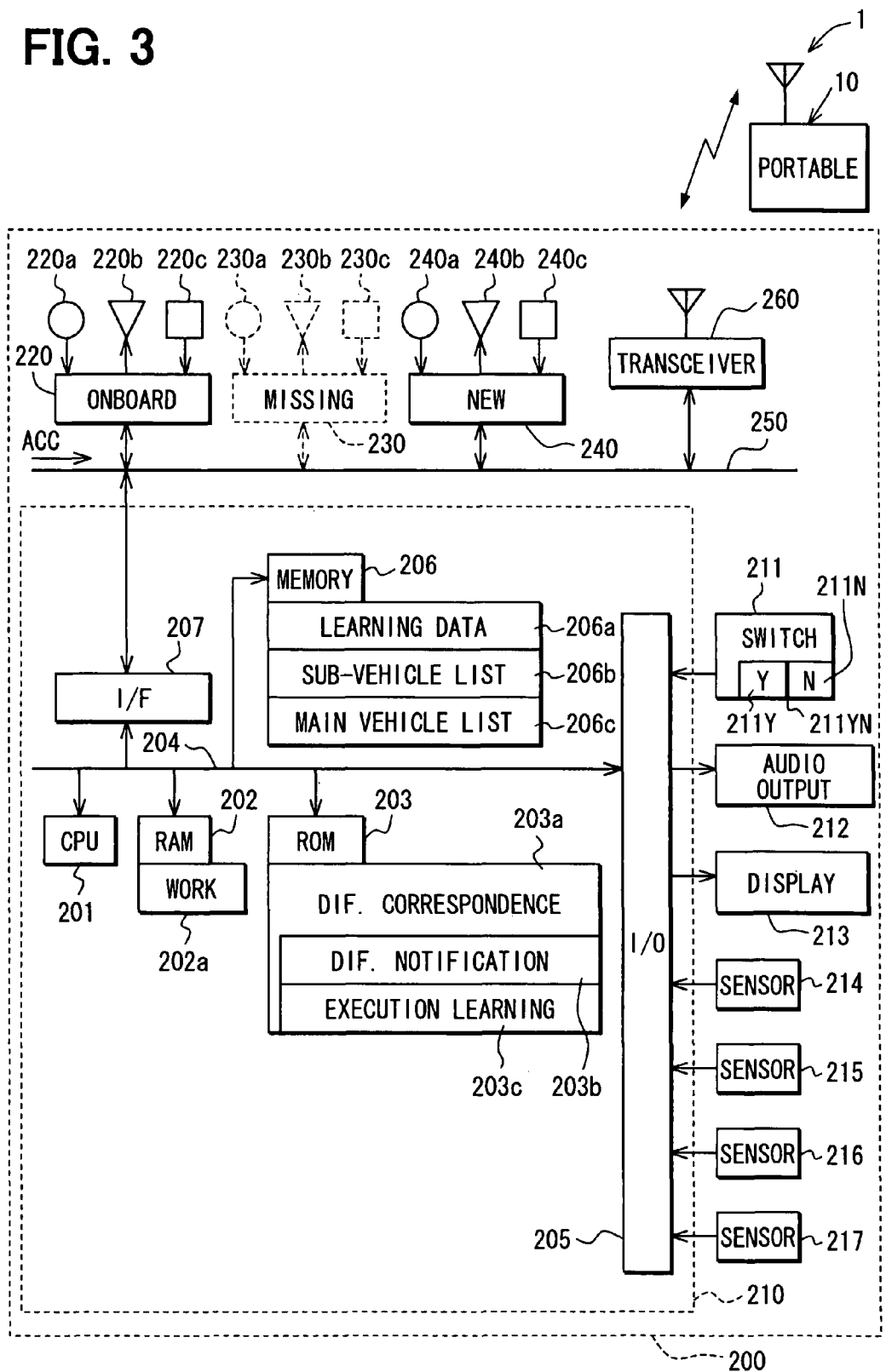
FIG. 3 is a block diagram of a sub vehicle in the user assistance system for vehicle according to the first embodiment of the invention.

FIGS. 1, 2, and 3 schematically show an electric block diagram of a vehicle communication system (user assistance system for vehicle) according to a first embodiment of the invention. A user assistance system for vehicle 1 shown in FIGS. 1, 2, and 3 includes a portable information terminal (wireless information terminal hereafter referred to as a portable unit) 10 and a vehicle 100 or 200 capable of wirelessly communicating with the portable unit 10. According to the embodiment, the vehicle 100 is familiar to a user owning the portable unit 10 and is hereafter referred to as a main vehicle. The vehicle 200 is unfamiliar to the user and is hereafter referred to as a sub vehicle. The invention allows the user having the portable unit (information relay means) 10 to recognize a functional difference between the familiar main vehicle 100 and the sub vehicle 200 the user attempts to drive.

The main vehicle (first vehicle) 100 is provided with onboard devices 120 and 130, and the other multiple device functions. The devices 120, 130, and so on are connected with a device management ECU 110 via a serial communication bus 150. The devices specifically include: an auto wiper (a function to drive a wiper based on a quantity of rain per unit time detected by a rain sensor); a light control system (a function to turn on a light based on an illuminance (light quantity) detected by an illuminance sensor); an air conditioner; a navigation system; a radio set; a door lock; an air cleaner; a night vision; an auto cruise; an ABS (Antilock Brake System); a stability control; and a back monitor. The device management ECU 110 can control these devices. These onboard devices connect with a sensor, an operation apparatus, and an actuator corresponding to the functions. For example, the onboard devices 120 and 130 connect with sensors 120a and 130a, operation apparatuses 120b and 130b, and actuators 120c and 130c. Some signals are detected by the sensors. The other signals indicate that the operation apparatuses are operated. These signals can be supplied to the devices such as the onboard devices 120 and 130 and the like, and the device management ECU 110 via the serial communication bus 150.

The device management ECU 110 is a control apparatus that controls management and execution of the onboard devices. As shown in FIG. 1, the device management ECU 110 includes: a CPU 101; RAM 102 having work memory 102a; ROM 103 for storing various programs; a bus line 104; an input/output unit (depicted as "I/O" in the drawing) 105; nonvolatile external memory 106 (nonvolatile memory such as EPROM); and a communication interface (depicted as "I/F" in the drawing) 107 connected to the serial communication bus 150 connected to the other ECU and the like. The input/output unit 105 connects with an operation switch group 111, an audio output unit 112, a display apparatus 113, and various sensors 114, 115, 116, and 117. The input/output unit 105 also connects with an engine ECU (not shown) via the communication interface 107 and the serial communication bus 150. In accordance with a key operation on the vehicle, the input/output unit 105 can receive ON/OFF signals for an ignition and accessories from the engine ECU.

The operation switch group 111 includes multiple operation units such as a mechanical switch provided in the vehicle, a touch switch integrated with the display apparatus 113, and a remote controller switch. The touch switch includes infrared sensors finely arranged in a matrix on a screen of the display apparatus 113. When a finger or a touch pen interrupts an infrared ray, for example, the interrupted position is detected as two-dimensional coordinate values (X, Y). It may be preferable to use a pointing device such as a mouse and a cursor. The operation switch group 111 can be used to supply various instructions to the onboard devices 120, 130, and the like. Further, a microphone and a speech recognition unit can be used to supply various instructions. When a speech signal is supplied from the microphone, the speech recognition unit processes the supplied signal using a known speech recognition technology such as a hidden Markov model and converts the signal into an operation command corresponding to a result.

The operation switch group 111 also includes a YES/NO instruction button 111YN that allows a user to issue a YES/NO instruction in response to a prompt from a function execution learning program 103y to be described later. The YES/NO instruction button 111YN includes a set of push buttons such as a YES button 111Y and a NO button 111N. The YES/NO instruction button 111YN turns on in interlock with activation of a position lamp. Alternatively, the YES/NO instruction button 111YN turns on for a specified time interval after the position lamp turns on and the audio output unit 112 outputs a prompt message. The set of instruction buttons 111YN is provided at a position convenient for a driver, e.g., on a steering wheel.

The display apparatus 113 is constructed as a known color liquid crystal display and includes a dot-matrix LCD (Liquid Crystal Display) and a driver circuit for controlling the LCD display. For example, the driver circuit uses an active matrix drive system capable of reliably turning on or off an intended pixel by providing each pixel with a transistor and performs a display process based on a display instruction and image data transmitted from ECU 110. In addition, the display apparatus 113 may use an organic EL (Electro Luminescence) display or a plasma display. When a navigation apparatus is provided, a display provided for the navigation apparatus may function as the display apparatus 113.

The audio output unit 112 is constructed as an audio output device including an amplifier and a speaker. The audio output unit 112 is provided with a known speech synthesis circuit. The ROM 103 or the external memory 106 stores digital speech data (not shown). The speech synthesis circuit converts the stored digital speech data into an analog audio that is then output from the audio output unit 112. Speech synthesis methods include: a recording and editing system that stores a speech waveform as is or in an encoded form and combines the stored speech waveforms as needed; and a text-to-speech system that synthesizes a speech corresponding to input character information.

The ROM 103 of the device management ECU 110 stores a main program 103x and a function execution learning program 103y. The main program 103x performs control processes concerning execution of functions of the onboard devices 120, 130, and so on. The function execution learning program 103y allows the external memory 106 to store history information (learning data) about provision of a trigger to start the function and an operation associated with the function execution. The main program 103x is executed by the CPU 101 and functions as first function list acquisition means and first function information transmission means. The function execution learning program 103y is executed by the CPU 101 and functions as first function execution means for executing a function of the main vehicle (first vehicle) and operation storage means.

The external memory 106 is a rewritable storage medium such as EEPROM. The external memory 106 uses a learning data storage unit 106a to store a prompt condition and an automatic execution condition as learning data. The learning data is stored according to devices such as the onboard devices 120, 130, and so on (or according to functions or controls when multiple functions are provided for a navigation apparatus) and according to users. The external memory 106 allows a main vehicle function list storage unit (first function list storage unit) 106b to store function list information about devices such as the onboard devices 120, 130, and so on for the main vehicle 100.

The prompt condition determines whether or not to perform a prompt control. The prompt control uses the audio output unit 112 to prompt a user whether or not to control the onboard devices 120, 130, and so on. The automatic execution condition determines whether or not to automatically control the onboard devices 120, 130, and so on (without prompt output control). A range of satisfying the prompt condition or the automatic execution condition is predetermined with respect to at least one piece of execution determination information. An example of the execution determination information is a detection value of a sensor connected to the onboard devices 120, 130, and so on or the device management ECU 110.

The device management ECU 110 connects with a transceiver 160 for wirelessly transmitting and receiving data via the serial communication bus 150. The device management ECU 110 can communicate with the portable unit 10. The transceiver 160 functions as wireless communication means for wirelessly outputting learning data (execution determination information such as the prompt condition and the automatic execution condition) stored in the external memory 16. The transceiver 160 is not limited to a wireless communication device and may be a wired communication device capable of outputting data by means of wired communication. For example, it may be preferable to connect a USB port as an input/output port to the device management ECU 110, transmit data stored in the external memory 16, and receive data from the portable unit 10.

As shown in FIG. 2, the portable unit 10 includes: a CPU 11; RAM 12 having work memory 12a; flash ROM 13 as nonvolatile memory for storing various programs; a bus line 14; an input/output unit (depicted as "I/O" in the drawing) 15; and an interface (depicted as "I/F" in the drawing) 17 connected to the transceiver 18. The input/output unit 15 connects with a power supply switch 19 as an operation unit for turning off the portable unit 10.

The flash ROM 13 includes: a main vehicle function data storage unit (first function list storage unit) 13a for storing function list information indicative of contents of the onboard devices for the main vehicle 100; a learning data storage unit 13b for storing learning data (execution determination information such as the prompt condition and the automatic execution condition) for the main vehicle according to devices (or according to functions or controls) and according to users; and a function list and learning data transmission/reception program 13c for transmitting and receiving function list information and learning data to and from the vehicle via the transceiver 18. The function list and learning data transmission/reception program 13c is executed by the CPU 11 and functions as first function list reception means and first function list storage means.

When a user drives a sub vehicle while carrying the portable unit 10, the invention enables the user to recognize a functional difference from the main vehicle 100. As shown in FIG. 3, the sub vehicle 200 according to the invention includes not only an onboard device (common device) 220 also mounted on the main vehicle 100 but also an onboard device (second specific device) not mounted on the main vehicle and the other device functions. These devices are connected with the device management ECU 210 via the serial communication bus 250.

The sub vehicle 200 includes onboard devices such as an auto wiper; a light control system; an air conditioner; a navigation system; a radio set; a door lock; an air cleaner; a night vision; an auto cruise; a stability control; and a sonar. The device management ECU 210 controls these functions.

The device management ECU 210 for the sub vehicle 200 is constructed similarly to the device management ECU 110 for the main vehicle 100. The device management ECU 210 includes: a CPU 201; RAM 202; ROM 203; a bus line 204; an input/output unit 205; and external memory 206 (nonvolatile memory). The input/output unit 105 connects with an operation switch group 211, an audio output unit 212, a display apparatus 213, and various sensors 214, 215, 216, and 217. Similarly to the device management ECU 110, the device management ECU 210 is connected to the serial communication bus 250 via a communication interface 207. The device management ECU 210 is communicably connected to various devices such as onboard devices 220, 240, and so on, a transceiver 260 enabling wireless communication with the portable unit 10, and another vehicle ECU (engine ECU and the like).

The ROM 203 stores a functional difference control program 203a, a functional difference notification program 203b, and a function execution program 203c. The functional difference control program 203a acquires function list information about the main vehicle stored in the portable unit 10. The functional difference control program 203a compares the acquired function list information about the main vehicle with function list information indicative of contents of the onboard devices for the sub vehicle 200 itself. The functional difference control program 203a allows the user to recognize a functional difference and performs functions of the sub vehicle 200. The functional difference notification program 203b actually calculates a functional difference and provides notification to the user. The function execution program 203c actually executes the function.

The functional difference control program 203a is executed by the CPU 201 and functions as function comparison means (or specification comparison means). The functional difference notification program 203b is executed by the CPU 201 and functions as difference recognition support means (difference notification means for notifying presence of a difference, second function specification means, second vehicle function notification means for notifying a second vehicle function, first function specification means, and second function notification means for notifying a first vehicle function), operation guidance notification means for performing an operation guidance notification process (to be described), an alternative function specification function, and an alternative function notification function. The function execution program 203c is executed by the CPU 201 and functions as second function execution means (first function execution means for executing a first function and second function execution means for executing a second function of sub vehicle specific functions (second vehicle functions) to be described) and operation guidance determination means.

The external memory 206 includes a learning data storage unit (operation storage unit) 206a, a sub vehicle function list storage unit (second function list storage unit) 206b, and a main vehicle function list storage unit (first function list storage unit) 206c. The learning data storage unit 206a stores learning data (execution determination information such as the prompt condition and the automatic execution condition) about the other vehicle received from the portable unit 10. The sub vehicle function list storage unit 206b stores function list information about devices such as the onboard devices 220, 240, and so on for the sub vehicle 200 itself. The main vehicle function list storage unit 206c stores function list information about the other vehicle (main vehicle) received from the portable unit 10. The external memory 206 stores prompt data and notification data (digital speech data), as will be described, correspondingly to each function contained in the function list information about the sub vehicle. The external memory 206 further stores alternative function information (equivalent function information), as will be described, correspondingly to each of the functions. That is, the external memory 206 also functions as a prompt data storage unit, a notification data storage unit, and an equivalent function information storage unit (alternative function information storage unit).

When a user carrying the portable unit 10 leaves the main vehicle 100, the vehicle communication system 1 according to the invention allows the portable unit 10 to store the most recent learning data about the main vehicle 100. When the user carrying the portable unit 10 gets in the sub vehicle 200, the sub vehicle 200 acquires the function list information and the learning data about the main vehicle 100 stored in the portable unit 10. The sub vehicle 200 notifies the user of a functional difference from the main vehicle 100. The second vehicle 200 performs its corresponding function based on the acquired learning data.

The main vehicle 100 transmits and receives learning data to and from the portable unit 10. To do this, the CPU 101 on the main vehicle 100 executes the main program 103x. The CPU 11 on the portable unit 10 executes the function list and learning data transmission/reception program 13c. The following describes processes of the programs 103a and 13c with reference to a flowchart in FIG. 4.

The main program 103x on the main vehicle 100 starts based on vehicle start control. The vehicle start control includes the vehicle's engine start control by means of a key operation such as turning on an ignition or an accessory. The vehicle start control also includes authentication as a precondition for the vehicle's engine start control. For example, the authentication signifies ID authentication using an immobilizer or detection of a driver's final posture based on a signal from a final postural sensor (not shown) at a driver's seat. According to the embodiment, the main program 103x starts based on an operation of turning on the accessory as a key operation concerning the engine start. The function list and learning data transmission/reception program 13c on the portable unit 10 starts based on an operation of turning on the power supply switch 19 of the portable unit 10.

At Step S101, the main program 103x on the main vehicle 100 recognizes a driver as a user. Specifically, the display apparatus 113 displays one or more user names stored in the external memory 106. The audio output unit 112 outputs a message for selecting an intended user name from the displayed ones. The user operates a specified operation unit of the operation switch group 111 to select the intended user name that is then identified. The external memory 106, the display apparatus 113, the operation switch group 111, the display apparatus 113, and the device management ECU 110 constitute driver identification means. Differently from the embodiment, known biometric means may be used as the driver identification means in such a manner as to identify a driver based on image recognition of a captured driver image or based on a speech uttered from the driver.

At Step S102, the main program 103$x$ executes functions of the onboard devices 120, 130, and so on mounted on the main vehicle 100. Specifically, the function execution learning program 103$y$ is executed. A flow of the function execution learning program 103$y$ will now be described with reference to FIG. 5.

The function execution learning program 103$y$ is individually executed for each of the onboard devices 120, 130, and so on. At Step S121, the program 103$y$ acquires execution determination information. As mentioned above, the execution determination information is preconfigured for each of the onboard devices 120, 130, and so on or each of the functions. Step S121 is used to acquire types of execution determination information needed for the onboard devices 120, 130, and so on connected via the serial communication bus 150.

At Step S122, the program 103$y$ determines whether or not there is a possibility of controlling the onboard devices 120, 130, and so on. Specifically, this step determines whether or not the execution determination information acquired at Step S121 satisfies one of the prompt condition and the automatic execution condition stored according to users and onboard devices. When the automatic execution condition is satisfied, the onboard device needs to be controlled without needing to prompt the user. When the prompt condition is satisfied, the user may need to control the onboard device.

Some devices such as a wiper and a headlight that, once controlled, continue the on-state until re-controlled thereafter. The determination at Step S122 includes the current on-state for such devices. For example, the automatic execution condition may be satisfied for a wiper that is already operating. In such case, the determination at Step S122 is denied because there is no need for control.

When the determination at Step S122 yields an affirmative result, the program 103$y$ determines at Step S123 whether or not the prompt condition or the automatic execution condition is satisfied. Step S123 is configured to determine one of the prompt condition and the automatic execution condition. The prompt condition and the automatic execution condition are predetermined so as not to overlap with each other for enabling the determination at Step S123.

When the automatic execution condition is satisfied, the determination at Step S123 yields a negative result. The program 103$y$ proceeds to Step S124 and performs specified control such as driving the wiper. There may be some predetermined controls whose execution is not or hardly recognizable to a driver. Examples include changing an air conditioner mode (from cooling to dry and vice versa), operating a door lock, changing a headlight angle, and operating an air cleaner. In such case, the audio output unit 112 notifies at Step S124 that the control is performed. The driver can certainly notice that the control is performed. When the control is unintended, the driver can retry the operation.

When the determination at Step S123 yields an affirmative result, i.e., when the prompt condition is satisfied, the program 103$y$ determines at Step S125 whether or not a prompt disabling condition is satisfied. The prompt disabling condition is predetermined as a condition for the driver to concentrate on driving operations. The prompt disabling condition includes: (1) a steering angle is greater than or equal to a specified angle needed for a continuous steering operation (i.e., the vehicle is turned); (2) an acceleration is greater than or equal to a specified acceleration signifying a sudden acceleration (e.g., using a throttle angle for determination); (3) a yaw rate is greater than or equal to a specified value (same determination as (1) above); (4) a vehicle position is detected by the GPS or the like to be found in an intersection; and (5) a brake is operated.

When the prompt disabling condition is satisfied, the routine terminates. When the prompt disabling condition is not satisfied and the determination at Step S125 yields a negative result, the program 103$y$ proceeds to Step S126 and allows the audio output unit 112 to output a specified prompt message. The prompt message is predetermined correspondingly to types of the onboard devices 120, 130, and so on and is configured to request one of the affirmative and negative responses. When the onboard device is a wiper, for example, the prompt message may be "Start wiper?" Steps S121 through S123, S125, and S126 are equivalent to the prompt output control.

After Step S126, the program 103$y$ determines at Step S127 whether or not the prompt is acknowledged. This step determines whether or not the YES button 111Y (FIG. 1) is pressed within a specified time interval after execution of Step S126.

When the YES button 111Y is pressed within the specified time interval, the determination at Step S127 yields an affirmative result. At Step S128, the program 103$y$ performs the control corresponding to the prompt content. At Step S129, the program 103$y$ determines whether or not a passenger re-operates the device controlled at Step S128 or S124 within a relatively short predetermined time interval after completion of Step S128 or S124.

When the determination at Step S129 yields an affirmative result, i.e., when the driver's operation changes the control content performed by the program 103$y$, the program 103$y$ learns the prompt condition and the automatic execution condition at Step S130.

At Step S130, the program 103$y$ determines which of multiple classified ranges covers the execution determination information acquired at Step S121. There may be multiple types of execution determination information for the onboard devices 120, 130, and so on. In such case, the program 103$y$ determines to which range the execution determination information acquired at Step S121 for each type belongs. When the same range is determined for all types of the execution determination information, the program 103$y$ assumes that the execution determination information belongs to the same range.

When Step S130 is performed via Step S124, i.e., when the control is performed without a prompt, the program 103$y$ broadens the prompt condition so as to cover the determined range and narrows the automatic execution condition. In this manner, the control is not performed under the same condition later and a prompt message will be output. It is possible to prevent the driver from feeling uncomfortable due to performance of an unnecessary control.

When Step S130 is performed via Step S128, the control content is considered to differ from that intended by the driver. The program 103$y$ changes the control content configured to be performed within the determined range to the control content after the re-operation.

When the determination at Step S129 yields a negative result, i.e., when no re-operation is performed, the program 103$y$ also learns the prompt condition and the automatic execution condition. However, the learning content differs from that at Step S130. At Step S131 similarly to Step S130, the program 103y determines which of multiple classified ranges covers the execution determination information acquired at Step S121. The program 103y increments by one a total (initially 0) of the determined ranges. When the total results in greater than or equal to a specified positive condition change value, this signifies that the driver affirmatively responded to the prompt more than once within the same range of the execution determination information. It can be considered that the driver surely wishes the control to be performed under this condition (i.e., within the same range of the execution determination information). When the total becomes greater than or equal to the positive condition change value, the program 103y narrows the prompt condition and broadens the automatic execution condition so that the range is included in the automatic execution condition.

When it is determined at Step S127 that the NO button 111N is pressed or neither the YES button 111Y nor the NO button 111N is pressed within a specified time interval, the determination at Step S127 yields a negative result.

When the determination at Step S127 yields a negative result, the program 103y also performs the learning at Step S132. Also at Step S132 similarly to Steps S130 and S131, the program 103y determines which of multiple classified ranges covers the execution determination information acquired at Step S121. The program 103y decrements a total (initially 0) of the determined ranges by a value (e.g., three) greater than the increment (i.e., one) at Step S131. Using a larger decrement than an increment prevents the automatic execution condition from easily widening and the prompt condition from easily narrowing. However, there is a high probability that the driver intends to control the widened range of automatic execution condition. This decreases the probability of automatically controlling the onboard devices 120, 130, and so on when the control is unneeded.

When decrementing the total results in smaller than or equal to a specified negative condition change value, this signifies that the driver negatively responded to the prompt more than once within the same range of the execution determination information. It can be considered that the driver surely does not wish the control to be performed under this condition (i.e., within the same range of the execution determination information). When the total becomes greater than or equal to the negative condition change value, the program 103y narrows the prompt condition so that the range is not included in the automatic execution condition and the automatic execution condition.

When the determination at Step S122 yields a negative result, i.e., when the execution determination information acquired at Step S121 satisfies neither the prompt condition nor the automatic execution condition, the program 103y determines at Step S130 whether or not the onboard devices 120, 130, and so on are operated manually. When the determination yields a negative result, the routine terminates. When the determination yields an affirmative result, the program 103y proceeds to Step S134 and performs the learning.

At Step S134 similarly to Steps S130, S131, and S132, the program 103y determines which of multiple classified ranges covers the execution determination information acquired at Step S121. The program 103y widens the prompt condition so as to cover the determined range.

When Steps S130, S131, S132, and S134 are complete, the program 103y stores or updates the learnt result in the learning data storage unit 106a of the external memory 106 correspondingly to the current user at S135.

As mentioned above, the routine in FIG. 5 is executed repeatedly. At Steps S131 and S132, the routine repeatedly learns the result of the driver's response to the prompt at Step S126. As a result, the prompt condition gradually narrows and the automatic execution condition gradually widens. The frequency of prompts gradually decreases and therefore gradually decreases chances of making the driver feel uncomfortable due to the prompt. In addition, there is an increasing probability that the onboard device is automatically controlled when needed.

Initially, repeating only the learning at Step S131 and 132 does not incorporate a condition outside the prompt condition into the automatic execution condition. When a manual operation is performed with no prompt issued, the learning is performed at Step S134 to widen the prompt condition. Repeating the learning at Step S131 and 132 may incorporate part of the condition widened at Step S134 into the automatic execution condition. Even though the initial prompt condition is not strictly defined, the learning can gradually widen the automatic execution condition.

Since the learning at Steps S131 and S132 uses the decrement larger than the increment, the automatic execution condition does not widen easily. As a result, it is possible to restrain a control unintended by the driver from being performed. In addition, when a re-operation changes or cancels the performed control, the function execution learning program 103y learns the control content at Step S130. This further decreases the probability of performing the control unintended by the driver.

When the prompt condition is satisfied, the function execution learning program 103y prompts the driver whether or not to control the onboard device before controlling the onboard devices 120, 130, and so on. It is possible to decrease the probability of automatically controlling the onboard devices 120, 130, and so on though unneeded. The prompt is generated only when the prompt condition is satisfied. It is possible to decrease the probability of making the driver feel uncomfortable. When the automatic execution condition is satisfied, the program 103y automatically controls the onboard devices 120, 130, and so on without generating the prompt. It is possible to ensure the probability of performing the automatic control when needed.

Figure 4:
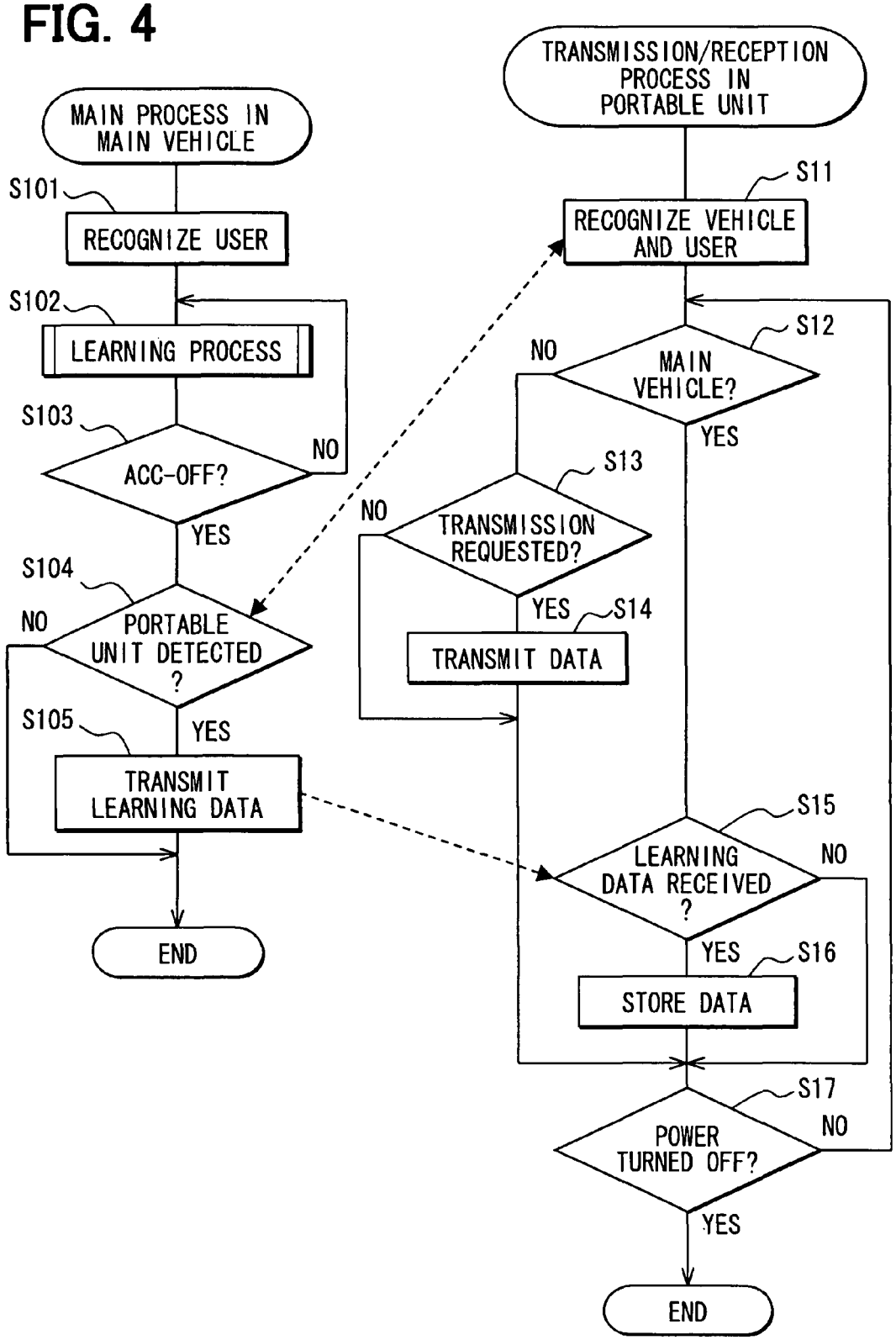
FIG. 4 is a flowchart showing a main process on the main vehicle and a transmission/reception process on the portable unit.

Returning to the main program 103x in FIG. 4, as mentioned above, the function execution learning program 103y on the main vehicle 100 is performed at Step S102. The program 103y is repeatedly performed at a repetitive cycle specified for a relatively short time period until vehicle stop control. The vehicle stop control includes the vehicle's engine stop control by means of a key operation such as turning off the ignition or the accessory. The vehicle stop control also includes an operation or a process based on the engine stop control as a precondition. For example, the process signifies detection of a driver's non-final posture based on a signal from the final postural sensor (not shown) at the driver's seat. According to the embodiment, the program 103y terminates based on an operation of turning off the accessory as a key operation concerning the engine stop at Step S103.

When the accessory is turned off, the main program 103x proceeds to Step S104 and detects the portable unit 10. Specifically, the main program 103x transmits user identification information about a user recognized at Step S101 and vehicle identification information for specifying the vehicle 100 to the portable unit 10. The main program 103x detects whether or not the portable unit 10 returns predetermined response data. When response data is detected, the main program 103x proceeds to Step S105 and transmits learning data stored in the learning data storage unit 106a of the external memory 106 to the portable unit 10.

At this time, the main vehicle 100 may acquire its own most recent function list information and transmit it together with learning data to the portable unit 10. Specifically, the device management ECU 110 transmits a confirmation signal for confirming connection and startup states of various onboard devices (or their functions) connected to the serial communication bus 150. The device management ECU 110 creates a most recent function list based on a response signal to the confirmation signal and transmits the function list to the portable unit 10. In this case, it is unnecessary to use the main vehicle function list storage unit 106b of the external memory 106.

At Step S11 on the portable unit 10, the program 13c receives the user identification information and the vehicle identification information. At Step S12, the program 13c determines whether or not a vehicle specified by the received vehicle identification information is equivalent to the main vehicle of the user specified by the received user identification information. When the main vehicle is identified, the program 13c awaits reception of learning data transmitted from the vehicle 100. At Step S15, the program 13c receives the transmitted learning data. At Step S16, the program 13c overwrites data in the learning data storage unit 13b of the flash ROM 13 with the received data for update corresponding to the user ID. The program 13c terminates when the power supply switch 19 of the portable unit 10 is turned off. When the main program 103x on the main vehicle transmits a main vehicle function list for the portable unit 10 at Step S105, the program 13c also receives this list at Step S15. At Step S16, the program 13c overwrites data stored in the main vehicle function list storage unit 13a with the received main vehicle function list for update.

On the main vehicle 100, the program 103x terminates when it finishes transmitting the learning data and the function list information to the portable unit 10. When the portable unit 10 is not detected at Step S104, the program 103x terminates without transmitting the learning data.

In this manner, the portable unit 10 stores the learning data about the main vehicle when the driver leaves the vehicle. The driver can own the last updated learning data.

Figure 6:
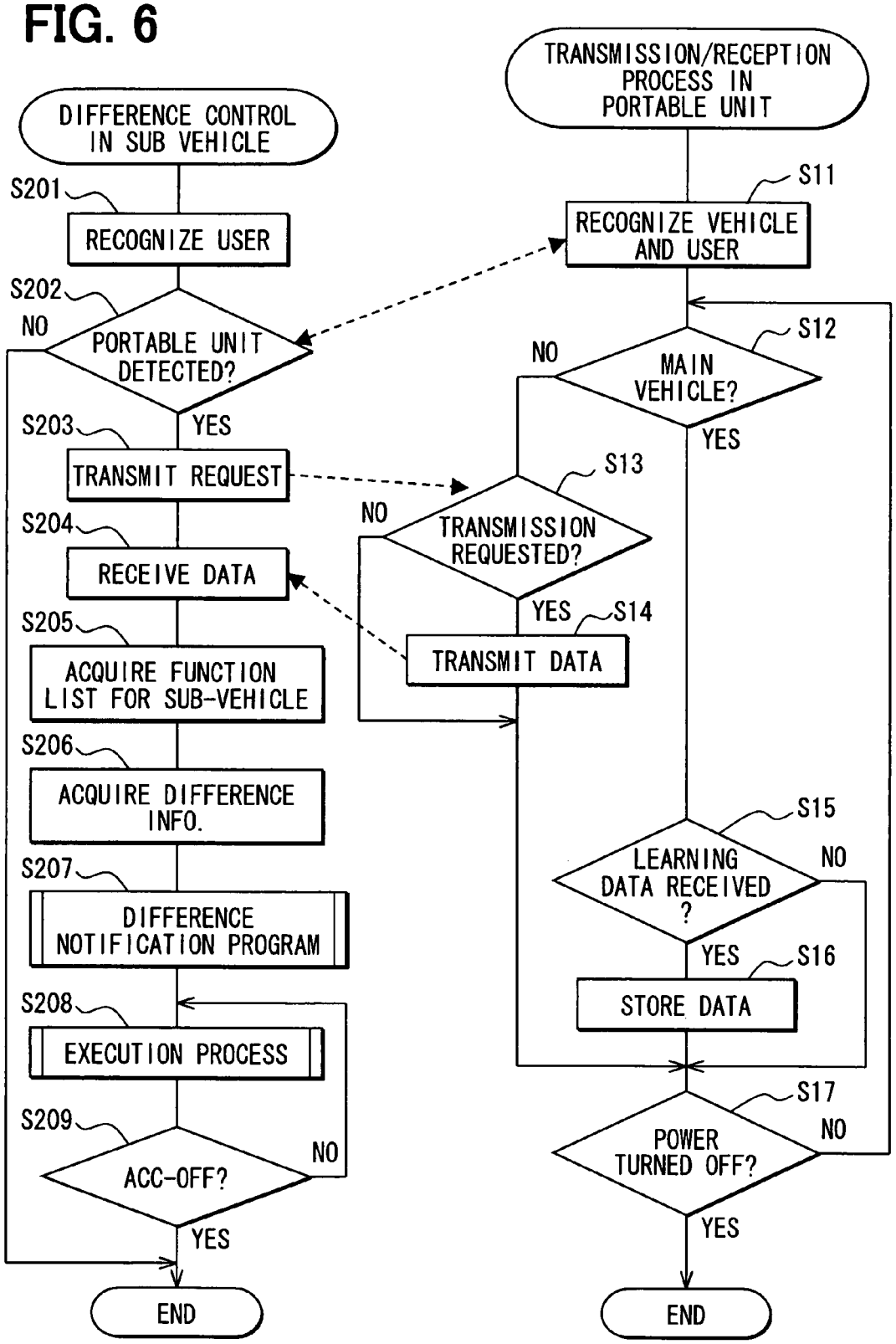
FIG. 6 is a flowchart showing a function difference control process on the sub vehicle and a transmission/reception process on the portable unit.

The following describes processes of transmitting the function list information and the learning data about the main vehicle 100 from the portable unit 10 to the sub vehicle 200, receiving these pieces of data on the sub vehicle, and notifying a functional difference between the main vehicle 100 and the sub vehicle 200 from the sub vehicle 200. To perform these processes, the CPU 201 on the sub vehicle 200 performs the functional difference control program 203a and the CPU 11 on the portable unit 10 performs the function list and learning data transmission/reception program 13c. The following describes a flow of processes in the programs 203a and 13c with reference to a flowchart in FIG. 6.

Similarly to the main program 103x on the main vehicle 100, the functional difference control program 203a on the sub vehicle 200 starts based on the vehicle start control. According to the embodiment, similarly to the main program 103x, the program 203a starts based on an operation of turning on the accessory as a key operation concerning the engine start. The function list and learning data transmission/reception program 13c on the portable unit 10 starts based on an operation of turning on the power supply switch 19 of the portable unit 10.

At Step S201, the functional difference control program 203a on the sub vehicle 200 recognizes a driver as a user. The specific process is equivalent to Step S101 in the main program 103x on the main vehicle 100. The external memory 206, an operation switch group 221, the display apparatus 213, and the device management ECU 210 construct the driver identification means. Similarly to the main program 103x, known biometric means may be used instead of the embodiment as the driver identification means in such a manner as to identify a driver based on image recognition of a captured driver image or based on a speech uttered from the driver.

The program 203a proceeds to Step S202 and detects the portable unit 10. This step is also similar to Step S104 in the main program 103x on the main vehicle 100. The program 203a transmits user identification information about the user recognized at Step S201 and vehicle identification information for specifying the vehicle 200 to the portable unit 10. The program 203a detects whether or not the portable unit 10 returns predetermined response data. When response data is detected, the program 203a proceeds to Step S203 and transmits a transmission request to the portable unit 10. The transmission request allows the portable unit 10 to transmit function list information about the main vehicle (vehicle 100 according to the embodiment) familiar to the user recognized at Step S201 and learning data corresponding to the user and the main vehicle.

On the portable unit 10, the program 13c receives the user identification information and the vehicle identification information at Step S11. At Step S12, the program 13c determines whether or not a vehicle specified by the received vehicle identification information is equivalent to the main vehicle of the user specified by the received user identification information. When the main vehicle is not determined, the program 13c proceeds to Step S13 and determines whether or not to receive the transmission request transmitted from the sub vehicle 200 at Step S203. When receiving the transmission request, the program 13c proceeds to Step S14 and transmits the requested function list information and learning data. The program 13c on the portable unit 10 terminates when the power supply switch 19 is turned off.

On the sub vehicle 200, the program 203a proceeds to Step S204 and receives, from the portable unit 10, the function list information and the learning data about the main vehicle 100. The learning data storage unit 206a stores the received learning data about the main vehicle 100. The main vehicle function list storage unit 206c stores the received function list information about the main vehicle 100.

At Step S205, the program 203a acquires function list information indicative of function contents of the onboard devices 220, 240, and so on for the sub vehicle 200. To acquire the function list information about the sub vehicle 200, the program 203a reads function list information stored in the sub vehicle function list storage unit 206b of the external memory 206. There may be an alternative to acquiring the function list information about the sub vehicle 200. The device management ECU 210 transmits a confirmation signal for confirming connection and startup states of various onboard devices (or their functions) to the serial communication bus 250. The device management ECU 210 creates a most recent function list based on a response signal to the confirmation signal. In this case, it is unnecessary to use the sub vehicle function list storage unit 206b of the external memory 206.

At Step S206, the program 203a generates functional difference information by comparing the function list information about the main vehicle 100 acquired at Step S204 with the function list information about the sub vehicle 200 acquired at Step S205. Specifically, the program 203a finds a function matching the functions listed in the function list information about the sub vehicle 200 and selects the matching function from the functions listed in the function list information about the main vehicle 100. The program 203a stores a mismatched function as a sub vehicle specific function (new function or second vehicle function) in a specified storage area of the RAM 202. A mismatched main vehicle specific function may be contained in the functions listed in the function list information about the main vehicle 100. The program 203a stores the mismatched main vehicle specific function as a missing function or a first vehicle function in a specified storage area of the RAM 202. The sub vehicle specific function and the main vehicle specific function are equivalent to the functional difference information.

Figure 7:
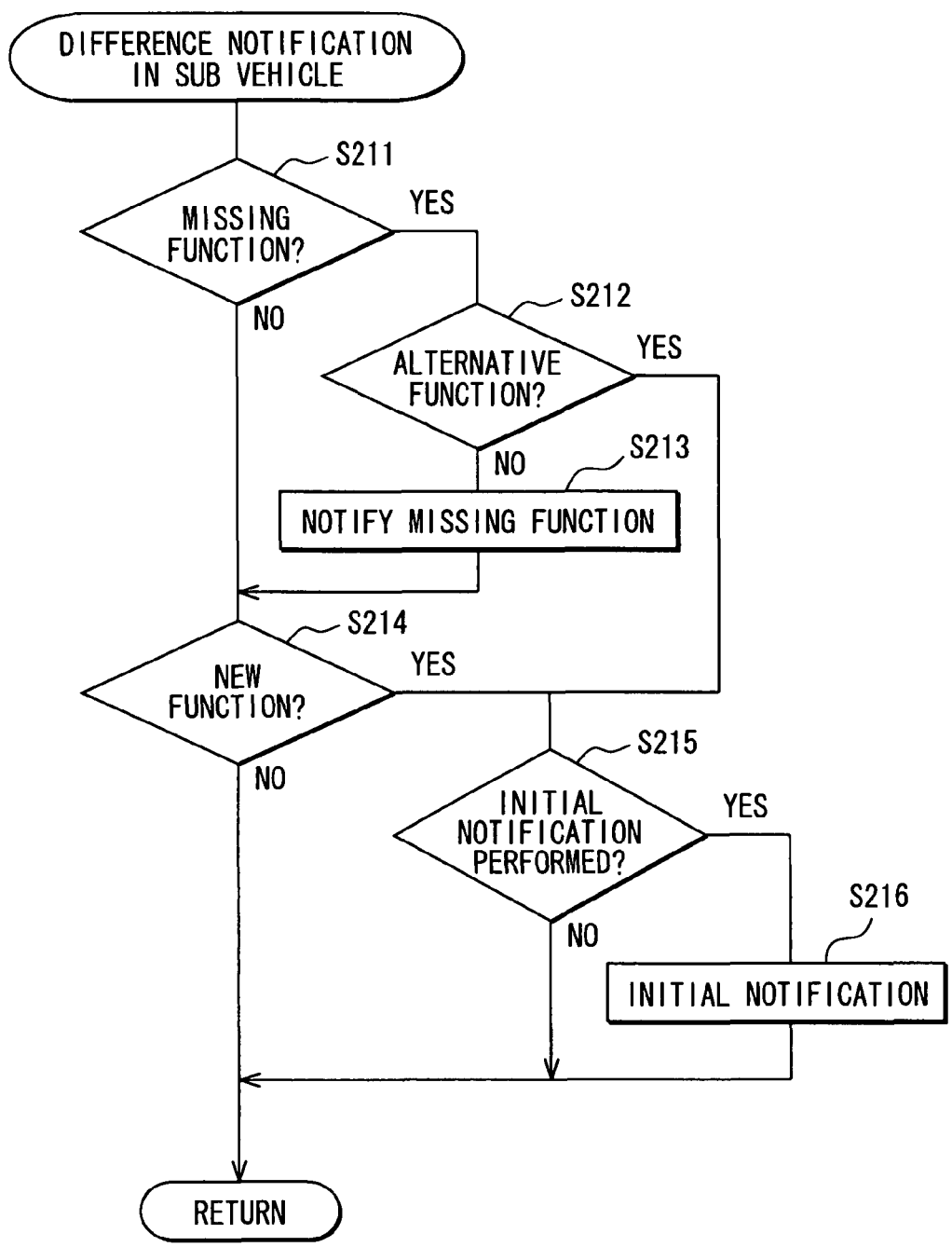
FIG. 7 is a flowchart showing a function difference notification process on the sub vehicle.

At Step S207, the program 203a notifies the functional difference information. Specifically, the program 203a executes the functional difference notification program 203b. The following describes a process of the functional difference notification program 203b with reference to FIG. 7.

At Step S211, the program 203b determines whether or not there is the main vehicle specific function (missing function). When the main vehicle specific function is unavailable, the program 203b proceeds to Step S214. When the main vehicle specific function is available, the program 203b proceeds to Step S212 and determines whether or not there is available an alternative function fully or at least partly equivalent to the main vehicle specific function. Specifically, the function list information about the sub vehicle 200 contains alternative function information (equivalent function information) indicating an alternative function (equivalent function) that corresponds to at least part of functions installed on the sub vehicle 200 and is not installed on it. The program 203b detects an alternative function for the main vehicle specific function (missing function) based on the alternative function information. When the alternative function is available, the program 203b proceeds to Step S215. When the alternative function is unavailable, the program 203b proceeds to Step S213 and audibly notifies availability of the main vehicle specific function (missing function) and the associated warning information. For example, the audio output unit 112 audibly generates the notification having such contents as "No ABS equipped for this car. Slow down." The notification data concerning the main vehicle specific function is stored correspondingly to the functions contained in the function list information about the sub vehicle 200. Reading the notification data performs the corresponding function.

At Step S214, the program 203b determines whether or not there is available the sub vehicle specific function (new function or second vehicle function). When the sub vehicle specific function is unavailable, the program 203b terminates and proceeds to Step S208 in FIG. 7. When the sub vehicle specific function is available, the program 203b proceeds to Step S215.

At Step S215, the program 203b determines whether or not to perform an initial notification for each of the sub vehicle specific function and the alternative function detected at Steps S212 and S214. The initial notification notifies availability of the sub vehicle specific function or the alternative function and information about these functions before the user (driver) starts driving. Specifically, the functions contained in the function list information about the sub vehicle store the associated notification timing information that settles to perform the initial notification or advance notification before performing the function. The program 203b acquires the notification timing information about the detected sub vehicle specific function or alternative function from the function list information about the sub vehicle 200. When the detected sub vehicle specific function or alternative function contains no function for the initial notification, the program 203b terminates and proceeds to Step S208 in FIG. 7. When a function for the initial notification is available, the program 203b proceeds to Step S216 and starts the initial notification for the function.

At Step S216, the program 203b notifies availability of the sub vehicle specific function or the alternative function settled to perform the initial notification and information about these functions. The information about the sub vehicle specific function or the alternative function includes description about contents of the functions and description about how to use the functions. For example, the audio output unit 112 audibly notifies the following: "The vehicle can display a night vision image for improving forward visibility in darkness. When using it, operate the indicated device."; or "The vehicle is equipped with a sonar (clearance sonar and back sonar) instead of a back monitor. Pay attention to a sonar sound while driving." The notification data concerning the sub vehicle specific function and the alternative function is stored correspondingly to the functions contained in the function list information about the sub vehicle 200. Reading the notification data performs the corresponding function. Terminating the initial notification also terminates the program 203b.

Figure 8:
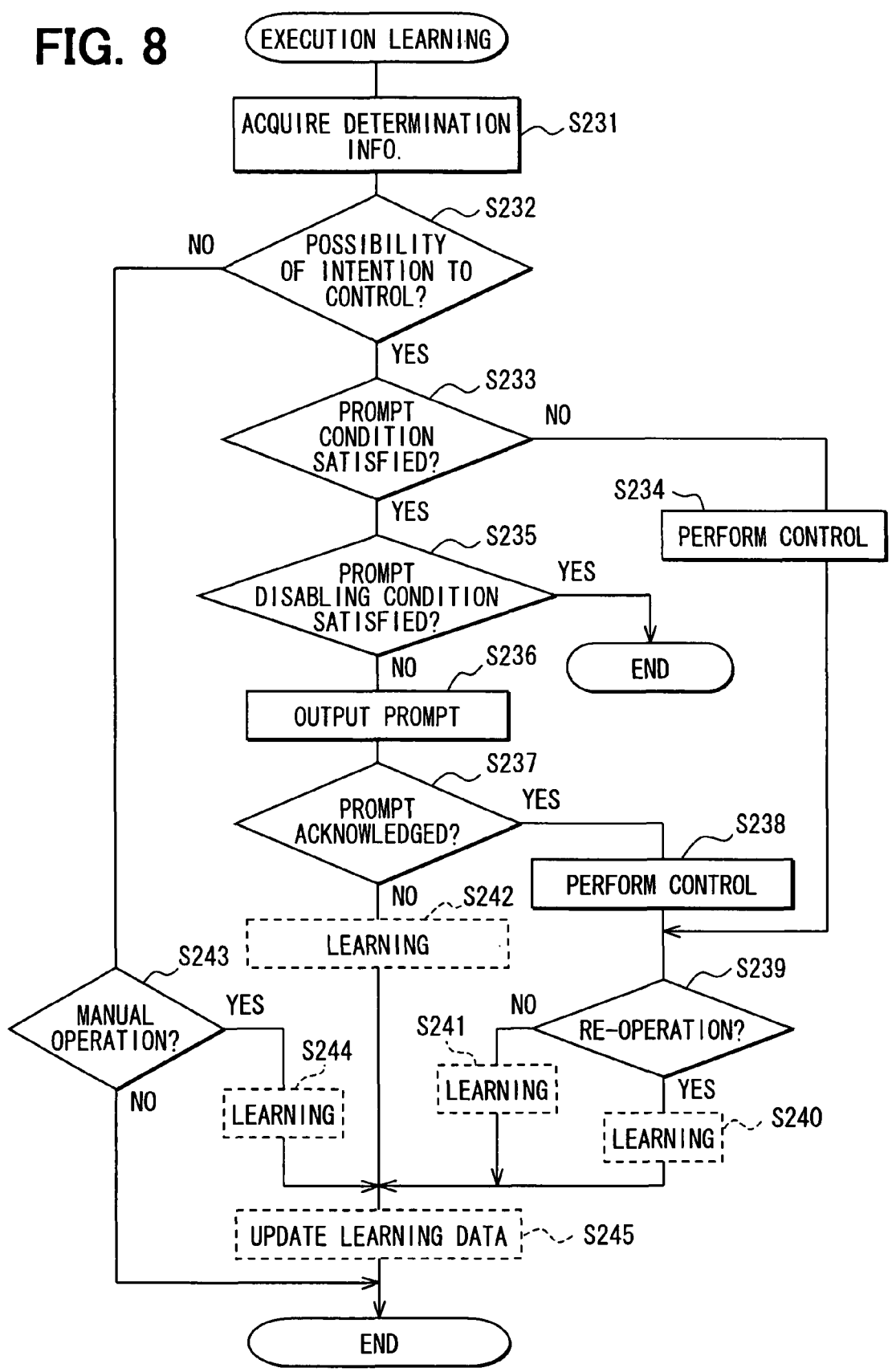
FIG. 8 is a flowchart showing a function learning process on the sub vehicle.

Let us now return to FIG. 6. At Step S207, after termination of the functional difference notification program 203b on the sub vehicle 200, the program 203a proceeds to Step S208 and performs the function execution (learning) program 203c in FIG. 8 similar to the function execution learning program 103y on the main vehicle 100. The program 203a performs various functions installed in the sub vehicle. Steps S121 through S135 in FIG. 5 correspond to Steps S231 through S245 in FIG. 8 in order. At Steps S130, S131, S132, and S134, the function execution learning program 103y on the main vehicle 100 performs the learning based on the operation of an instruction button 211YN (YES button 211Y and NO button 211N). At Step S135, the program 103y stores or updates the learning result. The function execution (learning) program 203c on the sub vehicle may omit Steps S230 through S235.

When the function execution (learning) program 203c terminates at Step S208, the program 203a proceeds to Step S209 and detects the presence or absence of an operation to turn off the accessory. The program 203a repeats Step S208 until a turn-off operation is detected. When a turn-off operation is detected, the program 203a terminates.

When a user is familiar with a first vehicle and drives an unfamiliar second vehicle, the vehicle communication system according to the invention can stimulate positive use of a new function (sub vehicle specific function) unavailable to the first vehicle. When the second vehicle lacks a function, the system can notify the user of the missing function (main vehicle specific function) in advance. The user can smoothly operate the second vehicle. A missing function is notified before the user starts the vehicle. The user can recognize the missing function before driving. The system notifies an alternative function for the missing function. The user can effectively use the alternative function.

A new function (sub vehicle specific function) unavailable to the first vehicle is notified not only when the vehicle is controlled to start, but also when the vehicle goes into a ready-for-use state applicable to a chance of using the new function. The notification can contain information about the new function (sub vehicle specific function) including its availability.

The new function (sub vehicle specific function) may be categorized into first-class and second-class functions. The first-class function is triggered by a user operation and is exemplified by auto wiper, light control system, air conditioner, navigation system, radio set, door lock, air cleaner, night vision, and auto cruise. The second-class function automatically starts independently of a user operation and is exemplified by ABS, stability control, back monitor, and sonar. When the ready-for-use state becomes enabled for the first-class function, it may be preferable to notify an operational guidance prompting a user to perform the first-class function together with the information about the new function (sub vehicle specific function). The second-class function can be automatically performed after notification of the information about the new function (sub vehicle specific function).

The function execution learning program $103y$ on the main vehicle 100 and the function execution (learning) program $203c$ on the sub vehicle 200 can perform the function of notifying the information about the first-class function. In this case, the execution determination information provides the presence or absence of the first-class function and is acquired by the process of acquiring the functional difference information at Step S206.

The prompt condition is information about the vehicle's ready-for-use state used for determining the timing to use each first-class function. The ready-for-use state is previously stored in the external memory 206 of the second vehicle for each function. A prompt example is: "The first-class function is available. Do you want to listen to the explanation and the use of the function?" The audio output unit 112 can audibly notify such content. The external memory 206 stores digital speech data (prompt data) for the prompt content correspondingly to each function.

The automatic execution condition is initially available. The automatic execution condition becomes unavailable through the learning of the program $203c$. That is, the system stores user operation record information for performing the first-class function as learning data. Before performing the prompt (operation guidance notification process) concerning the first-class function, the system determines whether or not to perform the prompt based on the learning data. When it is determined to perform the prompt, the system notifies availability of the first-class function and performs the prompt. The first-class function is performed based on the user operation. When it is determined not to perform the prompt, the system notifies availability of the first-class function and then automatically performs the first-class function without performing the prompt.

The instruction button 111YN (211YN) can be replaced by only one YES button 111Y (211Y). In this case, the system performs a determination similar to that for pressing the NO button 111N (211N) according to the above-mentioned embodiment when the YES button 111Y (211Y) is not pressed with a specified time period.

The learning at Steps S134 and S244 according to the embodiment widens the prompt condition so as to incorporate execution determination information acquired at Steps S121 and S231. It may be unnecessary to widen the prompt condition so as to incorporate the execution determination information direction. A specified value may be added to a threshold value for the prompt condition toward the execution determination information direction.

The same applies to the learning at Steps S130 and S240. It may be unnecessary to widen the prompt condition so as to incorporate the execution determination information direction. A specified value may be added to a threshold value for the prompt condition toward the execution determination information direction.

The embodiment responds to a prompt using the instruction button 111YN, i.e., the YES button 111Y and the NO button 111N, or only the YES button 111Y Instead, a user may audibly respond to the prompt. The same applies to the instruction button 211YN.

The embodiment uses the audio output unit 112 to audibly output the prompt and notification contents. Instead of or in addition to output from the audio output unit 112, the display apparatus 113 may output the prompt and notification contents.

When neither the YES button 111Y (211Y) nor the NO button 111N (211N) is pressed within a specified time period, the embodiment at Steps S127 and S237 can determine that the prompt is denied similarly to the case of pressing the NO button 111N (211N). By contrast, it may be preferable to determine that the prompt is acknowledged when neither the YES button 111Y (211Y) nor the NO button 111N (211N) is pressed within a specified time period.

According to the embodiment, the sub vehicle 200 is provided with the difference recognition support means (difference notification means, second function specification means, second vehicle function notification means, first function specification means, and second function notification means) and the operation guidance notification means as mentioned above. The portable unit 10 may be provided with an audio output unit to implement these means. That is, the portable unit 10 may be responsible for prompt and various notification processes.

These means may be provided for both the main vehicle 100 and the sub vehicle 200. That is, the main vehicle 100 and the sub vehicle 200 are provided with various programs for implementing the means. When a user drives these vehicles, the system authenticates the onboard user during the vehicle start control and determines whether or not the vehicle matches the main vehicle of the authenticated user. When the main vehicle is identified, the system performs the main program $103x$. Otherwise, the system performs the functional difference control program $203a$.

Second Embodiment

Figure 11:
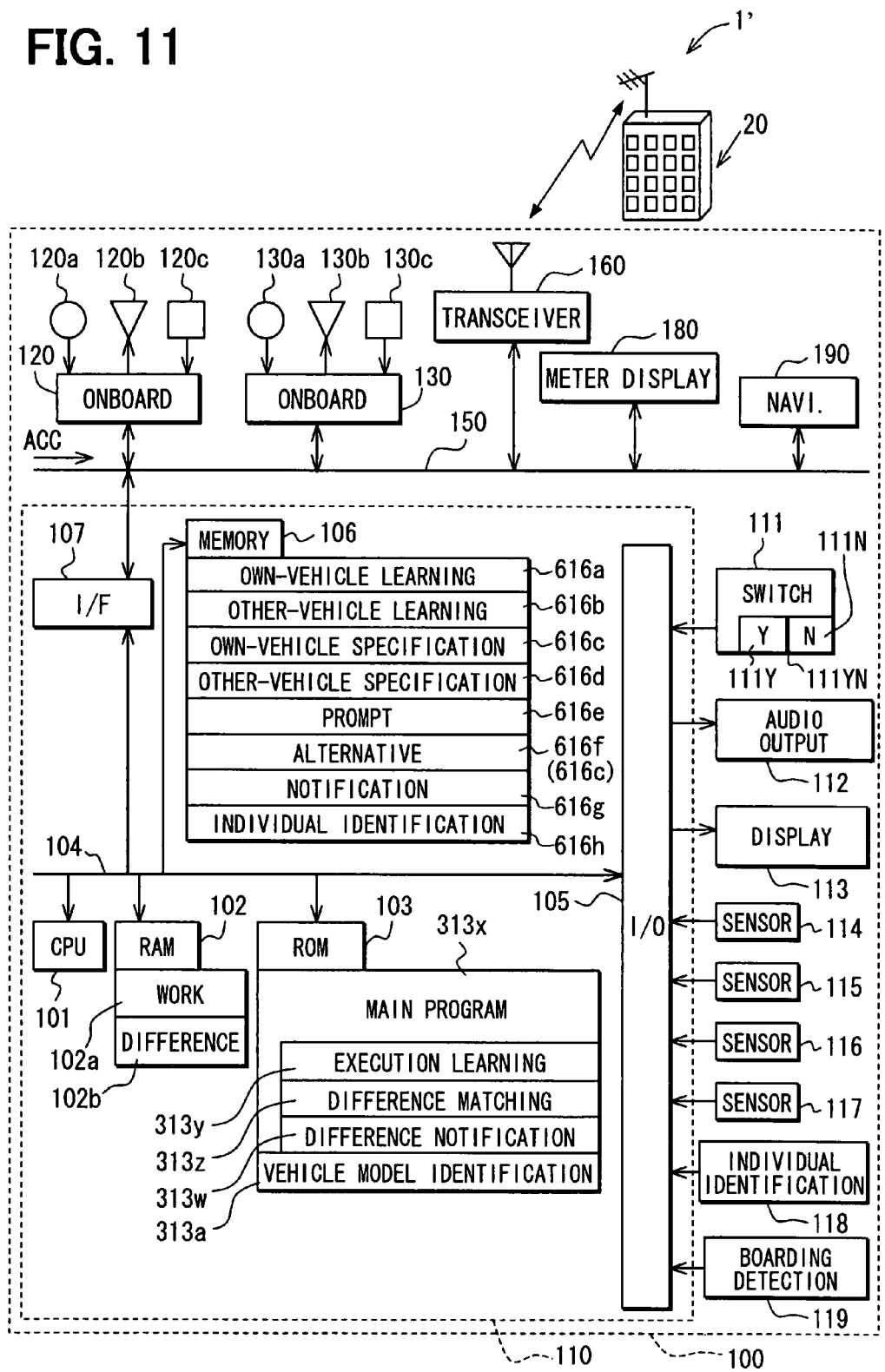
FIG. 11 is a block diagram of a main vehicle for the user assistance system for vehicle according to a second embodiment of the invention.
Figure 12:
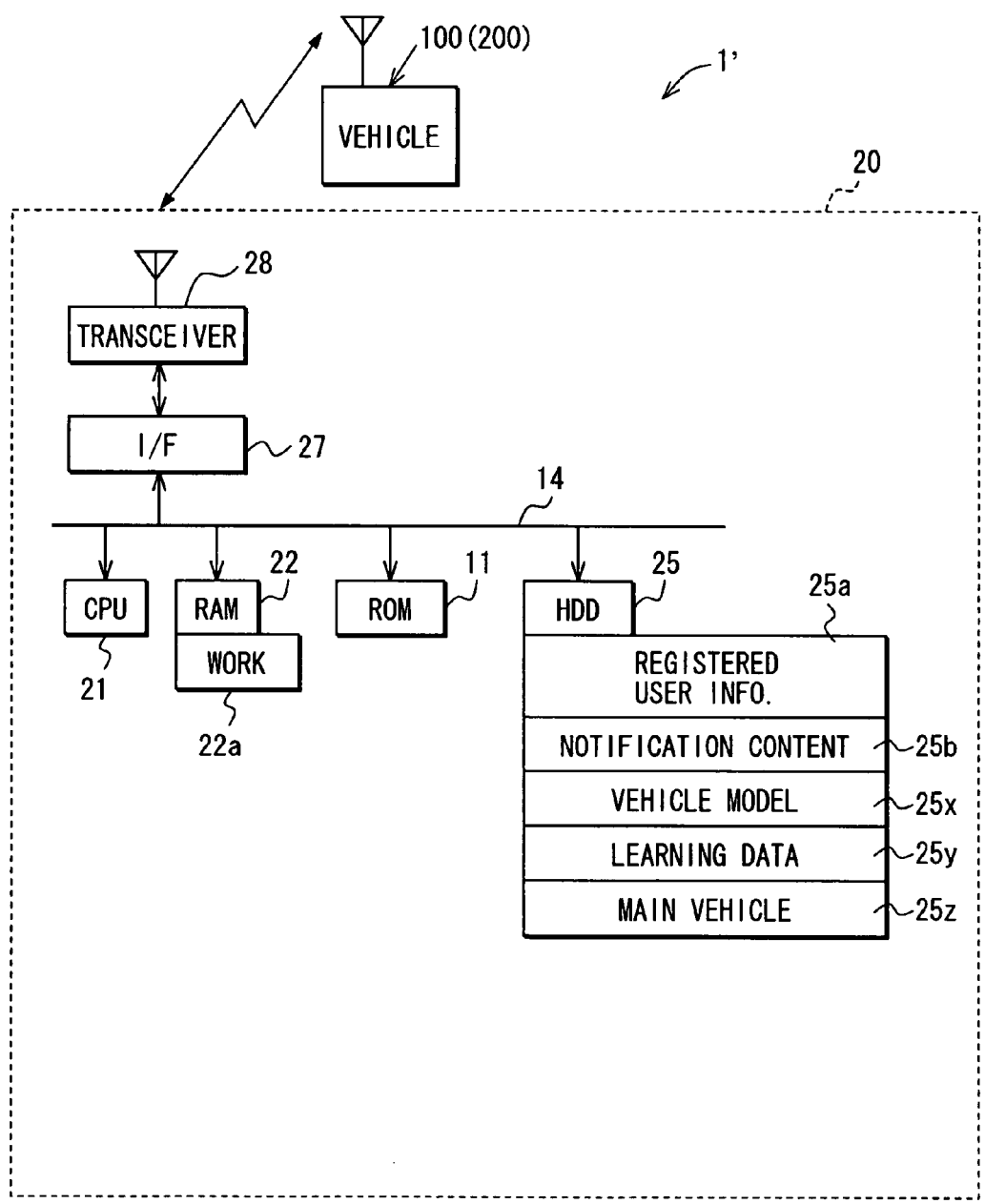
FIG. 12 is a block diagram of an information center of the user assistance system for vehicle according to the second embodiment of the invention.
Figure 13:
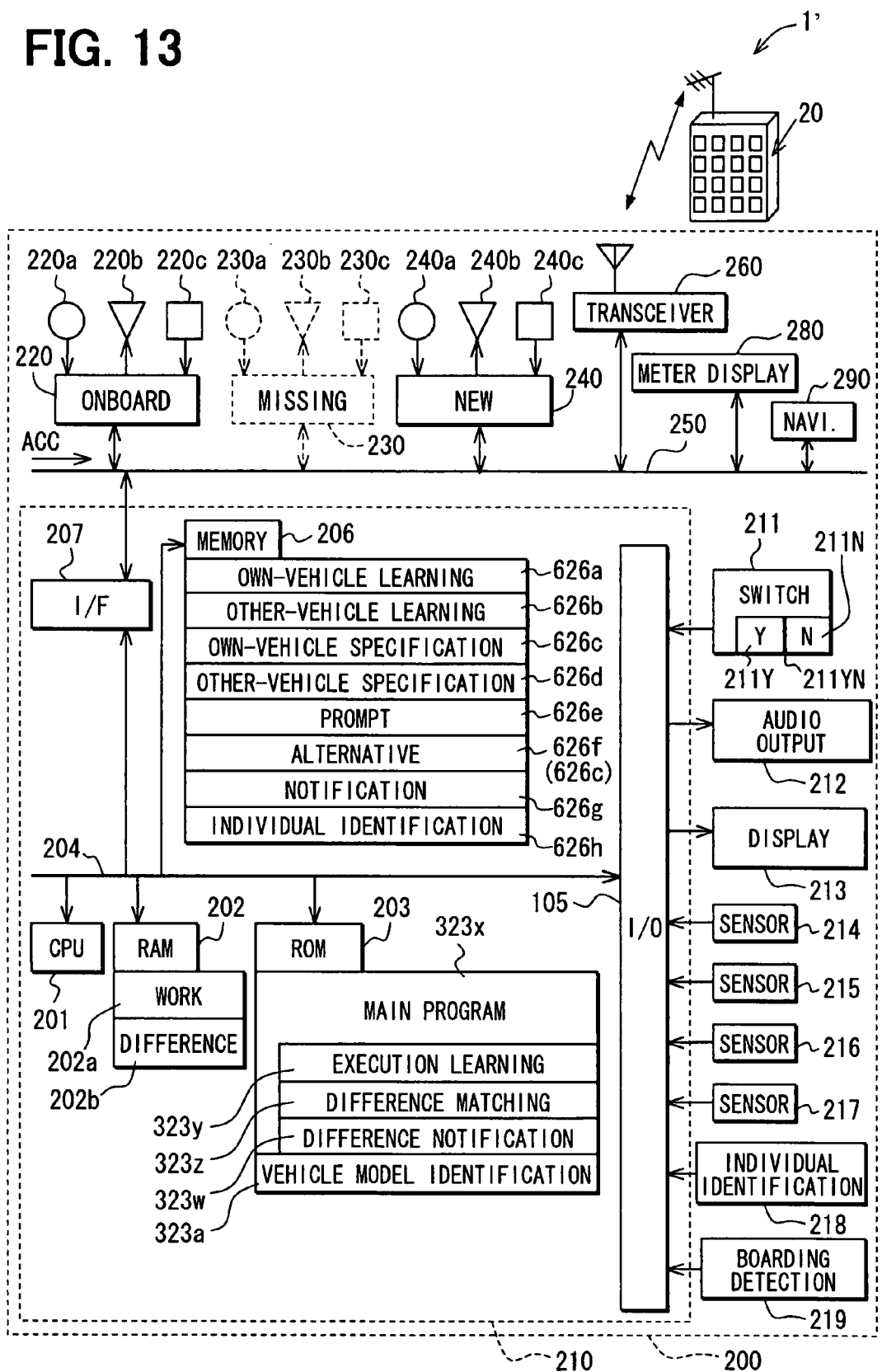
FIG. 13 is a block diagram of a sub vehicle in the user assistance system for vehicle according to the second embodiment of the invention.

FIGS. 11, 12, and 13 schematically show electric block diagrams of the user assistance system for vehicle according to the second embodiment of the invention. The mutually corresponding parts of the user assistance systems for vehicle in the first and second embodiments are designated by the same reference numerals and a description is omitted for simplicity. A user assistance system for vehicle 1' in FIGS. 11, 12, and 13 includes an information center (information relay means) 20 and vehicles 100 and 200 that are wirelessly communicable with the information center 20 via a wireless communication network. According to the second embodiment, similarly to the first embodiment, the vehicle 100 is a predetermined reference vehicle (main vehicle) to which a user is familiar. The vehicle 200 (sub vehicle) is unfamiliar to the user and differs from the reference vehicle 100. According to the user assistance system for vehicle 1', the user, when getting in the sub vehicle 200, can recognize a specification difference from the familiar main vehicle 100 without carrying the portable unit 10 according to the first embodiment.

The main vehicle (first vehicle or reference vehicle) 100 differs from the first embodiment in the following points. The transceiver 160 also communicates with the information center 20. The ROM 103 and the external memory 106 of the device management ECU 110 store different contents. The input/output unit 105 of the device management ECU 110 connects with an individual identification apparatus 118 and a boarding detection apparatus 119. The serial communication bus 150 connects with a meter display apparatus 180 and a navigation apparatus 190.

According to the embodiment, the main vehicle 100 includes such onboard devices as an auto wiper, a light control system, an air conditioner, a radio set, a door lock, an air cleaner, a night vision, an auto cruise, an ABS (Antilock Brake System), air bags for a driver's seat and a passenger seat, a stability control, a back monitor, and the navigation apparatus 190. The device management ECU 110 controls these devices.

The navigation apparatus 190 has a known construction including: an own vehicle position detector including a known geomagnetic sensor, gyroscope, distance sensor, and GPS receiver; a data storage apparatus (HDD) for storing a navigation program, map data, and the other various data for route guidance; a display apparatus; an audio output section; an input operation section; and a control circuit. According to the embodiment, the audio output unit 112 in FIG. 11 is also used as the audio output section for the navigation apparatus 190. The display apparatus 113 in FIG. 11 is also used as the display apparatus for the navigation apparatus 190. The input operation section of the navigation apparatus 190 is also used as part of the operation switch group 111 in FIG. 11.

When the CPU of the control circuit starts the navigation program, the navigation apparatus 190 having such construction displays a menu screen (not shown) on the display apparatus 113. A user may select a route guidance process by operating the operation switch group 111, e.g., operating a touch panel, operating a remote control terminal, or supplying a speech instruction to a microphone. The process is performed as follows, for example. The user searches for a destination and settles it. When the destination is settled, the process allows the own vehicle position detector to find a current position of the vehicle 100. The process then finds an optimum guidance route to the destination from the current position as a start point. Obviously, the start point may be settled to a point other than the current position. The process displays a guidance route superposed on a road map on the display apparatus 113. The audio output unit 112 audibly outputs the route guidance. In this manner, the process provides the user with the optimum route.

The individual identification apparatus 118 acquires individual identification information from the user (a driver according to the embodiment) who uses the vehicle 100 mounted with the individual identification apparatus 118. The individual identification apparatus 118 transmits the individual identification information to the ECU 110 as a crisis management ECU. The individual identification apparatus 118 functions as part of user authentication means for authenticating the user. The embodiment uses an identification apparatus for identifying the user using a fingerprint. The individual identification apparatus 118 may be provided as a biometric identification apparatus that uses a speech uttered from the driver or other biometric identification information instead of fingerprints. Further, the individual identification apparatus 118 may be provided as an image identification apparatus that captures a driver's image and identifies the driver based on image recognition.

The user authentication means according to the embodiment includes the individual identification apparatus 118 as individual identification information acquisition means. In addition, the user authentication means includes individual identification information transmission means, individual identification information reception means, and individual authentication means. The individual identification information transmission means is provided for the vehicle 100 and transmits the acquired individual identification information to the information center 20. The individual identification information transmission means functions by executing programs 313x and 313z to be described later. The individual identification information reception means is provided for the information center 20 and receives the individual identification information. The individual identification information reception means functions by executing programs 25x, 25y, and 25z to be described later. The individual authentication means performs an authentication process based on the received individual identification information. The individual authentication means functions by executing the programs 25x, 25y, and 25z to be described later.

The boarding detection apparatus 119 detects a boarding state of the user (the driver according to the embodiment) and functions as boarding detection means. The embodiment uses a seating sensor for detecting a driver's seating state. The individual identification apparatus 118 may be used as the boarding detection means.

The ROM 103 of the device management ECU 110 is provided with a vehicle model identification information storage section 313a that stores vehicle model identification information for identifying the vehicle 100. According to the embodiment, a vehicle body number is stored as the vehicle model identification information. The vehicle model identification information may be provided as the other identification information capable of identifying the vehicle 100 or multiple pieces of identification information for identifying the vehicle 100.

The ROM 103 stores a main program 313x that performs control processes for functioning onboard devices 120, 130, and so on. The ROM 103 further includes a function execution learning program 313y and a specification difference matching control program 313z which are sub programs of the main program 313x. The function execution learning program 313y is performed when the vehicle 100 is a boarded user's reference vehicle. The function execution learning program 313y triggers function execution of the onboard devices 120, 130, and so on and stores history information about operations for the function execution in the external memory 106. The specification difference matching control program 313z is performed when the vehicle 100 is not a boarded user's reference vehicle. The specification difference matching control program 313z allows the user to recognize that the vehicle 100 differs from the user's reference vehicle in specifications.

Executed by the CPU 101, the function execution learning program 313y functions as operation storage means. Executed by the CPU 101, the specification difference matching control program 313z functions as first identifying information acquisition means, second identifying information acquisition means, comparison means, user authentication means, and specification difference recognition support means.

Similarly to the above-mentioned embodiment, the external memory 106 is equivalent to a rewritable storage medium such as EEPROM. The external memory 106 is provided with an own-vehicle learning data storage section (own-vehicle operation storage section) 616a and an other-vehicle learning data storage section (other-vehicle operation storage section) 616b. These sections are provided correspondingly to devices such as the onboard devices 120, 130, and so on of the own vehicle 100 (or functions or controls when multiple functions are provided as in the navigation apparatus 190) and users. The own-vehicle learning data storage section 616a stores a prompt condition and an automatic execution condition as learning data. The other-vehicle learning data storage section 616b stores learning data about another vehicle (e.g., vehicle 200) different from the own vehicle 100. The learning data is received from the information center 20.

In addition, the external memory 106 is provided with an own-vehicle specification list storage section 616c and an other-vehicle specification list storage section 616d. The own-vehicle specification list storage section 616c stores own-vehicle specification list information (first vehicle specification identifying information) as shown in FIGS. 9A and 10A indicating specification contents of the own vehicle 100. The other-vehicle specification list storage section 616d stores other-vehicle specification list information (second vehicle specification identifying information) as shown in FIGS. 9B and 10B indicating specification contents of another vehicle (e.g., vehicle 200) different from the own vehicle 100. The other-vehicle specification list information is received from the information center 20.

The external memory 106 is further provided with a prompt-associated information storage section 616e. The prompt-associated information storage section 616e stores prompt data similarly to the first embodiment as digital speech data and image display data in association with the functions contained in the specification list information about the own vehicle 100. The prompt-associated information storage section 616e also stores execution determination information, a prompt condition, and an automatic execution condition as well as the prompt data in association with the functions contained in the specification list information about the own vehicle 100. The prompt condition is used to determine whether or not to perform prompt control. The prompt control prompts a user to determine whether or not to perform functions (controls) contained in the specification list information about the own vehicle 100. The automatic execution condition is used to determine whether or not to automatically (without prompt output control) perform functions (controls) contained in the specification list information about the own vehicle 100. At least one piece of predetermined execution determination information is supplied with a range to satisfy the prompt condition or the automatic execution condition. The execution determination information is used to determine whether or not there is a possibility of performing each function (control) contained in the specification list information about the own vehicle 100. For example, the execution determination information about the auto wiper as a function of the own vehicle 100 provides a value (quantity of rain) detected by a rainfall sensor included in any of the sensors 114 through 117 connected to the input/output unit 105 of the own vehicle 100 or weather information wirelessly received by the navigation apparatus 190. The execution determination information about the light control system provides a value (quantity of light) detected by an illuminance sensor included in any of the sensors 114 through 117 connected to the input/output unit 105 of the own vehicle 100. The execution determination information is provided correspondingly to the functions.

The external memory 106 is provided with an alternative specification storage section (alternative function storage section in FIG. 11) 616f correspondingly to each specification contained in the specification list information about the own vehicle 100. The alternative specification storage section 616f stores alternative specification information (equivalent specification information) about each specification. As shown in FIG. 9A, the own-vehicle specification list storage section 616c stores the alternative specification information according to the embodiment embedded in the own-vehicle specification list information. According to the embodiment, the alternative specification list storage section 616f is provided as a partial area of the own-vehicle specification list storage section 616c. Since the specification that can be substituted concerns only the vehicle functions, the "alternative specification" can be also termed the "alternative function."

The external memory 106 is provided with a notification data storage section 616g. The notification data storage section 616g stores notification data as digital speech data and image display data correspondingly to specifications contained in the vehicle's specification list information as shown in FIGS. 14A and 14B. The notification data according to the embodiment includes new specification notification data, missing specification notification data, and alternative specification notification data. There may be found a new specification (second vehicle function) missing in the reference vehicle (e.g., vehicle 200) of a user using the vehicle 100 as a result of acquiring the specification list information about the reference vehicle and the specification difference information based on the specification list information. In such case, the new specification notification data notifies the presence of the new specification. There may be found a missing specification (first vehicle function) available for the reference vehicle (e.g., vehicle 200) of a user using the vehicle 100 but missing in the vehicle 100 as a result of acquiring the specification list information about the reference vehicle and the specification difference information based on the specification list information. In such case, the missing specification notification data notifies the presence of the missing specification. When using the vehicle 100, the user may find the missing specification. The vehicle 100 may be determined to have an alternative specification for the missing specification as a result of referring to the alternative specification information stored in the alternative function storage section 616f. The alternative specification notification data notifies the presence of the alternative specification.

As will be described later, the external memory 106 is further provided with an individual identification information storage section 616h that stores individual identification information acquired by the individual identification apparatus 118.

As shown in FIG. 12, the information center 20 is constructed as a server (host apparatus) including: a CPU 21, RAM 22, ROM 23, a bus line 14, an interface (depicted as "I/F" in the drawing) 27 connected to a transceiver 28, a hard disk drive (depicted as "HDD" in the drawing and hereafter referred to as such) 25, and an input/output unit (not shown).

An HDD 25 is provided with a registered user information storage section (first vehicle specification identifying information storage section (reference vehicle specification identifying information storage section)) 25a for storing information (registered user information) about a registered user. The registered user information is stored correspondingly to each registered user, more specifically, each user ID assigned during the registration. The registered user information contains main vehicle information, the user's most recently used vehicle information, master information for the individual identification information about the user (master information for individual identification in the drawing), and the user's main vehicle identifying information. The main vehicle information signifies specification list information (reference vehicle specification identifying information) and learning data for each user's main vehicle. According to the embodiment, the main vehicle information also contains learning data. The most recently used vehicle information is equivalent to specification list information about a vehicle each user used most recently. The master information for the individual identification information serves as a criterion for authenticating the user's individual identification information received from the vehicle. The main vehicle identifying information serves as a criterion for identifying main vehicle information corresponding to the vehicle identification information received from the vehicle.

The HDD 25 is provided with a notification data master storage section 25b for storing the notification data corresponding to various vehicle specifications. The notification data stored in the vehicle is downloaded from the notification data master storage section 25b as needed.

The HDD 25 stores a vehicle model identifying program 25x, a main vehicle information update program 25y, and a main vehicle information transmission program 25z. The vehicle model identifying program 25x determines based on individual identification information and vehicle model identification information received from the vehicle whether or not a vehicle identified by the received vehicle model identification information is the registered user's reference vehicle identified by the received individual identification information. The main vehicle information update program 25y updates main vehicle information about the corresponding registered user according to the main vehicle information received from the vehicle. The main vehicle information transmission program 25z transmits the main vehicle information based on a request from the vehicle.

The embodiment can also identify a functional difference between the main vehicle 100 and the sub vehicle 200 when the user drives the sub vehicle 200 different from his or her own main vehicle (reference vehicle) 100. In addition, the embodiment can identify a specification difference of the vehicle 100 including the functional difference. As shown in FIG. 13, the sub vehicle 200 according to the embodiment is provided with an onboard device (common function) 220 mounted on the main vehicle 100, an onboard device (second vehicle function) 240 not mounted on the main vehicle, and the other device functions. These devices are connected to a device management ECU 210 via a serial communication bus 250.

The sub vehicle 200 according to the embodiment includes such onboard functions (onboard devices) as an auto wiper, a light control system, an air conditioner, a navigation apparatus, a radio set, a door lock, an air cleaner, a night vision, an auto cruise, an air bag for a driver's seat only, and a stability control. The device management ECU 210 controls these functions.

The sub vehicle (second vehicle) 200 differs from the main vehicle 100 in onboard functions (onboard devices) to be controlled by the device management ECU 210. However, the sub vehicle 200 has the same construction as that of the main vehicle 100. The contents of programs 323x, 323y, and 323z stored in the device management ECU 210 are equal to those of the programs 313x, 313y, and 313z stored in the main vehicle 100. The device management ECU 210 stores the same types of data (information) as those stored in the main vehicle 100. Though the types are the same, however, the contents of data (information) stored in the device management ECU 210 correspond to the sub vehicle 200 and differ from those of the data (information) stored in the main vehicle 100.

In the user assistance system for vehicle 1' having the above-mentioned construction according to the embodiment, the information center (server) 20 stores the most recent main vehicle information about the main vehicle 100 when the user gets in and then out of his or her own main vehicle 100. When the user gets in the sub vehicle 200, the sub vehicle 200 acquires the main vehicle information about the user stored in the information center (serve) 20. The user is notified of a specification difference from the main vehicle 100 as needed.

Figure 15:
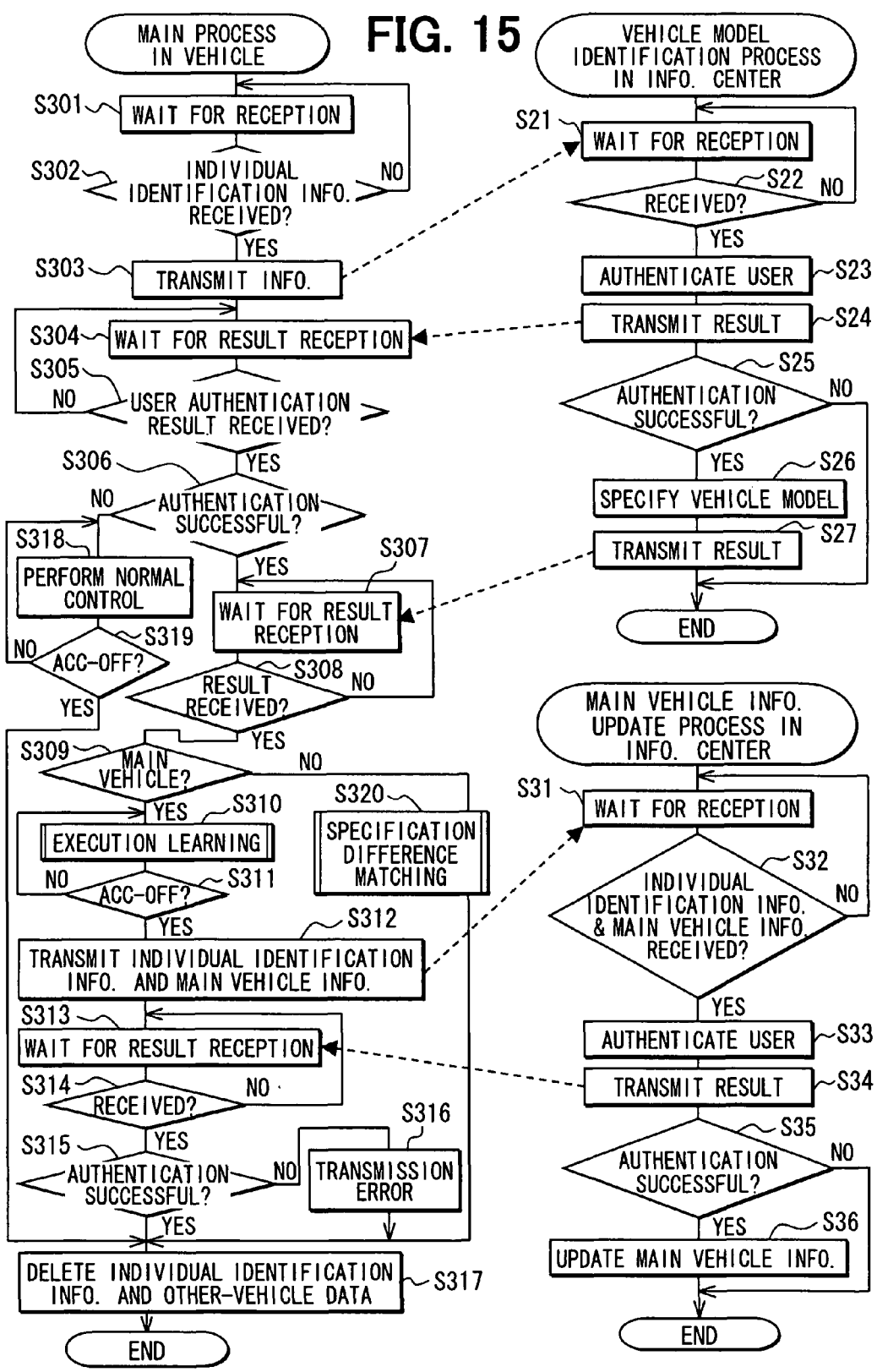
FIG. 15 shows flowcharts describing a main process in the vehicle, a vehicle model identification process in the information center, and a main vehicle information update process in the information center.

When the user gets in the vehicle 100 (or 200), its CPU 101 (or 201) executes the main program 313x (or 323x) to notify a specification difference between the main vehicle 100 and the sub vehicle 200 and performs the functions of the vehicle 100 (or 200) in which the user gets. With reference to a flowchart in FIG. 15, the following describes the main program 323x executed by the vehicle 200 when the user using the vehicle 100 as the main vehicle (reference vehicle) is registered to the information center 20 and gets in the vehicle 200. The main program 313x for the vehicle 100 has the same contents as those of the main program 323x for the vehicle 200.

The main program 323x starts based on the vehicle start control under the condition that the boarding detection apparatus 119 detects the user's boarding. The vehicle start control is described in the first embodiment. Also in the second embodiment, the main program 323x starts when an accessory is turned on according to a key operation for starting an engine. On the other hand, the information center 20 repeatedly executes the vehicle model identifying program 25x, the main vehicle information update program 25y, and the main vehicle information transmission program 25z.

When the main program 323x is executed, it waits to acquire the individual identification information at Step S301. According to the embodiment, the vehicle 200 is provided with the individual identification apparatus 218 that identifies a driver based on his or her fingerprint. When the driver's finger touches a fingerprint sensor provided for a specified location (e.g., steering wheel or shift lever) in a vehicle compartment, the fingerprint sensor acquires fingerprint data as the individual identification information. The individual identification information storage section 626h temporarily stores the acquired individual identification information. When it is determined at Step S302 that the individual identification information storage section 626h acquires the individual identification information, the program proceeds to Step S303 to read the individual identification information stored in the individual identification information storage section 626h and the vehicle model identification information stored in the vehicle model identification information storage section 323a. The program allows the transceiver 18 to wirelessly transmit these pieces of information to the information center 20. At Step S304, the program waits to receive a result of user authentication in the information center 20 with respect to the wirelessly transmitted individual identification information. When it is determined at S305 that a user authentication result is received, the program proceeds to Step S306.

At this time, the vehicle model identifying program 25x is executing in the information center 20. The program waits to receive the individual identification information and the vehicle model identification information (Step S21). When receiving the individual identification information and the vehicle model identification information (Step S22), the program starts a user authentication process (Step S23). The program collates each master information (master information for individual identification in FIG. 12) stored in the registered user information storage section 25a with the wirelessly received individual identification information. As a result of the collation, there may be found the master information matching the wirelessly received individual identification information. In this case, the program determines successful authentication (authentication accepted). There may not be found the master information matching the wirelessly received individual identification information. In this case, the program determines unsuccessful authentication (authentication rejected). After the user authentication, the program transmits the user authentication result to the vehicle 200 (Step S24).

When it is determined that the user authentication (Step S23) is successful (Step S25), the program performs a vehicle model identifying process for determining whether or not the authenticated user's vehicle 200 is the main vehicle or the sub vehicle (Step S26). Specifically, it is determined that the main vehicle identifying information registered as the registered user information for the successfully authenticated user corresponding to the individual identification information matches the vehicle model identification information wirelessly received along with the individual identification information from the vehicle 200 at Step S22. When a match is found, the vehicle 200 is determined to be the main vehicle. Otherwise, the vehicle 200 is determined to be the sub vehicle. The vehicle model identifying program $25x$ wirelessly transmits a vehicle determination result to the vehicle 200 (Step S27) and then terminates. When the user authentication process (Step S23) determines that the authentication is unsuccessful (Step S25), the vehicle model identifying program $25x$ terminates directly.

Now let us return to Step S306. At Step S306, the program determines whether or not the user authentication result is successful. When the authentication is unsuccessful, the program proceeds to Step S318. The unsuccessful authentication also applies to a case where no user authentication result is wirelessly received despite a lapse of a specified time period after the wireless transmission process at Step S303. At Step S318, the program repeatedly performs the normal function execution process without a prompt, learning, and a specification difference notification till the control for stopping the vehicle 200. According to the embodiment, the program repeatedly performs the process at Step S319 until the accessory is turned off according to a key operation for stopping the engine. When the accessory is turned off, the program proceeds to Step S317.

When the determination at Step S306 results in the successful authentication, the program proceeds to Step S307 and waits to receive a result of the vehicle model determination. When it is determined at Step S308 that a result of identifying the vehicle model is received, the program proceeds to Step S309. At Step S309, the program determines based on the result of identifying the vehicle model whether or not the vehicle 200 is the main vehicle (reference vehicle) or the sub vehicle. When the vehicle 200 is determined to be the main vehicle, the program proceeds to Step S310. When the vehicle 200 is determined to be the sub vehicle, the program proceeds to Step S315.

Figure 5:
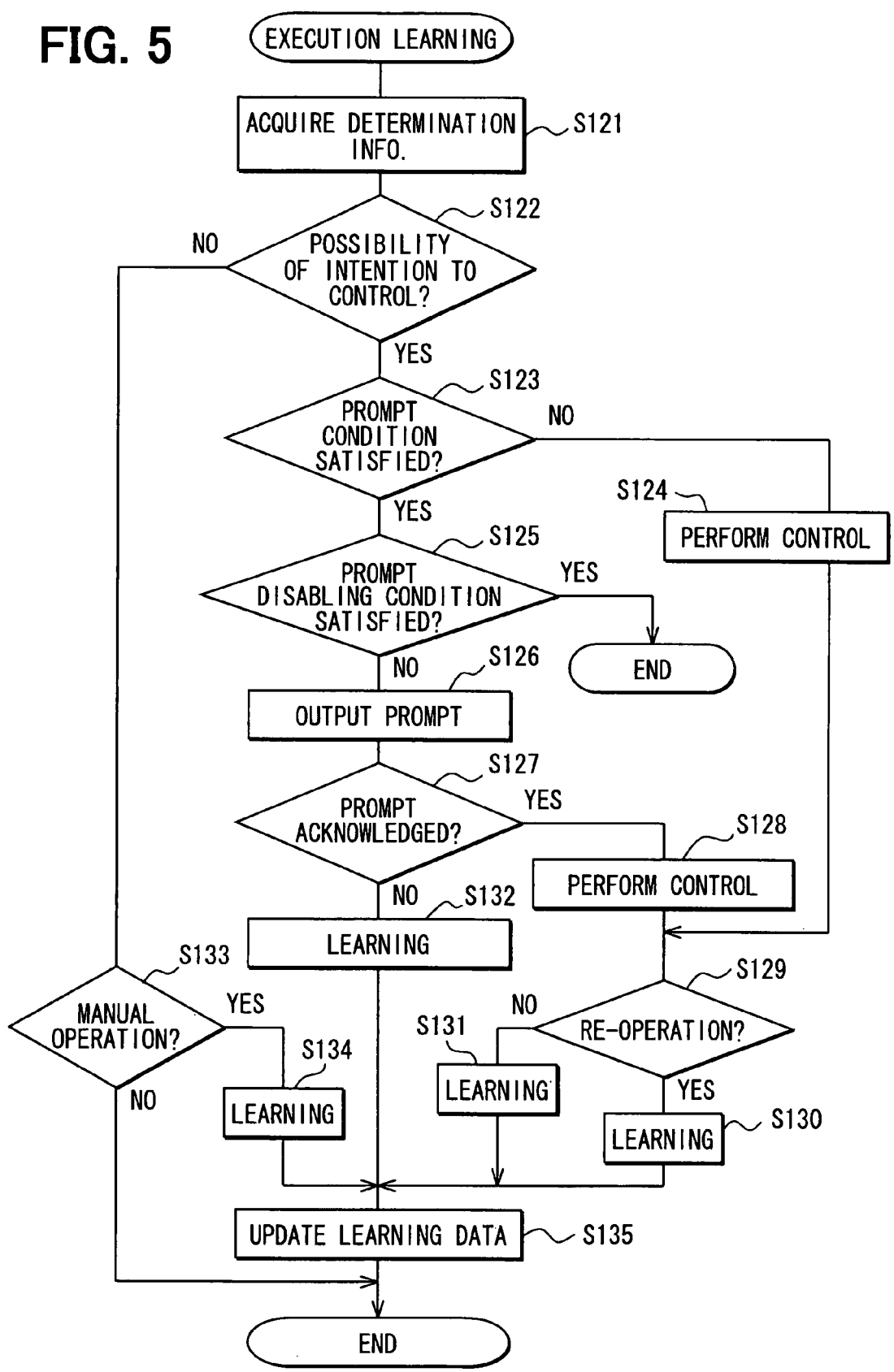
FIG. 5 is a flowchart showing a function learning process on the main vehicle.

When the vehicle 200 is determined to be the main vehicle at Step S309, the program performs the functions (controls) of the vehicle 200 at Step S310 by executing the function execution learning program $323y$ having the same contents as the function execution learning program $103y$ in FIG. 5. The function execution learning program $323y$ is executed using the learning data stored in the own-vehicle learning data storage section $626a$. In this manner, a prompt is provided as needed to perform the onboard functions. The own-vehicle learning data storage section $626a$ stores or updates the history information about operations for triggering and performing the functions as learning data. The function execution learning program $323y$ is repeatedly executed at a specified interval. It terminates when the accessory is turned off according to a key operation for stopping the engine at Step S311.

At Step S312, the main program reads the most recent learning data updated by executing the function execution learning program $313y$ from the own-vehicle learning data storage section $626a$. In addition, the program reads the own-vehicle specification list information from the own-vehicle specification list storage section $626c$. The program wirelessly transmits the read learning data and the read own-vehicle specification list information as the main vehicle information along with the individual identification information to the information center 20. The individual identification information is acquired at Step S301 and is stored in the individual identification information storage section $626h$. At Step S313, the program waits to receive a result of the user authentication in the information center 20 with respect to the individual identification information wirelessly transmitted at Step S312. When it is determined at Step S314 that a user authentication result is received, the program proceeds to Step S315.

At this time, the main vehicle information update program $25c$ is executing in the information center 20. The program waits to receive the main vehicle information including the individual identification information and the learning data (Step S31). When the individual identification information and the main vehicle information are received wirelessly (Step S32), the program starts the user authentication process similar to Step S22 based on the received individual identification information (Step S33). After the user authentication, the program transmits a user authentication result to the vehicle 200 (Step S34). When the authentication is determined to be successful (Step S35), the program updates the stored main vehicle information associated with the authenticated user to the main vehicle information received at Step S31 by overwriting (Step S36). When the user authentication process (Step S33) determines that the authentication is unsuccessful (Step S35), the main vehicle information update program $25c$ terminates directly.

Now let us return to Step S315. At Step S315, the program determines whether or not the user authentication results successfully. When the authentication is unsuccessful, the program stores a learning data transmission error in an error log and proceeds to Step S317. The unsuccessful authentication also applies to a case where no user authentication result is wirelessly received despite a lapse of a specified time period after the wireless transmission process at Step S312. When the authentication is successful, the program directly proceeds to Step S317. When the authentication is unsuccessful at Step S315, the program may repeat Step S312 for a specified number of times.

At Step S317, the main program $323x$ deletes the individual identification information and the other-vehicle data (other-vehicle learning data and other-vehicle specification list information) stored in the individual identification information storage section $626h$, an other-vehicle learning data storage section $626b$, and an other-vehicle specification list storage section $626d$ and then terminates.

Figure 16:
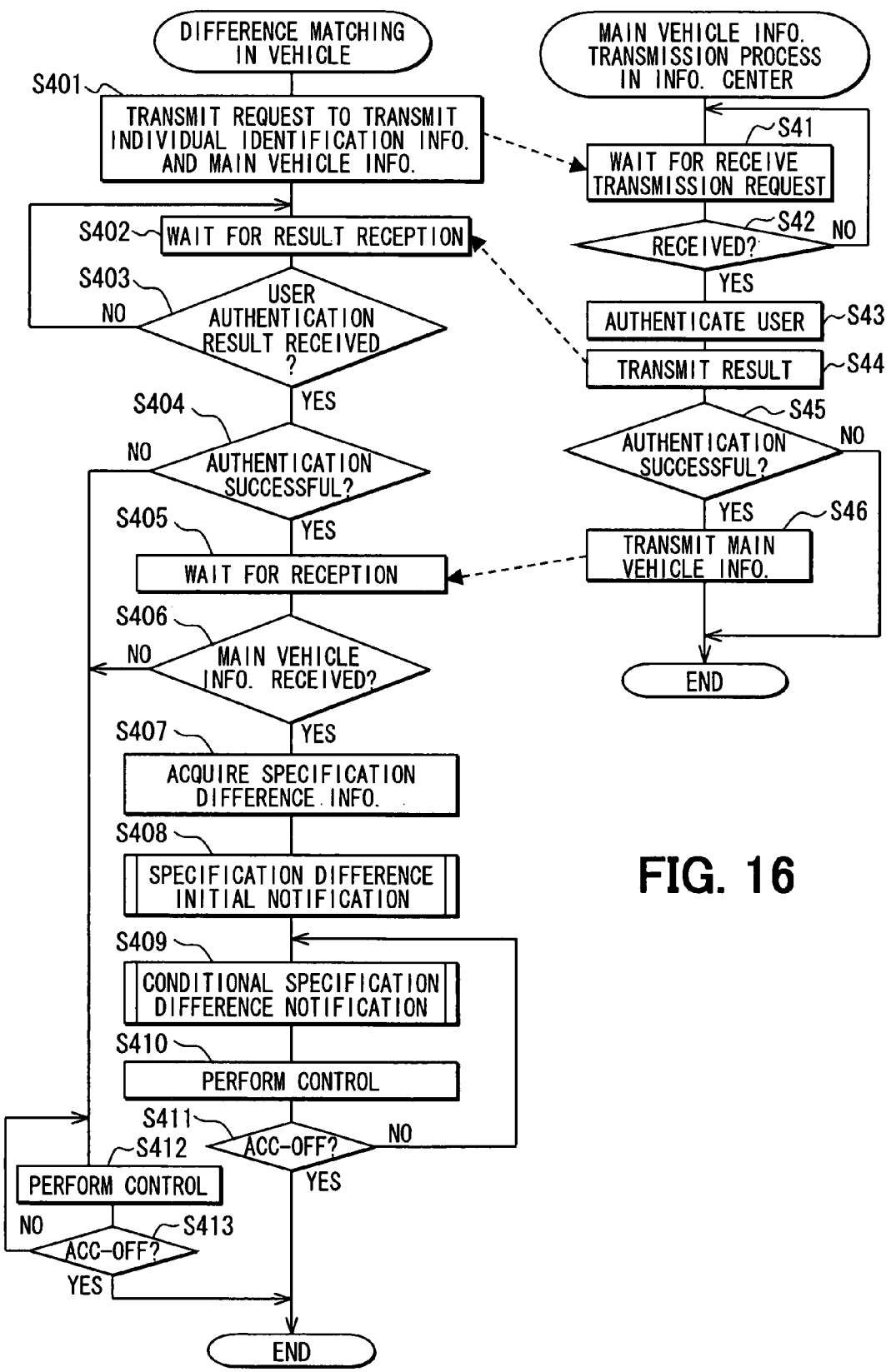
FIG. 16 shows flowcharts describing a specification difference matching control in the vehicle and a main vehicle information transmission process in the information center.

When the vehicle 200 is determined to be the sub vehicle at Step S309, the main program executes the specification difference matching control program $313z$ at Step S320. In this manner, the program notifies specification and function differences between the sub vehicle 200 currently used by the user and the familiar main vehicle 100. When needed, the program notifies advice information corresponding to the specification and function differences. Upon completion of Step S320, the program proceeds to Step S317. The following describes the specification difference and functional difference control program $313z$ executed at Step S320 with reference to a flowchart in FIG. 16.

At Step S401, the program wirelessly transmits the individual identification information acquired at Step S301 and a request (main vehicle information transmission request) to the information center 20. This request allows the own vehicle 200 to wirelessly transmit the main vehicle information (specification list information and learning data) corresponding to the user authenticated by the individual identification information. At Step S402, the program waits to receive a result of the user authentication in the information center 20 with respect to the individual identification information wirelessly transmitted at Step S402. When it is determined at Step S403 that a user authentication result is received, the program proceeds to Step S404.

At this time, the main vehicle information transmission program 25*z* is executing in the information center 20. The program waits to receive the individual identification information and the vehicle model identification information (Step S41). When receiving the individual identification information and the vehicle model identification information (Step S42), the program starts a user authentication process (Step S43) similar to Step S22. After the user authentication, the program wirelessly transmits the user authentication result to the vehicle 200 (Step S44). When the authentication is determined to be successful (Step S45), the program reads the stored main vehicle information (specification list information and learning data) associated with the authenticated user from a registered user information storage section 25*a* of the HDD 25 and wirelessly transmits the information to the vehicle 200 (Step S46). When the user authentication process (Step S43) determines that the authentication is unsuccessful (Step S45), the main vehicle information transmission program 25*z* terminates directly.

Now let us return to Step S404. At Step S404, the program determines whether or not the user authentication results successfully. When the authentication is unsuccessful, the program proceeds to Step S412. The unsuccessful authentication also applies to a case where no user authentication result is wirelessly received despite a lapse of a specified time period after the wireless transmission process at Step S401. At Step S412, the program performs the normal function execution process without a specification difference notification and a prompt. According to the embodiment, Step S412 is repeated until the accessory is turned off at Step S413 according to a key operation for stopping the engine. When the accessory is turned off, control returns to the main program 323*x* in FIG. 15. When the authentication is unsuccessful at Step S404, the program may repeat Step S401 for a specified number of times.

When the determination at Step S404 results in the successful authentication, the program proceeds to Step S405 and waits to receive the main vehicle information requested at Step S401. When it is determined at Step S406 that the main vehicle information is received, the program proceeds to Step S407. The received main vehicle information contains the specification list information and the learning data. The other-vehicle specification list storage section 626*d* stores the specification list information. The other-vehicle learning data storage section 626*b* stores the learning data. Also when the main vehicle information is not wirelessly received despite a lapse of a specified time period at Step S406, the program proceeds to Step S409 to perform the normal function execution process and returns control to the main program 313*x*.

At Step S407, the program compares the specification list information about the main vehicle of the user using the vehicle 200, with the specification list information about the own vehicle 200 stored in the own-vehicle specification list storage section 626*c* and generates specification difference information. Specifically, the program reads the own-vehicle specification list information and the main vehicle's specification list information from the own-vehicle specification list storage section 626*c* and the other-vehicle specification list storage section 626*d* and compares both information. The program selects a matching specification in a list of specifications as the specification list information about the own vehicle 200 from a list of specifications as the specification list information about the main vehicle. An unmatched specification is stored as a new specification (second specific specification) in a specification difference storage area (specification difference information storage section) 202*b* predetermined in RAM 202. A missing specification is unmatched in the list of specifications as the specification list information about the main vehicle 100 and is stored as a first specific specification in the specification difference storage area (specification difference information storage section) 202*b* predetermined in RAM 202. The specification difference information includes these new specifications and missing specifications. According to the embodiment, the specification difference information is stored as specification difference list information in the RAM 202 as shown in FIG. 17.

At Step S408, the program executes a specification difference notification program (specification difference recognition support process, result notification means, advice information generation means, vehicle body contrast image generation means) 323*w*. The specification difference notification program 323*w* includes a specification difference initial notification program and a conditional specification difference notification program. The specification difference initial notification program provides a notification in accordance with the engine start control. The conditional specification difference notification program provides a notification when a notification condition settled for each specification is satisfied. According to the embodiment, the specification difference initial notification program in FIG. 18 notifies a specification difference between the vehicle 200 and the main vehicle 100 for the initial notification. The conditional specification difference notification program in FIG. 19 notifies the other specification differences. Alternatively, the specification difference initial notification program may notify all specification differences in advance. The conditional specification difference notification program may notify only necessary specification differences.

Figure 18:
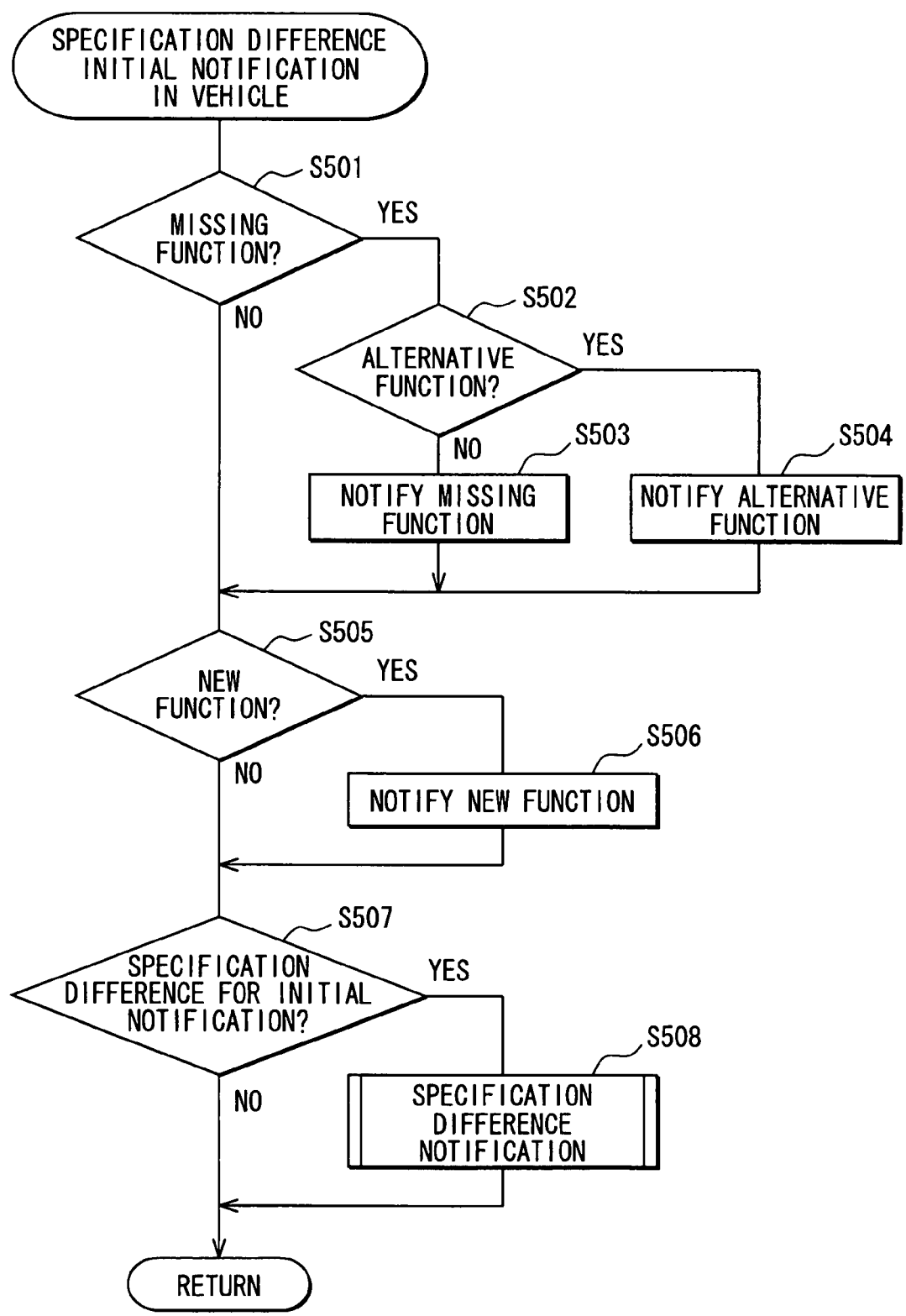
FIG. 18 shows a flowchart showing a specification difference initial notification process in the vehicle.

The following describes the specification difference initial notification program with reference to a flowchart in FIG. 18. At Step S501, the program determines the presence or absence of a missing specification. The missing specification concerns vehicle's onboard functions and is missing in the vehicle 200. The missing specification is equivalent to a main vehicle specific function and is hereafter referred to as a missing function. When no missing function is present, the program proceeds to Step S505. When a missing function is present, the program proceeds to Step S502.

At Step S502, the program determines the presence or absence of an alternative function that equivalently or at least partially provides the effect of the missing function. To detect the presence or absence of an alternative function (equivalent function), the program specifically determines the presence or absence of an alternative function information (equivalent function information) corresponding to the specifications listed in the specification difference information in FIG. 17 based on the specification list information about the own vehicle 200 stored in the own-vehicle specification list storage section 626*c* and the specification list information about the user's main vehicle 100 stored in the other-vehicle specification list storage section 626*d*. When an alternative function is available, the program proceeds to Step S504. When no alternative function is available, the program proceeds to Step S503.

At Step S503, the program notifies the presence of the missing function as difference information. In addition, the program notifies difference information concerning the presence of the missing function and corresponding advice information. To notify the difference information and the advice information, the program reads corresponding notification data from the notification data list information (FIGS. 14A and 14B) stored in a notification data storage section 626g and uses that data for speech output and/or screen display. When the notification data list information does not contain notification data corresponding to the targeted missing function, the program requests the information center 20 to transmit the corresponding notification data. Based on the received notification data, the program notifies the difference information and the advice information by means of speech output and screen display. The received notification data is stored by adding it to the notification data list information stored in the notification data storage section 626g. Upon completion of Step S503, the program proceeds to Step S505.

At Step S504, the program notifies the presence of the missing function as difference information and notifies an alternative function for the missing function. To notify the difference information, the program reads corresponding notification data from the notification data list information (FIGS. 14A and 14B) stored in the notification data storage section 626g and uses the difference information for speech output and/or screen display. On the other hand, the program notifies the alternative function by notifying the difference information followed by a fixed phrase such as "Use (alternative function) provided for the vehicle," where the parentheses are replaced by an alternative function name. It is assumed that the fixed phrase or notification data for the alternative function name is stored correspondingly to each function contained in the notification data list information. Further, it may be preferable to store the advice information such as instructions for using the alternative function or notes on the same corresponding to the functions contained in the notification data list information and additionally notify the advice information following the notification using the fixed phrase. Upon completion of Step S504, the program proceeds to Step S505.

At Step S505, the program determines the presence or absence of a new specification. The new specification concerns vehicle's onboard functions and is missing in the main vehicle 100, but is provided for the vehicle 200. The new specification is equivalent to a sub vehicle specific function and is hereafter referred to as a new function. When no new function is available, the program proceeds to Step S507. When a new function is available, the program proceeds to Step S506.

At Step S506, the program notifies the presence of the new function as difference information and notifies difference information concerning the presence of the new function and corresponding advice information. To notify the difference information and the advice information, the program reads corresponding notification data from the notification data list information (FIGS. 14A and 14B) stored in the notification data storage section 626g and uses the notification data for speech output and/or screen display. When the notification data list information does not contain notification data corresponding to the targeted new function, the program requests the information center 20 to transmit the corresponding notification data. Based on the received notification data, the program notifies the difference information and the advice information by means of speech output and screen display. The received notification data is stored by adding it to the notification data list information stored in the notification data storage section 626g. Upon completion of Step S506, the program proceeds to Step S507.

Figures 28, 30:
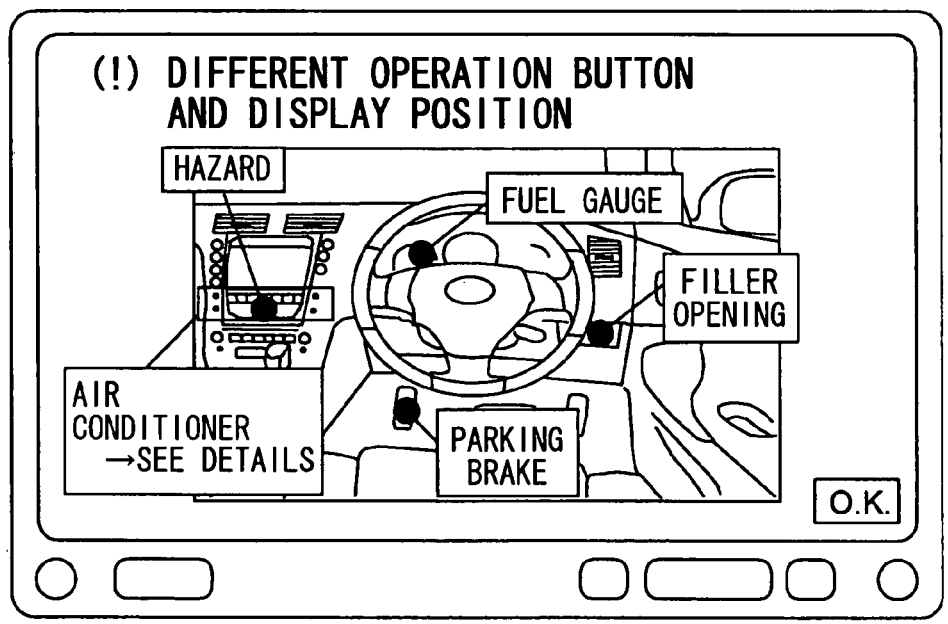
FIG. 28 shows an example of displaying a specification difference concerning vehicle's fail-safe.
FIG. 30 shows an example of displaying a specification difference concerning layout of a vehicle's functional operation section.

The specifications concerning the vehicle's onboard functions include vehicle's fail-safe, security equipment, and driving support equipment. As shown in FIG. 28, it is possible to notify a specification difference in an easily understood manner by displaying all specifications (functions) containing the difference in a list on the same screen. It is especially understandable to display a missing function and a new function contrastingly.

At Step S507, the program determines the presence or absence of a specification difference targeted for initial notification concerning the other specifications than the specifications for the above-mentioned functions. Specifically, the program determines whether or not the other specifications than the specifications for the above-mentioned functions contained in the specification difference list information in FIG. 17 are defined as initial notification (marked as "Initial" in the drawings) corresponding to the notification condition for the notification data list information in FIGS. 14A and 14B. When there is no specification difference for initial notification, the specification difference initial notification program terminates. When there is a specification difference for initial notification, the program proceeds to Step S508.

At Step S508, the program extracts the specification that has a difference and is determined to be targeted for the initial notification. The program then individually notifies a specification difference. That is, a specific individual difference notification program is provided for a specification that is excluded from the specifications concerning the above-mentioned functions and is targeted for the initial notification in the notification data list information in FIGS. 14A and 14B. The specification difference notification is performed based on the individual difference notification program.

Figure 20:
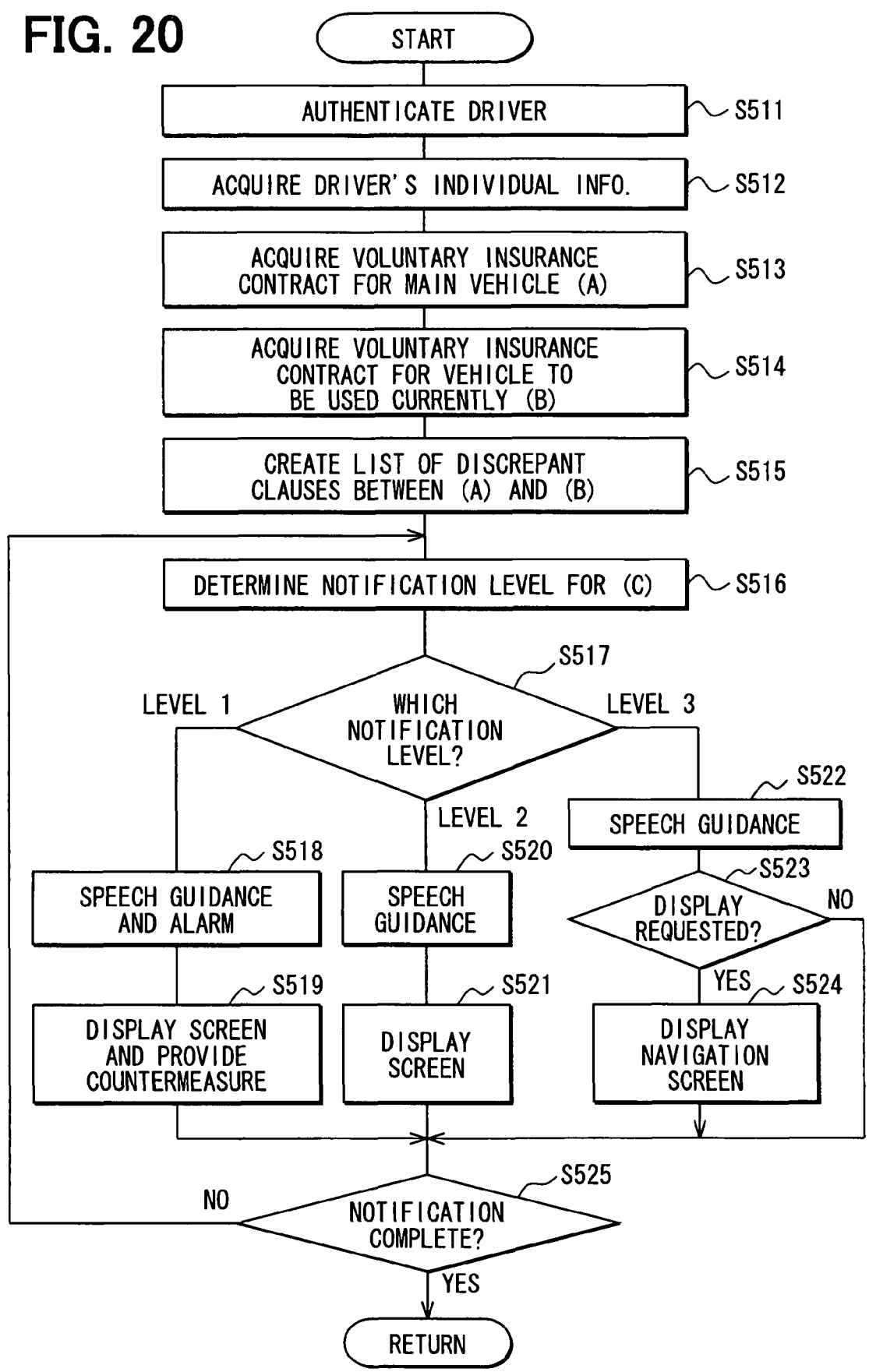
FIG. 20 shows a specification difference matching control process concerning vehicle's insurance.

For example, an individual difference notification program as shown in FIG. 20 notifies a specification difference in a specification concerning a vehicle insurance. At Step S511, the program authenticates a driver based on the driver's individual identification information stored in the individual identification information storage section 626h. According to the embodiment, the information center 20 performs the authentication process. Specifically, the information center 20 is executing a driver's individual information transmission program. The vehicle 200 wirelessly transmits the individual identification information stored in the individual identification information storage section 626h and a driver's individual information transmission request to the information center 20. While waiting for reception, the information center 20 authenticates the driver based on the received individual identification information and returns a driver authentication result to the vehicle. Only when the authentication is successful, the information center 20 returns the individual information about the driver authenticated by the driver authentication process to the requesting vehicle. The vehicle wirelessly receives the driver's individual information at Step S512.

At Steps S513 and S514, the program acquires voluntary insurance contract information about the main vehicle (reference vehicle) of the user authenticated at Step S511 and voluntary insurance contract information about the other vehicle. At Step S515, the program acquires difference information. The voluntary insurance contract information can be acquired from the corresponding specification list information stored in the own-vehicle specification list storage section 626c and the other-vehicle specification list storage section 626d. When there is a need for more detailed difference notification according to each contract clause, more detailed insurance contract information may be stored in the information center 20 and may be wirelessly received from the information center 20 by performing a driver authentication process. In this case, at Step S515, the program compares detailed voluntary insurance contract information acquired at Steps S513 and S514 on a clause basis and creates discrepant clause extraction list information containing extracted discrepant clauses. The discrepant clause extraction list information is created so that a discrepancy level is calculated according to a difference size for each insurance contract clause and is associated with each insurance contract clause.

At Steps S516 through S525, the program sequentially notifies insurance contract clauses listed as the discrepant clause extraction list information using notification contents corresponding to the discrepancy levels. When the discrepancy level exceeds a specified level, it may be preferable to provide a countermeasure corresponding to the discrepancy content.

Specifically, the program selects a listed insurance contract clause from the discrepant clause extraction list information at Step S516. The program determines a discrepancy level (notification level in the drawing) of the selected insurance contract clause. The embodiment uses three levels from the highest level 1.

Figure 21:
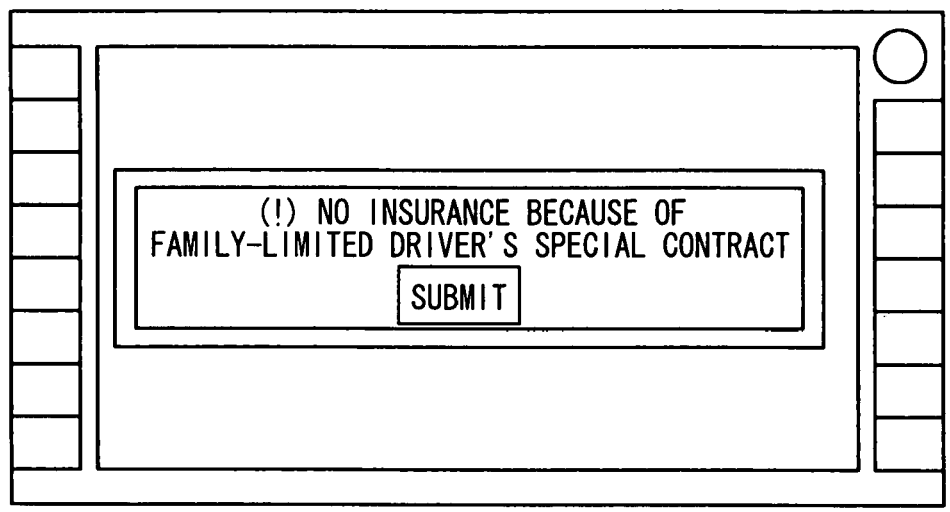
FIG. 21 shows an example of displaying a specification difference concerning vehicle's insurance.

In case of the highest discrepancy level 1, the program proceeds to Steps S518 and S519. In this case, an alarm sound is generated. An audio output unit 212 outputs a speech to notify that the insurance contract clause has a discrepancy (specification difference concerning the insurance). A display apparatus 213 displays a screen to notify the content of the discrepant insurance contract clause (the content of the specification difference concerning the insurance). For example, a guidance is provided using speech output such as "the family-limited driver's special contract differs from the usual vehicle." The display apparatus 213 displays a screen showing the content of the discrepant insurance contract clause as shown in FIG. 21 as well as a screen for confirmation as needed. The display apparatus 213 displays a screen showing a countermeasure against the discrepant content. As the countermeasure, for example, it may be preferable to provide a touch switch that displays a Web page for entering into a new insurance contract.

In case of the discrepancy level 2, the program proceeds to Steps S520 and S521. In this case, the audio output unit 212 outputs a speech and the display apparatus 213 displays a screen to notify the content of the discrepant insurance contract clause (the content of the specification difference concerning the insurance). In case of the lowest discrepancy level 3, the program proceeds to Steps S522 through S524. In this case, the audio output unit 212 outputs a speech to notify only the presence of a discrepancy in the insurance contract clause (notification of a specification difference concerning the insurance). Depending on the user's selection, the display apparatus 213 displays a screen to notify the content of the discrepant insurance contract clause (the content of the specification difference concerning the insurance).

Figure 22:
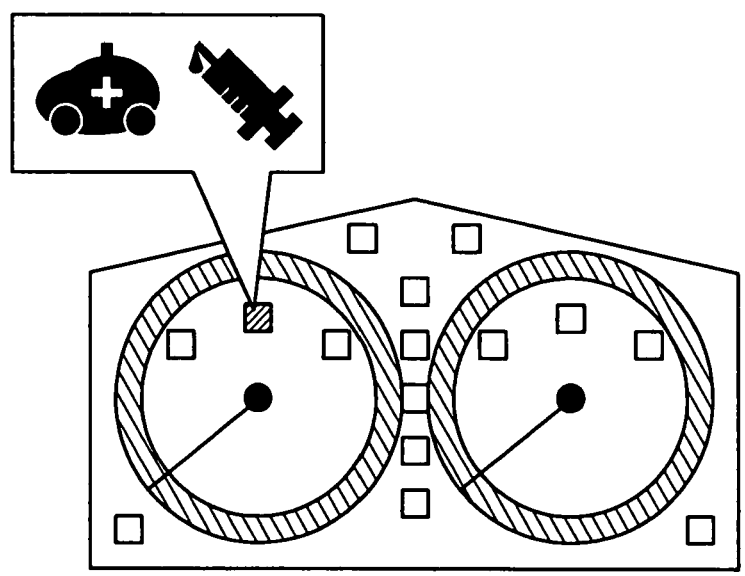
FIG. 22 shows an example of displaying a specification difference concerning vehicle's insurance on a meter.

The speech output is not an only way to notify a discrepancy in the insurance contract clause (notify a specification difference concerning the insurance). As shown in FIG. 22, for example, it may be preferable to use a meter display apparatus 280 that can be easily recognized by a driver. The meter display apparatus 280 may display a symbol mark for notifying the presence of a specification difference concerning the insurance by lighting the symbol mark or displaying an equivalent image.

Upon completion of notifying all clauses in the discrepant clause extraction list information, the individual difference notification program terminates.

Figures 26, 27:
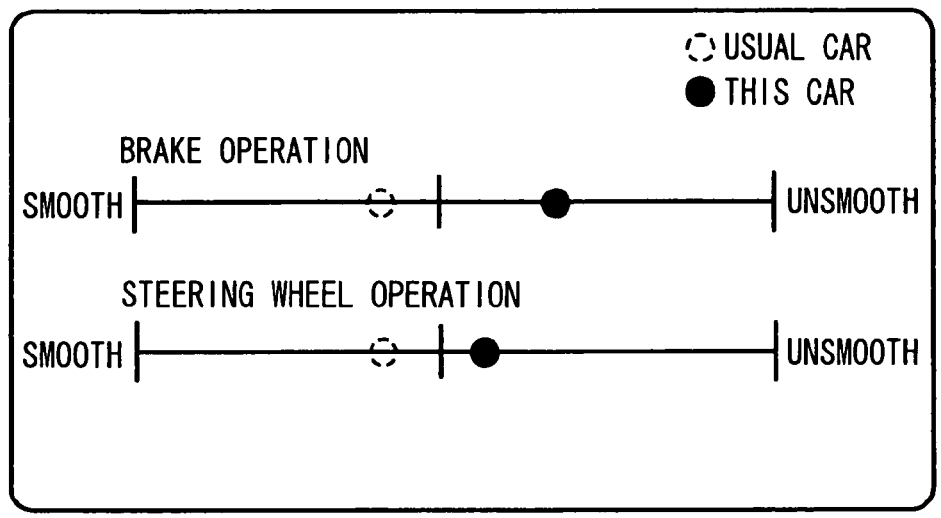
FIG. 26 shows an example of displaying a specification difference concerning vehicle's brake or steering operation characteristics.
FIG. 27 shows an example of displaying a specification difference concerning vehicle's types of brake system, drive system, and tire.

When the individual difference notification program is executed for specifications on driving, braking, and running a vehicle, the display apparatus 213 displays a screen as shown in FIG. 26, for example. The display apparatus 213 may notify a specification difference between the vehicle 200 and the driver's main vehicle (reference vehicle) concerning characteristics of brake and steering operations. In addition, the advice information may be notified. A speech notification may be provided as well as a screen display.

When the individual difference notification program is executed for specifications on driving, braking, and running a vehicle, the display apparatus 213 displays a screen as shown in FIG. 27, for example. The display apparatus 213 may notify a specification difference between the vehicle 200 and the driver's main vehicle (reference vehicle) concerning at least any one of types of brake system, drive system, and tire. In addition, as shown in FIG. 27, the advice information may be notified. A speech notification may be provided as well as a screen display.

In this case, weather information or road information may be notified as the advice information. Specifically, the navigation apparatus (running condition acquisition means) may be used to acquire vehicle running condition information containing either or both the weather information and the road information. The vehicle running condition information may be displayed as the advice information. The example in FIG. 27 displays the present weather information and the vehicle's destination. It may be preferable to notify a specification difference between the vehicle 200 currently used by the driver and the driver's main vehicle (reference vehicle) concerning at least any one of types of brake system, drive system, and tire. The vehicle running condition information may be used as a notification condition. The notification may be provided when the notification condition is satisfied.

With respect to the specifications on braking and running the vehicle, the display apparatus 213 may display a specification difference concerning at least any one of types of brake system, drive system, and tire concurrently with a specification difference concerning the vehicle's onboard functions (such as a fail-safe device) as shown in FIG. 28, for example.

When the individual difference notification program is executed for vehicle body specifications, the program can notify at least any one of differences in the vehicle's height, width, length, ground clearance, minimum turning radius, and blind spot.

Figure 29A:
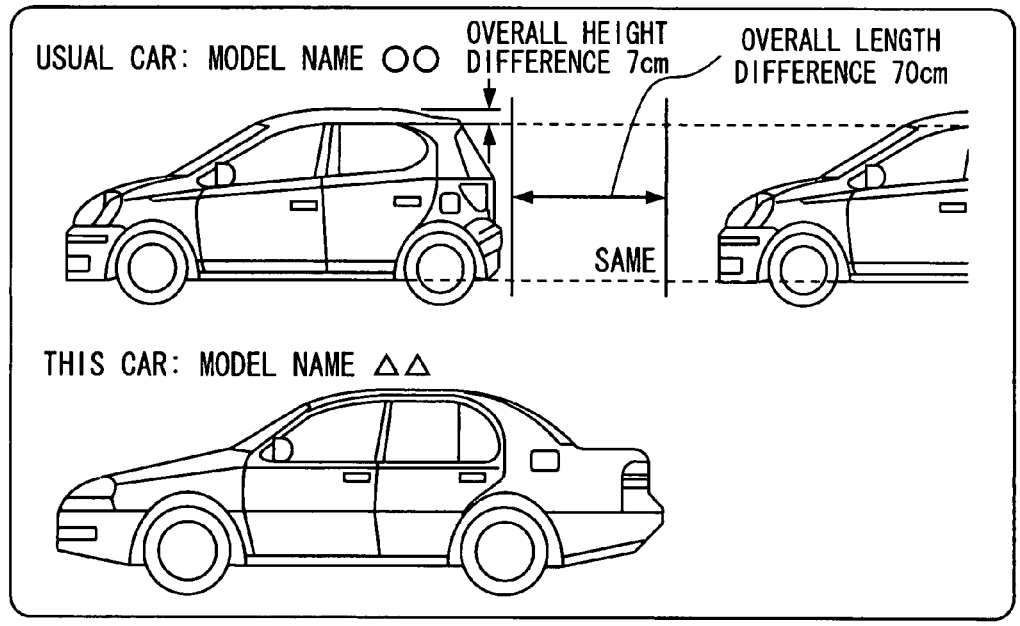
FIGS. 29A and 29B show examples of displaying a specification difference concerning vehicle body specifications.
Figure 29B:
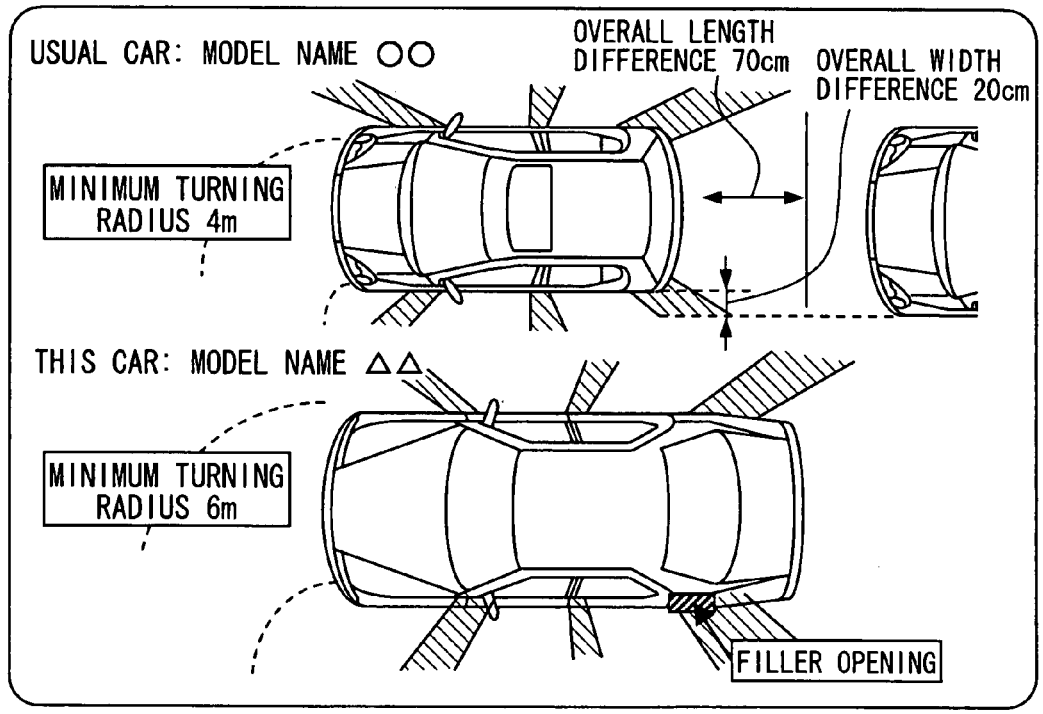

For example, the display apparatus 213 can display screens as shown in FIGS. 29A and 29B to indicate differences between the vehicle 200 and the driver's main vehicle (reference vehicle) in terms of the vehicles' heights, widths, lengths, ground clearances, minimum turning radiuses, and blind spots. In FIGS. 29A and 29B, the individual difference notification program generates and displays a vehicle body contrast image that indicates a vehicle body specification difference between the vehicle 200 and the driver's main vehicle (reference vehicle) in contrast with each other. It is possible to more clearly recognize a vehicle body specification difference. Vehicle body specification differences become more easily recognizable when a vehicle body contrast image is generated so as to overlay the vehicle 200 and the driver's main vehicle (reference vehicle). The differences become much more easily recognizable by changing colors and line types for displaying both vehicle bodies to be contrasted.

Figure 24:
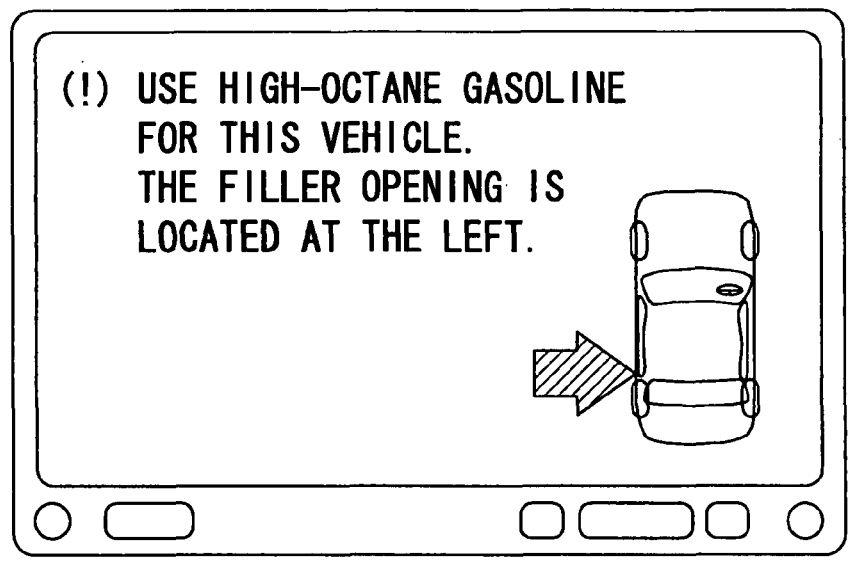
FIG. 24 shows an example of displaying a specification difference concerning vehicle's fuel information.
Figure 25:
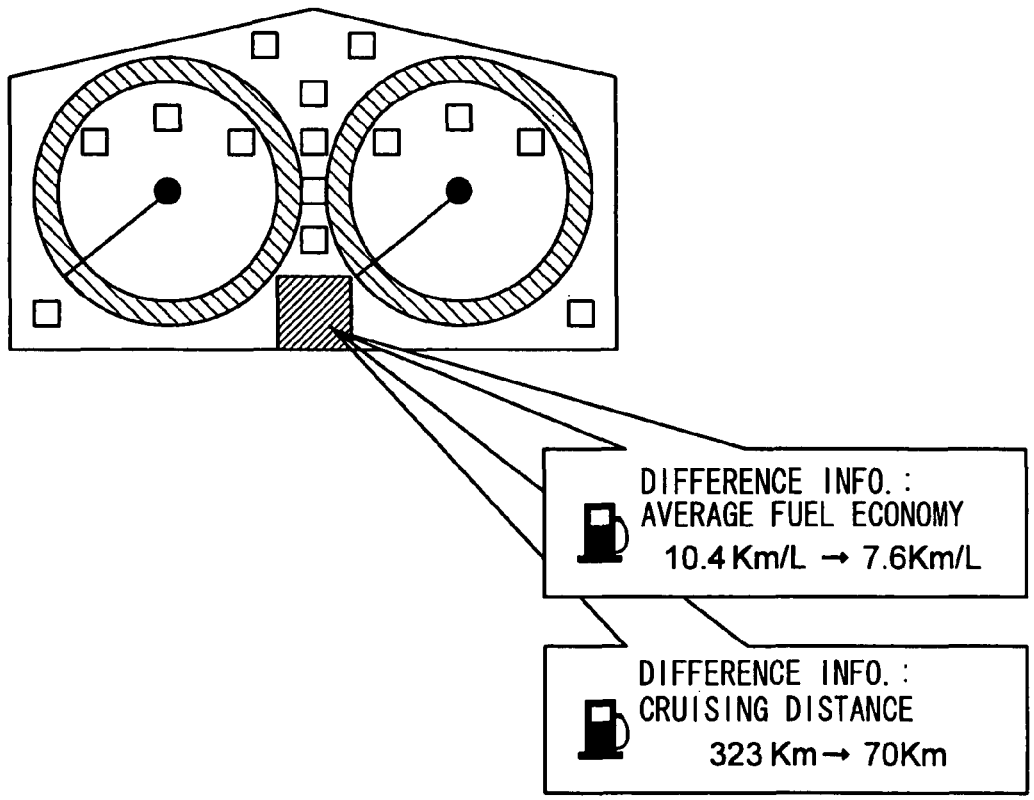
FIG. 25 shows an example of displaying a specification difference concerning vehicle's fuel information on a meter.

When the individual difference notification program is executed for vehicles' fuel-related specifications, the program can notify at least any one of differences in fuel types, fuel economies, cruising distances, and filler opening positions. As shown in FIG. 29B, for example, the display apparatus 213 can add the display of a filler opening position to the vehicle body contrast image indicating vehicle body specification differences. As shown in FIG. 24, the display apparatus 213 can notify differences in the fuel type and the filler opening position by concurrently displaying them. FIG. 25 shows notification of differences in the fuel economy and the cruising distance. The differences can be displayed on the meter display apparatus 280 provided at a position most recognizable to the driver.

The individual difference notification program is executed for specifications of functional operation sections provided inside the vehicle in the following cases. In one case, a functional operation section is provided at different layout positions in the vehicle the user is going to use and in the user's main vehicle (reference vehicle). In another case, a functional operation section is not provided for the vehicle the user is going to use and is provided for the user's main vehicle (reference vehicle). In still another case, a functional operation section is provided for the vehicle the user is going to use and is not provided for the user's main vehicle (reference vehicle). In any of these cases, the individual difference notification program can generate and output a functional operation section layout image that indicates layout positions of the vehicle's functional operation sections or the presence or absence of the layout as shown in FIG. 30. The CPU 201 executes the individual difference notification program so that functional operation section layout image generation means functions. The display of the advice information may be added to the functional operation section layout image. A speech notification may be provided as well as a screen display.

Figure 19:
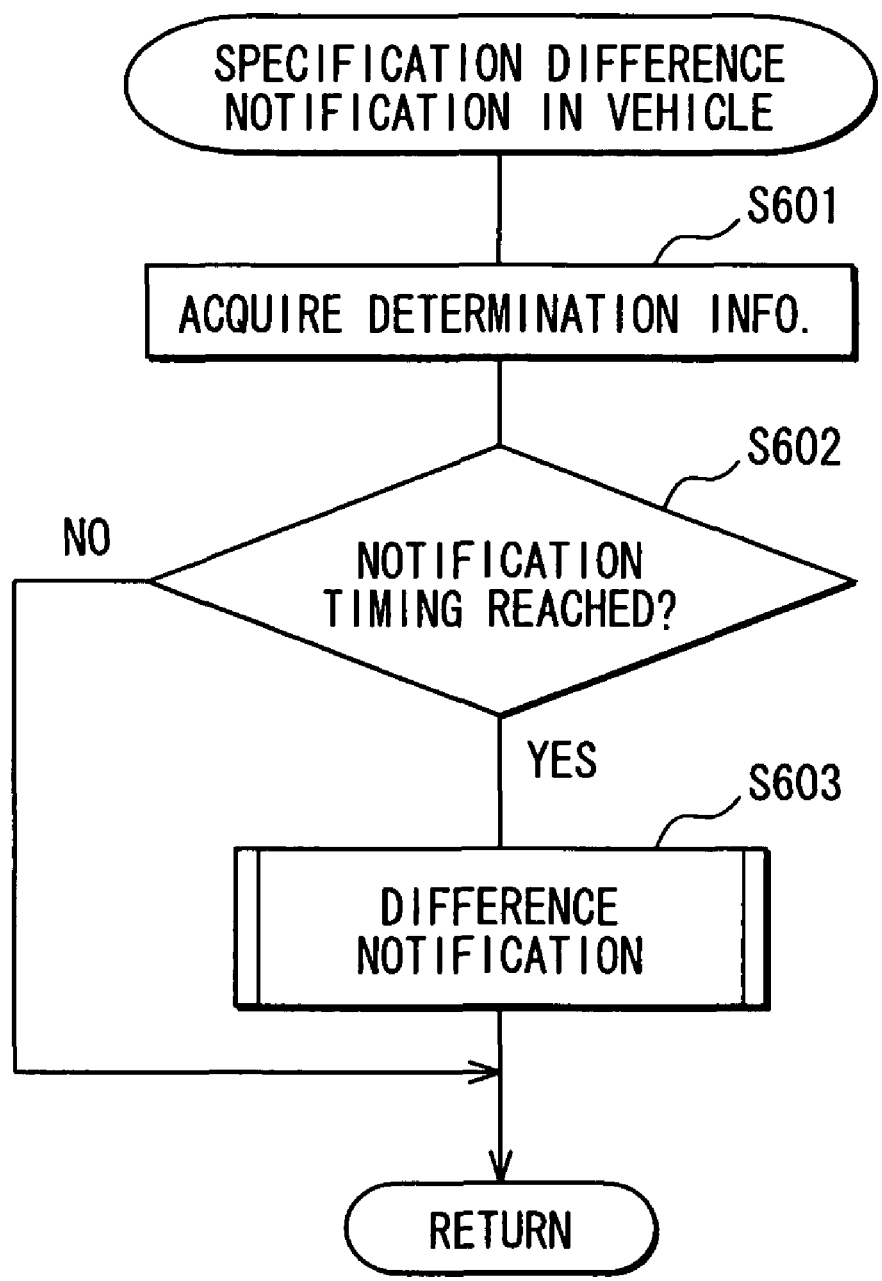
FIG. 19 shows a flowchart describing a specification difference condition notification process in the vehicle.

Now let us return to FIG. 16. At Step S408, the main program terminates the specification difference initial notification program contained in the specification difference notification program 323w. The program then proceeds to Step S409 to execute the conditional specification difference notification program also contained in the specification difference notification program 323w. The conditional specification difference notification program notifies a specification difference when a notification condition settled for each specification is satisfied. As shown in FIG. 19, the conditional specification difference notification program acquires specification difference notification determination information at Step S601. The specification difference notification determination information is predetermined for each specification of the vehicle. At Step S601, the conditional specification difference notification program acquires types of specification difference notification determination information needed to implement specifications contained in the specification difference information acquired at Step S407 in FIG. 16.

At Step S602, the program determines based on the acquired specification difference notification determination information whether or not it is a difference notification timing to notify a specification difference. Specifically, the program determines whether or not the specification difference notification determination information acquired at Step S601 satisfies a notification condition for the notification data list in FIGS. 14A and 14B. When the notification condition for the notification data list is satisfied, the program proceeds to Step S603. Based on the difference information for the notification data list, the program notifies not only a difference in the corresponding specification but also the advice information.

Figure 23:
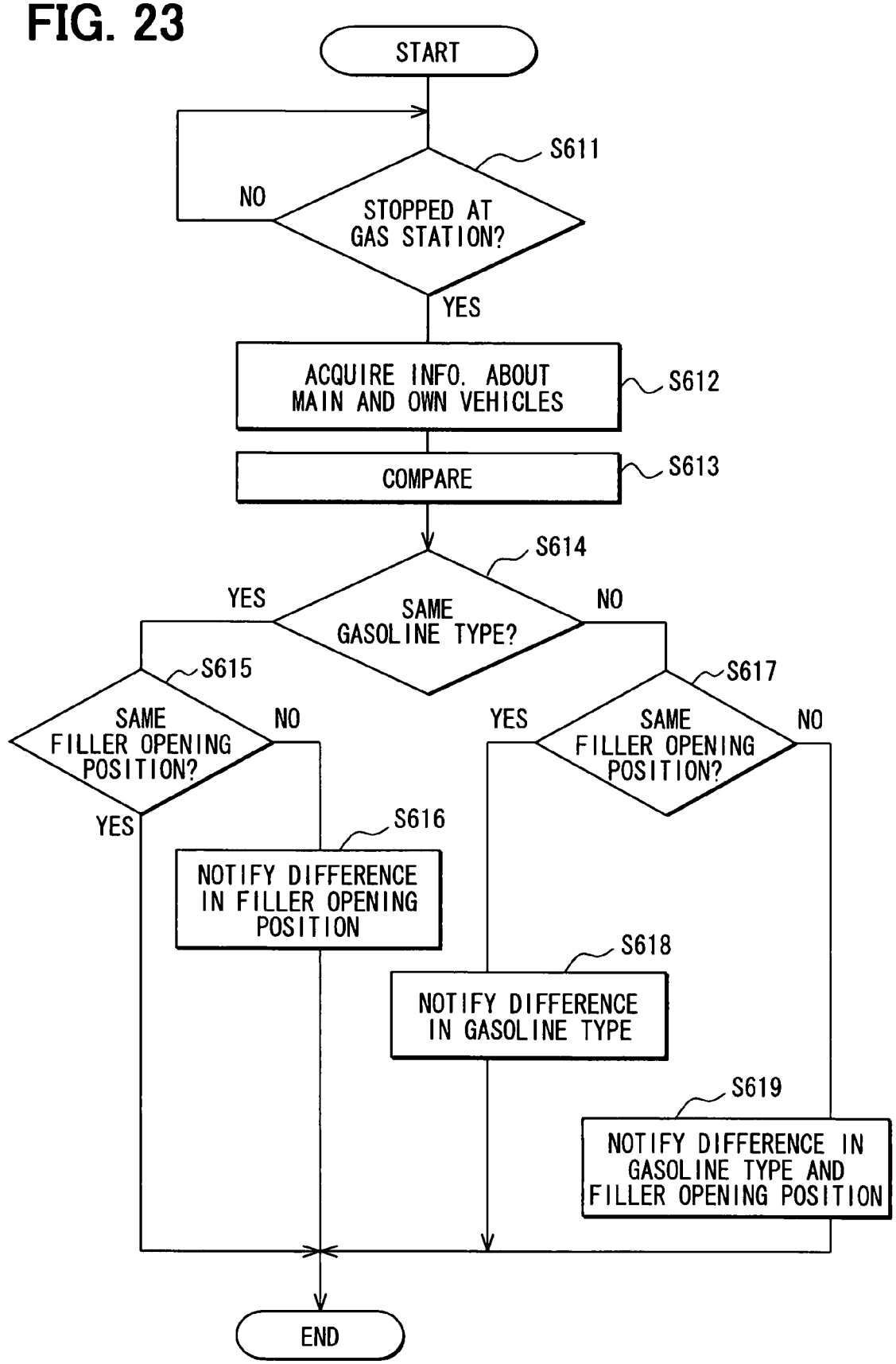
FIG. 23 shows a specification difference matching control process concerning vehicle's fuel information.

For example, the conditional specification difference notification program can be executed as shown in FIG. 23 when the program concerns the vehicle's fuel-relate specification, especially the filler opening position and the fuel type. In this case, the specification difference notification determination information is equivalent to the own vehicle's position and the vehicle speed information acquired by the navigation apparatus 290. The notification condition is that the own vehicle 200 is currently positioned at a gas station and stops. At Step S611, the program acquires the specification difference notification determination information and determines whether or not the difference notification timing is satisfied. In this example, the program determines whether or not the own vehicle stops at the gas station. When the difference notification timing is satisfied, the program proceeds to Step S612. The program acquires the specification list information about the main vehicle of the user using the own vehicle 200 from the other-vehicle specification list storage section 626d. In addition, the program acquires the specification list information about the own vehicle 200 from the own-vehicle specification list storage section 626c. At Step S613, the program compares both acquired specification list information. Specifically, the program compares filler opening positions and gasoline types contained in both specification list information.

At Step S614, the program determines whether or not the same gasoline type is used for the own vehicle 200 and the main vehicle of the user using the own vehicle 200. When it is determined that the same gasoline type is used, the program proceeds to Step S615 and determines whether or not the same filler opening position is used. Only when the filler opening positions differ, the program proceeds to Step S616 and notifies a difference in the filler opening positions. The conditional specification difference notification program then terminates. On the other hand, it may be determined at Step S614 that different gasoline types are used for the own vehicle 200 and the main vehicle of the user using the own vehicle 200. In this case, the program proceeds to Step S617 and determines whether or not the same filler opening position is used. When the same filler opening position is used, the program notifies a difference in the gasoline types. When the filler opening positions differ, the program notifies that both the filler opening positions and the gasoline types differ. At Step S616, the conditional specification difference notification program notifies a difference in the filler opening positions, and then terminates.

Now let us return to FIG. 16. When the specification difference notified at Step S409 concerns a vehicle function, the program performs the function as needed at Step S410. According to the embodiment, Steps S409 and S410 are repeated until the accessory is turned off according to a key operation for stopping the engine. When the accessory is turned off, control returns to the main program 323x in FIG. 15. Upon completion of Step S320 in FIG. 15, the program proceeds to Step S317. The process at Step S317 is already described above. According to the embodiment, the program performs the function at Step S410 according to the function execution process in FIG. 5 using a prompt and the learning data contained in the main vehicle information received at Step S405. However, the program may perform the function at Step S410 without using the prompt or the learning data. In this case, only the main vehicle's specification list information may be contained in the main vehicle information that is transmitted from the information center 20 at Step S46 and is received by the own vehicle 200 at Step S405 in FIG. 16. No learning data may be contained.

When the first and second vehicles are provided, the embodiment may notify the presence of at least one of the fail-safe, the security equipment, and the driving support equipment that are not mounted on the one vehicle the user is going use but are mounted on the other, and that are mounted on the one vehicle but are less functional than those mounted on the other.

According to the embodiment, the own-vehicle specification list storage section (first vehicle specification identifying information source) 616c provided for the main vehicle (first vehicle or reference vehicle) delivers the specification list information (first vehicle specification identifying information) about the main vehicle of the user using the second vehicle. The vehicle 200 acquires that information via the information center 20. Specifically, the specification list information is wirelessly transmitted to the information center 20 at Step S312 of the main program 313x executed on the main vehicle (first vehicle or reference vehicle). The information center 20 wirelessly receives the specification list information and stores it on the HDD 25 for update. The vehicle 200 acquires (wirelessly receives) the specification list information stored and updated in the HDD 25 of the information center 20 at Step S405 of the specification difference matching control program 313z executed on the vehicle 200. The content of the specification list information is compared to that of own-vehicle list information (second vehicle specification identifying information) acquired or read from the own-vehicle specification list storage section 626c of the vehicle 200. In this case, the operation switch group 111 may be provided with a specification list information change input section (specification list information change means) for supplying a change to the specification list information so as to be able to change the specification list information stored in the own-vehicle specification list storage section 616c. This makes it possible to use the specification list information change input section for changing the specification when a new specification is added to the vehicle or a specification is deleted therefrom. The changed specification list information updates the specification list information stored in the HDD 25 of the information center 20. The information center 20 can store the up-to-date specification list information about the main vehicle.

Figure 31:
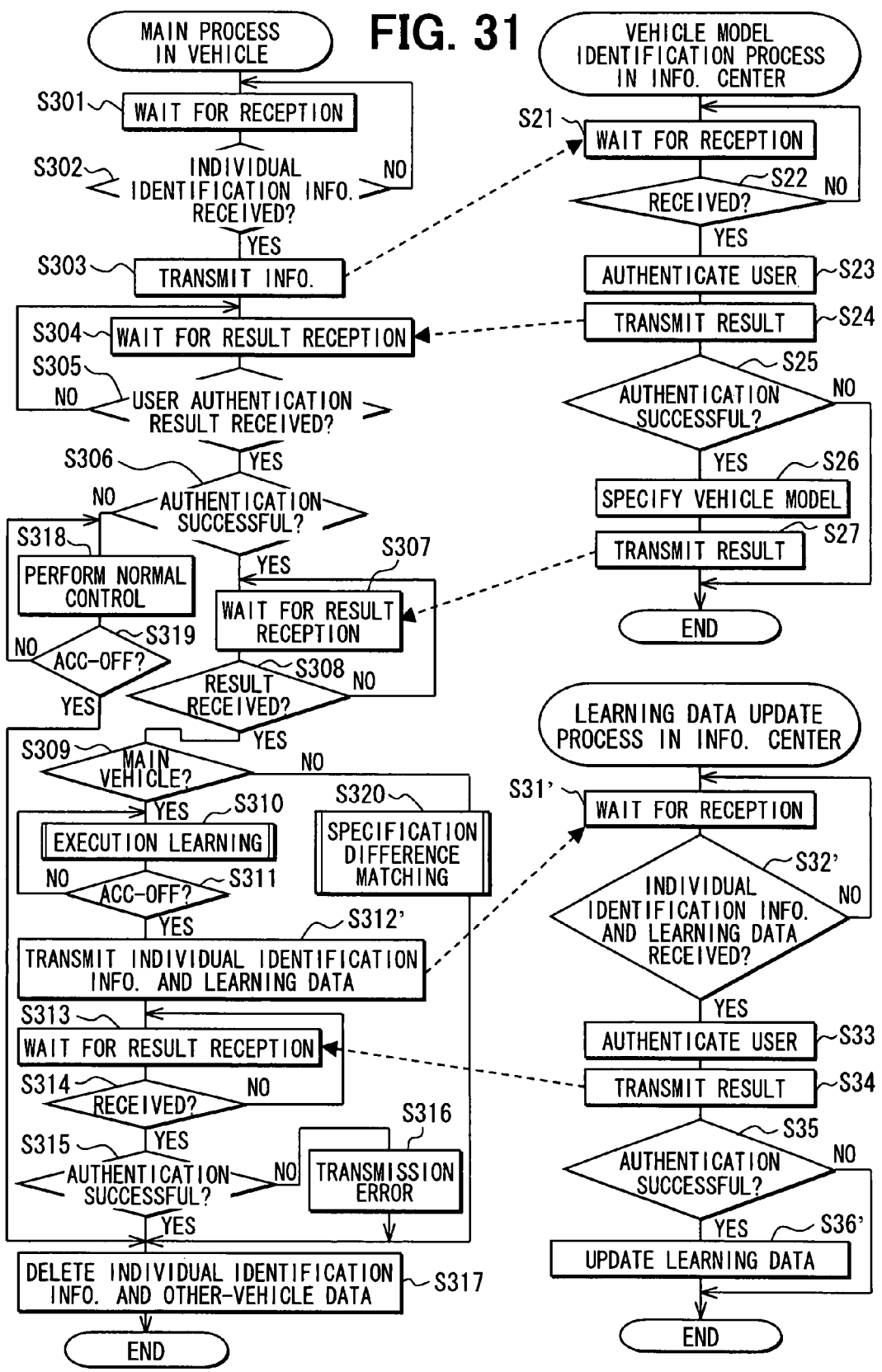
FIG. 31 shows flowcharts describing a main process in the vehicle, a vehicle model identification process in the information center, and a learning data update process in the information center as differing from the flowcharts in FIG. 15.

According to the embodiment, the information center 20 stores and accumulates the specification list information about the main vehicle in the HDD 25 by receiving that information from the vehicle. Further, the specification list information about the main vehicle may be prestored in the HDD 25 of the information center 20 as external storage means. In this case, the main vehicle information update program 25c is executed as the learning data update program as shown in FIG. 31. Specifically, the learning data update program receives only the learning data as the main vehicle information (Steps S31' and S32') and updates it (Step S36'). In addition, the main programs 313x and 323x on the vehicle are also constructed to transmit only the learning data (Step S312') for updating the main vehicle information in the information center 20.

The embodiment provides the specification list storage sections 616c and 626c for storing the specification list information about the vehicles 200. It may be preferable to store the specification list information about the vehicles transmitted from the information center 20. That is, the information center 20 may be constructed to integratively manage the specification list information about the registered user's vehicle without always storing the specification list information in the vehicle.

According to the embodiment, the vehicle acquires the specification difference information. The information center 20 may be constructed to perform this process and wirelessly transmit a result to the vehicle.

In addition, the main vehicle may represent the most recently used vehicle instead of the familiar reference vehicle. In this case, the information center 20 transmits and receives the most recently used vehicle information instead of the main vehicle information to perform the above-mentioned process according to the embodiment.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

A user assistance system for vehicle according to a first aspect includes: a first identifying information acquisition unit that acquires first vehicle specification identifying information for identifying a first vehicle specification from a predetermined information delivery source; a second identifying information acquisition unit that acquires second vehicle specification identifying information for identifying a second vehicle specification from a predetermined information delivery source; a comparison unit that compares the acquired first vehicle specification identifying information with the acquired second vehicle specification identifying information; and a recognition support unit that performs a specification difference recognition support process based on a result of comparison made by the comparison unit between the first vehicle specification identifying information and the second vehicle specification identifying information, wherein the specification difference recognition support process allows a user to recognize a specification difference between the first and second vehicles when the user is common to the first and second vehicles and uses one of both vehicles.

The above-mentioned construction performs the specification difference recognition support process that allows a user to recognize a specification difference according to a result of comparing the contents of the first vehicle specification identifying information and the second vehicle specification identifying information. The first vehicle specification identifying information is used to identify a first vehicle specification. The second vehicle specification identifying information is used to identify a second vehicle specification. The user can easily recognize a difference between the first vehicle specification and the second vehicle specification. The user can drive the vehicle in consideration for the difference in the other vehicle without being embarrassed at the difference.

According to the above-mentioned construction, the first vehicle can be defined as the reference vehicle. In this case, the recognition support unit can perform the specification difference recognition support process. This process allows the user to recognize a specification difference between the first and second vehicles when he or she uses the second vehicle. According to the construction, the reference vehicle (first vehicle) can be defined as a vehicle the user frequently uses or drives. When the user uses or drives another vehicle (second vehicle), he or she can recognize a specification difference between both vehicles. The user can use or drive the vehicle by recognizing a difference between the current vehicle and the usual vehicle. When the current vehicle has a function unavailable to the usual vehicle, the user can effectively use that function. When the current vehicle lacks a function provided for the usual vehicle, the user can use the vehicle in consideration for unavailability of that function.

The first identifying information acquisition unit can acquire first vehicle specification identifying information using a first vehicle specification identifying information source provided for the first vehicle as the information delivery source. The second identifying information acquisition unit can acquire second vehicle specification identifying information using the second vehicle specification identifying information source provided for the second vehicle as an information delivery source. According to the construction, each vehicle can surely save its vehicle specification identifying information. The vehicle makes it possible to reliably acquire its own vehicle specification identifying information.

In this case, the first vehicle can be provided with a first identifying information transmission unit that transmits the first vehicle specification identifying information to an information relay unit. The information relay unit can be provided with a first identifying information reception unit that receives the first vehicle specification identifying information. In addition, the information relay unit can be provided with a first identifying information storage unit that stores the received first vehicle specification identifying information as reference vehicle specification identifying information in a first identifying information storage section (reference vehicle specification identifying information storage section). In this case, the comparison unit can acquire the first vehicle specification identifying information from the first identifying information storage section of the information relay unit. The comparison unit can compare the acquired information with the second vehicle specification identifying information acquired by the second identifying information acquisition unit mounted on the second vehicle. For example, the reference vehicle (first vehicle) can be defined as a vehicle the user frequently uses or drives. The information relay unit stores the specification identifying information about the reference vehicle. When driving another vehicle (second vehicle) different from the usual reference vehicle, the user can acquire the specification identifying information (first vehicle specification identifying information) about the reference vehicle via the information relay unit even though the reference vehicle does not actually exist.

The information relay unit can be provided as a wireless information terminal carried by the user. According to the construction, a first identifying information transmission unit of the first vehicle can wirelessly transmit the first vehicle specification identifying information. A first identifying information reception unit of the wireless information terminal can wirelessly receive the wirelessly transmitted first vehicle specification identifying information. In this manner, the wireless information terminal can easily acquire the first vehicle specification identifying information from the first vehicle by means of wireless communication. Since the wireless information terminal is portable, the user can always carry the specification identifying information (first vehicle specification identifying information) about his or her own reference vehicle. The wireless information terminal can more reliably acquire the first vehicle specification identifying information from the first vehicle by approaching the first vehicle (e.g., controlling to start an engine or detecting boarding on the vehicle).

The wireless information terminal can be equipped with the comparison unit or the recognition support unit. The wireless information terminal can be collectively provided with the major functions, making it possible to reduce processing loads on the vehicle.

On the other hand, the information relay unit can be provided as a host apparatus connected with the first identifying information transmission unit via a wireless connection network. According to this construction, the first identifying information transmission unit of the first vehicle can wirelessly transmit the first vehicle specification identifying information. The first identifying information reception unit of the host apparatus can wirelessly receive the wirelessly transmitted first vehicle specification identifying information. In this manner, the host apparatus can easily acquire the first vehicle specification identifying information from the first vehicle by means of wireless communication. Since the stationary host apparatus is used for the wireless communication, the communication becomes stable, making it possible to reliably acquire the first vehicle specification identifying information.

At this time, the second vehicle is provided with an authentication unit for authenticating a user who uses the second vehicle. Only when the authentication is accepted, the first identifying information acquisition unit can acquire the first vehicle specification identifying information from the host apparatus. According to the construction, only the user authenticated by the second vehicle can acquire the first vehicle specification identifying information from the host apparatus. It is impossible to acquire the other's first vehicle specification identifying information from the host apparatus. The user authentication is settled to authenticate only the user who stores or registers the specification identifying information about the first vehicle as his or her own reference vehicle to a first identifying information storage section (reference vehicle specification identifying information storage section) of the host apparatus.

Further, there can be provided reference vehicle determination unit for determining whether or not the user authenticated by the second vehicle defines the vehicle as the reference vehicle. When the second vehicle is not the reference vehicle, it is possible to acquire the authenticated user's reference vehicle specification identifying information (first vehicle specification identifying information) from the first identifying information storage section. In this manner, the specification difference recognition support process can be performed only when the user using the second vehicle does not define the vehicle as the reference vehicle.

The second vehicle can be equipped with the comparison unit or the recognition support unit. The vehicle can be collectively provided with the major functions.

The recognition support unit can include a result notification unit that notifies a specification comparison result using a speech, an image, or a combination of these. The user can more reliably recognize a specification comparison result.

The recognition support unit can acquire a specification difference between the first and second vehicles from the comparison unit. In this case, the result notification unit can notify the presence of the specification difference. The user can recognize that there is a specification difference between the first and second vehicles. For example, the user can recognize the presence of a specification difference between the reference vehicle (first vehicle) usually used or driven by the user and the other vehicle (second vehicle) different from the reference vehicle. The user can drive the vehicle in consideration for this.

The comparison unit can compare specifications on driving, braking, and running between the first and second vehicles. For example, the comparison unit can compare specifications of the first and second vehicles concerning characteristics of brake operation or steering operation. Further, the comparison unit can compare specifications between the first and second vehicles concerning at least any one of types of brake system, drive system, and tire. The user can beforehand recognize a difference in the specifications on the driving, braking, and running between the reference vehicle (first vehicle) usually used or driven by the user and the other vehicle (second vehicle) different from the reference vehicle. The user can drive the vehicle in consideration for the difference.

The recognition support unit can include an advice information generation unit for generating advice information reflecting a specification comparison result. The result notification unit can output the advice information. Proper action can be taken for the specification difference according to the output advice information about the specification difference.

The advice information generation unit can include a running condition acquisition unit that acquires vehicle running condition information containing at least one of weather information and road information. The advice information generation unit can generate the advice information by referring to the vehicle running condition information. This makes it possible to generate the advice information appropriate to the vehicle running condition information. In a snow day, for example, a proper advice can be output when the user drives a vehicle different from the reference vehicle in terms of tire types (e.g., winter tire and normal tire) or types of drive system (e.g., FR, FF, and full time four wheel drive).

The comparison unit can compare vehicle body specifications between the first and second vehicles. For example, the comparison unit can compare vehicle body specifications in terms of at least any one of a vehicle's height, width, length, minimum turning radius, and blind spot. In this case, the recognition support unit can include a vehicle body contrast image generation unit for generating a vehicle body contrast image that represents a difference between the first and second vehicles in the vehicle body specifications in contrast with each other. The result notification unit can output the vehicle body contrast image. The user can beforehand recognize a difference in the vehicle body specification between the reference vehicle (first vehicle) usually used or driven by the user and the other vehicle (second vehicle) different from the reference vehicle. The user can drive the vehicle in consideration for the difference.

The comparison unit can perform fail-safe comparison between the first and second vehicles. For example, the fail-safe comparison can be applied to at least one of the night vision, auto cruise, ABS, air bag, stability control, back monitor, and sonar functions. In this case, the result notification unit can notify the presence of a fail-safe that is not provided for one of the first and second vehicles to be used by the user and is provided for the other vehicle or that is provided for the one vehicle but is less functional than that provided for the other vehicle. The user can beforehand recognize a difference in the fail-safe specification between the reference vehicle (first vehicle) usually used or driven by the user and the other vehicle (second vehicle) different from the reference vehicle. The user can drive the vehicle in consideration for the difference.

The comparison unit can compare fuel-related specifications between the first and second vehicles. The user can beforehand recognize a difference in the fuel-related specification between the reference vehicle (first vehicle) usually used or driven by the user and the other vehicle (second vehicle) different from the reference vehicle. The user can drive the vehicle in consideration for the difference.

For example, the comparison unit can compare fuel-related specifications between the first and second vehicles in terms of filler opening position difference. In this case, the comparison unit can include a vehicle body contrast image generation unit for generating a vehicle body contrast image that represents a filler opening position difference between the first and second vehicles in contrast with each other. The result notification unit can output the vehicle body contrast image. The user can beforehand recognize a filler opening position difference between the reference vehicle (first vehicle) usually used or driven by the user and the other vehicle (second vehicle) different from the reference vehicle. The user can fuel the vehicle in consideration for the difference. The filler opening position difference is represented by an image showing the first and second vehicles in contrast with each other. The user can clearly and easily recognize the difference.

Further, the comparison unit can compare fuel-related specifications between the first and second vehicles in terms of fuel type. The user can beforehand recognize a difference in the fuel type (e.g., high-octane or regular) between the reference vehicle (first vehicle) usually used or driven by the user and the other vehicle (second vehicle) different from the reference vehicle. The user can fuel the vehicle in consideration for the difference.

Moreover, the comparison unit can compare fuel-related specifications between the first and second vehicles in terms of fuel economy or cruising distance. The user can beforehand recognize a difference in the fuel economy or cruising distance between the reference vehicle (first vehicle) usually used or driven by the user and the other vehicle (second vehicle) different from the reference vehicle. The user can drive the vehicle in consideration for the difference. Specifically, the result notification unit can notify that one of the first and second vehicles, whichever the user is going to use, indicates a cruising distance smaller than that indicated on the other vehicle when an onboard fuel gauge reaches a predetermined fuel level. This makes it possible to prevent the vehicle from running out of gasoline when the user changes the reference vehicle (first vehicle) usually used or driven by the user to the other vehicle (second vehicle) different from the reference vehicle.

The comparison unit can compare specifications of a functional operation section provided in each of the first and second vehicles. For example, the comparison unit can compare layout positions of the functional operation section between the first and second vehicles. The user can beforehand recognize a difference in the functional operation section specification between the reference vehicle (first vehicle) usually used or driven by the user and the other vehicle (second vehicle) different from the reference vehicle. The user can operate the functional operation section in consideration for the difference. In this case, the recognition support unit includes a functional operation section layout image generation unit for generating a functional operation section layout image showing that one of the first and second vehicles, whichever the user is going to use, includes the functional operation section according to a layout different from that for the other vehicle or excludes the functional operation section included in the other vehicle. The result notification unit can generate the functional operation section layout image. Using the functional operation section layout image, the user can clearly and easily recognize a difference in the functional operation section and an actual position of the different functional operation section.

The comparison unit can compare insurance specifications between the first and second vehicles. The user can beforehand recognize a difference in the insurance specification between the reference vehicle (first vehicle) usually used or driven by the user and the other vehicle (second vehicle) different from the reference vehicle. The user can drive the vehicle in consideration for the difference.

In this case, the result notification unit can notify an insurance content that is inapplicable to one of the first and second vehicles, whichever the user is going to use, and is applicable to the other vehicle. When the insurance is inapplicable to a vehicle the user is going to drive, driving the uninsured vehicle increases the risk. Notifying this situation is very effective.

Information about the insurance specification contains information about a user condition subject to an insurance coverage. In addition, the second vehicle is provided with a user identifying unit for identifying a user of the second vehicle. In this case, the result notification unit can notify that an identified user does not satisfy the user condition applicable to the insurance coverage and is not included in the insurance coverage for one of the first and second vehicles, whichever the user is going to use. Depending on an insurance, the insurance coverage may be limited to family members or may require an age condition. The user may be excluded from the insurance coverage even though he or she is insured. When the insurance is inapplicable to a vehicle the user is going to drive, driving the uninsured vehicle increases the risk. Notifying this situation is very effective.

At least one of the first and second vehicles can be provided with a boarding detection unit for detecting boarding of the user on the second vehicle and a specification difference listing unit for listing specification difference information under a condition that the user's vehicle is detected. According to the construction, the specification difference information is listed when the user gets in a vehicle whose specification difference information is needed. The specification difference information can be notified at a proper timing. Listing the specification difference information helps the user clearly recognize the content.

The first vehicle specification identifying information contains first function list information indicating a content of a function provided for the first vehicle. The second vehicle specification identifying information contains second function list information indicating a function provided for the second vehicle. The comparison unit can compare functions between the first and second vehicles based on the first function list information and the second function list information. In this case, the recognition support unit can perform a functional difference recognition support process that acquires a functional difference between first and second vehicles based on a result of the function comparison and helps a user recognize a function difference. The user can recognize a function difference between the first vehicle (reference vehicle) and the second vehicle.

In this case, the first vehicle can be defined as the reference vehicle. When the user uses the second vehicle, the recognition support unit can perform a specification difference recognition support process for allowing the user to recognize a specification difference from the first vehicle. The recognition support unit can include a second function specification unit for specifying the presence or absence of a second vehicle function provided for only the second vehicle based on a comparison result. When the second vehicle function is available, the difference recognition support unit can perform a second vehicle function notification process for notifying information about the second vehicle function as a functional difference recognition support process. This construction can positively notify the user of availability of the second vehicle function installed only on the unfamiliar second vehicle. It is possible to provide not only the availability of the second vehicle function but also information associated with the function, i.e., description about the contents of the second vehicle function and its usage.

The second vehicle can be previously provided with a ready-for-use state applicable to a chance of using the second vehicle function. In this case, the difference recognition support unit can perform the second vehicle function notification process when the ready-for-use state is enabled. For example, notifying availability of the second vehicle function only at the time of boarding may make the user forget that function when it really comes into play. The above-mentioned construction can notify the information about the second vehicle function in the ready-for-use state of the function most appropriate for the user who needs to use it, e.g., at the timing or recommended timing to use the function. The user can easily use the second vehicle function.

The second vehicle function includes a first-class function triggered by a user operation and a second-class function automatically activated independently of a user operation. The second vehicle can be provided with an operation guidance notification unit and first-class function execution unit. The operation guidance notification unit performs an operation guidance notification process to prompt a user operation when the ready-for-use state becomes enabled for the first-class function. The first-class function execution unit performs a first-class function corresponding to a user operation when performed. Some second vehicle functions are useful for the user and others are unfamiliar to him or her. The user dare not use such functions. The second vehicle function may contain a first-class function that may or may not be used for the driving. According to the above-mentioned construction, the system notifies at least availability of the function and information about it. The system then notifies that the user needs to perform a specified operation for using the function. The user can determine to perform the first-class function on his or her own will.

The second vehicle can be provided with a second-class function execution unit that automatically performs a second-class function corresponding to the second vehicle function notification process after it is performed. According to this construction, the system automatically performs the second-class function after notifying availability of the function and information about it. The user can be freed from a selection operation. In addition, a driver is surely notified that the function starts to operate. Being aware of the function, the driver can smoothly perform a driving operation.

The second vehicle is provided with an operation storage unit and an operation guidance determination unit. The operation storage unit allows an operation storage unit to store operation record information about a user operation for performing a first-class function. The operation guidance determination unit determines based on the operation record information whether or not to perform an operation guidance notification process for the first-class function. In this case, the operation guidance notification unit performs the operation guidance notification process when the process is determined to be performed. The first-class function execution unit performs the first-class function based on the user operation. When it is determined not to perform the operation guidance notification process, the first-class function execution unit can automatically perform a first-class function. The operation guidance notification unit need not perform the operation guidance notification process. According to this construction, the system determines user preferences based on a history of the user operation. Thus, the first-class function that should require the user operation can be performed like an automatically performed second-class function.

It is possible to include at least one of a night vision function and an auto cruise function as first-class functions. Driving support functions such as the night vision function and the auto cruise function are not necessarily required for vehicle driving. It is effective to define these functions as first-class functions and to determine whether or not to use them according to a user's selection operation.

It is possible to include one or more of ABS, stability control, back monitor, and sonar functions as second-class functions. The user cannot select the ABS function or the stability control function. The user may not be interested in the back monitor function or the sonar function when performed. It is unnecessary to request the user to select such function to be performed. When these functions are preconfigured to start automatically, the user can be freed from a cumbersome operation.

On the other hand, the first vehicle can be defined as the reference vehicle. When the user uses the second vehicle, the recognition support unit can perform the specification difference recognition support process for allowing the user to recognize a specification difference from the first vehicle. In this case, the recognition support unit includes a first function specification unit for determining based on the comparison result whether or not there is available a first vehicle function installed only on the first vehicle. When the first vehicle function is available, the difference recognition support unit can perform a first vehicle function notification process of notifying information about the first vehicle function as the functional difference recognition support process. According to this construction, the system can positively allow the user to recognize availability of the first vehicle function that is installed on the frequently used first vehicle but not on the second vehicle the user is going to drive. It is possible to provide not only the availability of the first vehicle function but also information associated with the function, i.e., description about the contents of the first vehicle function and its usage.

The first vehicle function notification process can be performed during the start control over the second vehicle. When the driver drives an unfamiliar second vehicle, the system according to this construction can allow the driver to recognize that the function installed on the familiar first vehicle is unavailable. There will be little chance that the driver will be confused at unavailability of the function he or she intended to use.

The second function list information can include equivalent function information that corresponds to at least part of functions installed on the second vehicle and indicates an equivalent function not installed on the second vehicle. The second vehicle or an information relay unit can be provided with an alternative function specification unit and an alternative function notification unit. When the first function specification unit specifies a first specific function, the alternative function specification function specifies availability of an alternative function corresponding to the specified first specific function based on the equivalent function information. The alternative function notification function notifies the specified alternative function. Specifically, the second vehicle can be provided with the back monitor function. The second function list information can include equivalent function information indicating the sonar function as an equivalent for the back monitor function. The second vehicle can allow the use of the sonar function as an alternative to the back monitor function. When an intended function is installed on the familiar first vehicle but not on the second vehicle the driver is going to drive, the construction enables the driver to recognize an alternative function for the intended function and appropriately use the alternative function. The equivalent function signifies a function corresponding to an intended function and, when performed, fully or at least partly achieves an actual effect of the intended function.

A user assistance system for vehicle according to a second aspect in a vehicle communication system capable of communication between a portable information terminal and a vehicle includes: a first function list acquisition unit that is provided on a first vehicle and acquires first function list information indicating a content of a function installed on the first vehicle; a first function information transmission unit that is provided on a first vehicle and transmits acquired first function list information to the information terminal by means of communication; a first function list reception unit that is provided on the information terminal and receives first function list information; a first function list storage unit that is provided on the information terminal and stores received first function list information in a first function list storage unit; a function comparison unit that is provided on one of a second vehicle different from the first vehicle and the information terminal, acquires second function list information indicating a content of a function installed on the second vehicle, acquires first function list information stored in the first function list storage unit, and compares functions between the first vehicle and the second vehicle based on the acquired first and second function list information; and a difference recognition support unit that is provided on one of the second vehicle and the information terminal, acquires a functional difference between the first vehicle and the second vehicle based on a function comparison result, and performs a functional difference recognition support process for helping a user to recognize a functional difference.

According to the above-mentioned construction, the information terminal stores first function list information indicating a function installed on the first vehicle. When the information terminal is carried into the second vehicle, first function list information about the information terminal is compared with second function list information indicating a function installed on the second vehicle. A user can be notified of a functional difference between both vehicles. For example, a first vehicle specific function is available on the first vehicle, not on the second vehicle. Conversely, a second vehicle specific function is available on the second vehicle, not on the first vehicle. When the user is familiar with the first vehicle and drives the unfamiliar second vehicle, the system can stimulate the positive use of a more effective function unavailable on the first vehicle. When the second vehicle lacks a function, the system can notify the missing function. The user can more smoothly drive the second vehicle.

Although particular embodiments of the invention have been described, it should be understood that these are not intended to limit the invention to the particular form disclosed, but on the contrary, the invention covers all modifications, equivalents, and alternatives falling within the scope of the present invention as defined by the appended claims.

What is claimed is:
1. A user assistance system for vehicle, said system comprising:
    a first identifying information acquisition unit that acquires first vehicle specification identifying information for identifying a first vehicle specification that is a specification of a first vehicle;

a second identifying information acquisition unit that acquires second vehicle specification identifying information for identifying a second vehicle specification that is a specification of a second vehicle;

a comparison unit that compares the acquired first vehicle specification identifying information with the acquired second vehicle specification identifying information; and a recognition support unit that performs a specification difference recognition support process based on a result of comparison made by the comparison unit between the first vehicle specification identifying information and the second vehicle specification identifying information, wherein the specification difference recognition support process allows a user to recognize a specification difference between the first and second vehicles when the user is common to the first and second vehicles and uses one of said vehicles, wherein:

the first identifying information acquisition unit acquires first vehicle specification identifying information using a first vehicle specification identifying information source that is provided on the first vehicle and functions as an information delivery source; and the second identifying information acquisition unit acquires second vehicle specification identifying information using a second vehicle specification identifying information source that is provided on the second vehicle and functions as an information delivery source.

2. The user assistance system for vehicle of claim 1, wherein:

the first vehicle is defined as a reference vehicle; and when the user uses the second vehicle, the recognition support unit performs a specification difference recognition support process that allows the user to recognize a specification difference from the first vehicle.

3. The user assistance system for vehicle of claim 1, further comprising:

a first identifying information transmission unit that is provided for the first vehicle and transmits the first vehicle specification identifying information to an information relay unit;

a first identifying information reception unit that is provided for the information relay unit and receives the first vehicle specification identifying information; and a first identifying information storage unit that is provided for the information relay unit and stores the received first vehicle specification identifying information in a first identifying information storage section, wherein the comparison unit acquires the first vehicle specification identifying information from the first identifying information storage section of the information relay unit and compares the acquired information with the second vehicle specification identifying information acquired by the second identifying information acquisition unit mounted on the second vehicle.

4. The user assistance system for vehicle of claim 3, wherein the information relay unit is provided as a wireless information terminal carried by the user.

5. The user assistance system for vehicle of claim 3, wherein the information relay unit is provided as a host apparatus connected with the first identifying information transmission unit via a wireless connection network.

6. The user assistance system for vehicle of claim 5, wherein:

the second vehicle is provided with an authentication unit for authenticating a user using the second vehicle; and the first identifying information acquisition unit acquires the first vehicle specification identifying information from the host apparatus only when the authentication is accepted.

7. The user assistance system for vehicle of claim 4, wherein the comparison unit is provided for the wireless information terminal.

8. The user assistance system for vehicle of claim 4, wherein the recognition support unit is provided for the wireless information terminal.

9. The user assistance system for vehicle of claim 1, wherein the comparison unit is provided for the second vehicle.

10. The user assistance system for vehicle of claim 1, wherein the recognition support unit is provided for the second vehicle.

11. The user assistance system for vehicle of claim 1, wherein the recognition support unit includes a result notification unit that notifies a result of the specification comparison using a speech, an image, or a combination of these.

12. The user assistance system for vehicle of claim 11, wherein:

the recognition support unit acquires a specification difference between the first and second vehicles from the comparison unit; and the result notification unit notifies presence of the specification difference.

13. The user assistance system for vehicle of claim 1, wherein the comparison unit compares specifications on driving, braking, and running between the first and second vehicles.

14. The user assistance system for vehicle of claim 13, wherein the comparison unit compares specifications between the first and second vehicles concerning characteristics of brake operation or steering operation.

15. The user assistance system for vehicle of claim 13, wherein the comparison unit compares specifications between the first and second vehicles concerning at least any one of types of brake system, drive system, and tire.

16. The user assistance system for vehicle of claim 13, wherein:

the recognition support unit includes a result notification unit that notifies a result of the specification comparison using a speech, an image, or a combination of these;

the recognition support unit includes an advice information generation unit for generating advice information reflecting a result of the specification comparison concerning driving, braking, and running; and the result notification unit outputs the advice information.

17. The user assistance system for vehicle of claim 16, wherein the advice information generation unit includes a running condition acquisition unit for acquiring vehicle running condition information containing at least one of weather information and road information and generates the advice information by referring to the vehicle running condition information.

18. The user assistance system for vehicle of claim 1, wherein the comparison unit compares vehicle body specifications between the first and second vehicles.

19. The user assistance system for vehicle of claim 18, wherein the comparison unit compares vehicle body specifications in terms of at least any one of a vehicle's height, width, length, minimum turning radius, and blind spot.

20. The user assistance system for vehicle of claim 18, wherein:
the recognition support unit includes a result notification unit that notifies a result of the specification comparison using a speech, an image, or a combination of these;
the recognition support unit includes a vehicle body contrast image generation unit for generating a vehicle body contrast image that represents a difference between the first and second vehicles in a vehicle body specification in contrast with each other; and
the result notification unit outputs the vehicle body contrast image.

21. The user assistance system for vehicle of claim 1, wherein the comparison unit performs fail-safe comparison between the first and second vehicles.

22. The user assistance system for vehicle of claim 21, wherein the comparison unit performs the fail-safe comparison in terms of at least one of night vision, auto cruise, ABS, air bag, stability control, back monitor, and sonar functions.

23. The user assistance system for vehicle of claim 21, wherein:
the recognition support unit includes a result notification unit that notifies a result of the specification comparison using a speech, an image, or a combination of these; and
the result notification unit notifies presence of a fail-safe that is not provided for one of the first and second vehicles to be used by the user and is provided for the other vehicle or that is provided for the one vehicle but is less functional than that provided for the other vehicle.

24. The user assistance system for vehicle of claim 1, wherein the comparison unit compares fuel-related specifications between the first and second vehicles.

25. The user assistance system for vehicle of claim 24, wherein the comparison unit compares specifications between the first and second vehicles in terms of filler opening position difference.

26. The user assistance system for vehicle of claim 25, wherein:
the recognition support unit includes a result notification unit that notifies a result of the specification comparison using a speech, an image, or a combination of these;
the recognition support unit includes a vehicle body contrast image generation unit for generating a vehicle body contrast image that represents a difference between the first and second vehicles in a filler opening position in contrast with each other; and
the result notification unit outputs the vehicle body contrast image.

27. The user assistance system for vehicle of claim 24, wherein the comparison unit compares specifications between the first and second vehicles in terms of fuel type.

28. The user assistance system for vehicle of claim 24, wherein the comparison unit compares specifications between the first and second vehicles in terms of fuel economy or cruising distance.

29. The user assistance system for vehicle of claim 28, wherein the result notification unit notifies that one of the first and second vehicles, whichever the user is going to use, indicates a cruising distance smaller than that indicated on the other vehicle when an onboard fuel gauge reaches a predetermined fuel level.

30. The user assistance system for vehicle of claim 1, wherein the comparison unit compares specifications of a functional operation section provided in each of the first and second vehicles.

31. The user assistance system for vehicle of claim 30, wherein the comparison unit compares layout positions of the functional operation section between the first and second vehicles.

32. The user assistance system for vehicle of claim 31, wherein:
the recognition support unit includes a functional operation section layout image generation unit for generating a functional operation section layout image showing that one of the first and second vehicles, whichever the user is going to use, includes the functional operation section according to a layout different from that for the other vehicle or excludes the functional operation section included in the other vehicle; and
the result notification unit outputs the functional operation section layout image.

33. The user assistance system for vehicle of claim 1, wherein the comparison unit compares insurance specifications between the first and second vehicles.

34. The user assistance system for vehicle of claim 33, wherein the result notification unit notifies an insurance content that is inapplicable to one of the first and second vehicles, whichever the user is going to use, and is applicable to the other vehicle.

35. The user assistance system for vehicle of claim 33, wherein:
the recognition support unit includes a result notification unit that notifies a result of the specification comparison using a speech, an image, or a combination of these;
information about the insurance specification contains information about a user condition subject to an insurance coverage;
the second vehicle is provided with a user identifying unit for identifying a user of the second vehicle; and
the result notification unit notifies that an identified user does not satisfy the user condition applicable to the insurance coverage and is not included in the insurance coverage for one of the first and second vehicles, whichever the user is going to use.

36. The user assistance system for vehicle of claim 1, wherein at least one of the first and second vehicles is provided with:
a boarding detection unit for detecting boarding of the user on the second vehicle; and
a specification difference listing unit for listing specification difference information under a condition that the boarding of the user on the second vehicle is detected.

37. The user assistance system for vehicle of claim 1, wherein:
the first vehicle specification identifying information contains first function list information indicating a content of a function provided for the first vehicle;
the second vehicle specification identifying information contains second function list information indicating a content of a function provided for the second vehicle;
the comparison unit performs a function comparison to compare functions between the first and second vehicles based on the first function list information and the second function list information; and
the recognition support unit performs a functional difference recognition support process that acquires a functional difference between first and second vehicles based on a result of the function comparison and helps a user recognize the functional difference between first and second vehicles.

38. The user assistance system for vehicle of claim 37, wherein:
the first vehicle is defined as a reference vehicle;
when the user uses the second vehicle, the recognition support unit performs a specification difference recognition support process that allows the user to recognize a specification difference from the first vehicle;
the recognition support unit includes a second function specification unit that specifies availability of a second vehicle function installed only on the second vehicle based on the comparison result; and
when the second vehicle function is available, the recognition support unit performs a second vehicle function notification process for notifying information about the second vehicle function as the specification difference recognition support process.

39. The user assistance system for vehicle of claim 38, wherein:
the second vehicle is previously provided with a ready-for-use state applicable to a chance of using the second vehicle function; and
the recognition support unit performs the second vehicle function notification process when the ready-for-use state is enabled.

40. The user assistance system for vehicle of claim 39, wherein:
the second vehicle function includes a first-class function triggered by a user operation and a second-class function automatically activated independently of a user operation; and
the second vehicle is provided with
an operation guidance notification unit that performs an operation guidance notification process to prompt a user operation when the ready-for-use state becomes enabled for the first-class function, and
a first-class function execution unit that performs a first-class function corresponding to a user operation when performed.

41. The user assistance system for vehicle of claim 40, wherein the second vehicle is provided with a second-class function execution unit that automatically performs the second-class function corresponding to the second vehicle function notification process after the second vehicle function notification process is performed.

42. The user assistance system for vehicle of claim 40, wherein the second vehicle is provided with:
an operation storage unit that allows an operation storage section to store operation record information about a user operation for performing the first-class function; and
an operation guidance determination unit that determines based on the operation record information whether or not the operation guidance notification unit needs to perform an operation guidance notification process for the first-class function;
when determining that the operation guidance notification unit needs to perform the operation guidance notification process for the first class function, the operation guidance notification unit performs the operation guidance notification process for the first-class function;
the first-class function execution unit performs the first-class function based on the user operation; and
when determining that the guidance notification unit does not need to perform the operation guidance notification process for the first-class function, the first-class function execution unit automatically performs the first-class function without allowing the operation guidance notification unit to perform the operation guidance notification process for the first-class function.

43. The user assistance system for vehicle of claim 40, wherein the first-class function includes at least one of a night vision function and an auto cruise function.

44. The user assistance system for vehicle of claim 40, wherein the second-class function includes one or more of ABS, stability control, back monitor, and sonar functions.

45. The user assistance system for vehicle of claim 37, wherein:
the first vehicle is defined as a reference vehicle;
when the user uses the second vehicle, the recognition support unit performs the specification difference recognition support process that allows the user to recognize the specification difference of the second vehicle from the first vehicle;
the recognition support unit includes a first function specification unit that specifies whether a first vehicle function, which is installed only on the first vehicle but not on the second vehicle, is existing or not based on the result of comparison made by the comparison unit; and
when the first vehicle function that is installed only on the first vehicle but not on the second vehicle is existing, the recognition support unit performs a first vehicle function notification process, which notifies information about the first vehicle function that is installed only on the first vehicle but not on the second vehicle, as the functional difference recognition support process.

46. The user assistance system for vehicle of claim 45, wherein the first vehicle function notification process is performed during start control over the second vehicle.

47. The user assistance system for vehicle of claim 45, wherein:
the second function list information includes equivalent function information that corresponds to at least part of functions installed on the second vehicle and indicates an equivalent function not installed on the second vehicle; and
the second vehicle or an information relay unit is provided with
an alternative function specification unit that specifies based on the equivalent function information whether or not an alternative function corresponding to the first specific function is available when specified by the first function specification unit, and
an alternative function notification unit that performs an alternative function notification process for notifying the specified alternative function.

48. The user assistance system for vehicle of claim 47, wherein:
the second vehicle is provided with a back monitor function; and
the second function list information includes equivalent function information indicating a sonar function as the equivalent for the back monitor function.

49. A user assistance system for vehicle in a vehicle communication system capable of communication between a portable information terminal and a vehicle, the system comprising:
a first function list acquisition unit that is provided on a first vehicle and acquires first function list information indicating a content of a function installed on the first vehicle;
a first function information transmission unit that is provided on the first vehicle and transmits the acquired first function list information to the information terminal by means of communication;

a first function list reception unit that is provided on the information terminal and receives the first function list information;

a first function list storage unit that is provided on the information terminal and stores the received first function list information in a first function list storage section;

a function comparison unit that is provided on one of a second vehicle different from the first vehicle and the information terminal, acquires second function list information indicating a content of a function installed on the second vehicle, acquires the first function list information stored in the first function list storage unit, and compares functions between the first and second vehicles based on the acquired first and second function list information; and a difference recognition support unit that is provided on one of the second vehicle and the information terminal, acquires a functional difference between the first and second vehicles based on a result of the function comparison, and performs a functional difference recognition support process for helping a user recognize a functional difference.

* * * * *